(12) United States Patent
Shimoe et al.

(10) Patent No.: US 12,487,594 B2
(45) Date of Patent: Dec. 2, 2025

(54) INFORMATION PROCESSING APPARATUS, AND INFORMATION PROCESSING METHOD FOR INTERACTION WITH AN AUTONOMOUS MOBILE BODY

(71) Applicant: SONY GROUP CORPORATION, Tokyo (JP)

(72) Inventors: Takeaki Shimoe, Tokyo (JP); Yuka Takahashi, Tokyo (JP); Kazutaka Endo, Tokyo (JP)

(73) Assignee: SONY GROUP CORPORATION, Tokyo (JP)

( * ) Notice: Subject to any disclaimer, the term of this patent is extended or adjusted under 35 U.S.C. 154(b) by 317 days.

(21) Appl. No.: 18/041,766

(22) PCT Filed: Aug. 13, 2021

(86) PCT No.: PCT/JP2021/029790
§ 371 (c)(1),
(2) Date: Feb. 15, 2023

(87) PCT Pub. No.: WO2022/044843
PCT Pub. Date: Mar. 3, 2022

(65) Prior Publication Data
US 2023/0367312 A1 Nov. 16, 2023

(30) Foreign Application Priority Data
Aug. 28, 2020 (JP) ................... 2020-144613

(51) Int. Cl.
G05D 1/00 (2024.01)
(52) U.S. Cl.
CPC ......... G05D 1/0038 (2013.01); G05D 1/0044 (2013.01)

(58) Field of Classification Search
CPC ............ G06Q 30/0621; G06Q 30/0643; G06T 17/00; G06T 19/20; G06T 2200/24;
(Continued)

(56) References Cited

U.S. PATENT DOCUMENTS

| 2011/0167481 A1* | 7/2011 | Ganz ................. G06Q 30/0276 726/5 |
| 2014/0273717 A1* | 9/2014 | Judkins .................... A63H 3/28 446/175 |

(Continued)

FOREIGN PATENT DOCUMENTS

| JP | 2012-003635 A | 1/2012 |
| JP | 2020-000279 A | 1/2020 |

OTHER PUBLICATIONS

Who can see the Friends section of my profile? (May 1, 2017). Retrieved from https://web.archive.org/web/20170501112722/https://www.facebook.com/help/115450405225661. (Year: 2017).*

(Continued)

*Primary Examiner* — Said Broome
*Assistant Examiner* — Jordan Wan Yick
(74) *Attorney, Agent, or Firm* — CHIP LAW GROUP

(57) ABSTRACT

Provided is an information processing apparatus includes an image processing unit that generates a first moving image in which a virtual second autonomous mobile body that virtually interacts with a first autonomous mobile body is superimposed in a captured moving image obtained by capturing an image of the first autonomous mobile body, and a display control unit that controls display of the first moving image.

15 Claims, 60 Drawing Sheets

(58) Field of Classification Search
CPC ..... G06T 2219/2008; G06T 2219/2012; G06T 2219/2016; G06T 2219/2024
See application file for complete search history.

(56) References Cited

U.S. PATENT DOCUMENTS

2019/0108686 A1* 4/2019 Spivack ............. G06Q 30/0277
2020/0330873 A1* 10/2020 Keefe ..................... A63F 13/69

OTHER PUBLICATIONS

X. Yu and S. Yang, "Friend Recommendation Mechanism for Social Media Based on Content Matching," 2019 International Conference on Communications, Information System and Computer Engineering (CISCE), Haikou, China, 2019, pp. 500-503, doi: 10.1109/CISCE.2019.00116. (Year: 2019).*

Hitoshi Ono, "Let's use smartphones more conveniently and enjoyably with AR", kakakumag.com, Apr. 1, 2020, 18 pages.

"Niantic Real World AR Occlusion With Pikachu and Eevee", Game Trailers, Youtube, URL: https://www.youtube.com/watch?v=X3QuBIHZNRU, Jun. 29, 2018.

"Aibo No Nakama", Aibo, Youtube, URL: https://www.youtube.com/watch?v=aAoYYq-kdY0, Oct. 29, 2020.

International Search Report and Written Opinion of PCT Application No. PCT/JP2021/029790, issued on Sep. 14, 2021, 12 pages of ISRWO.

* cited by examiner

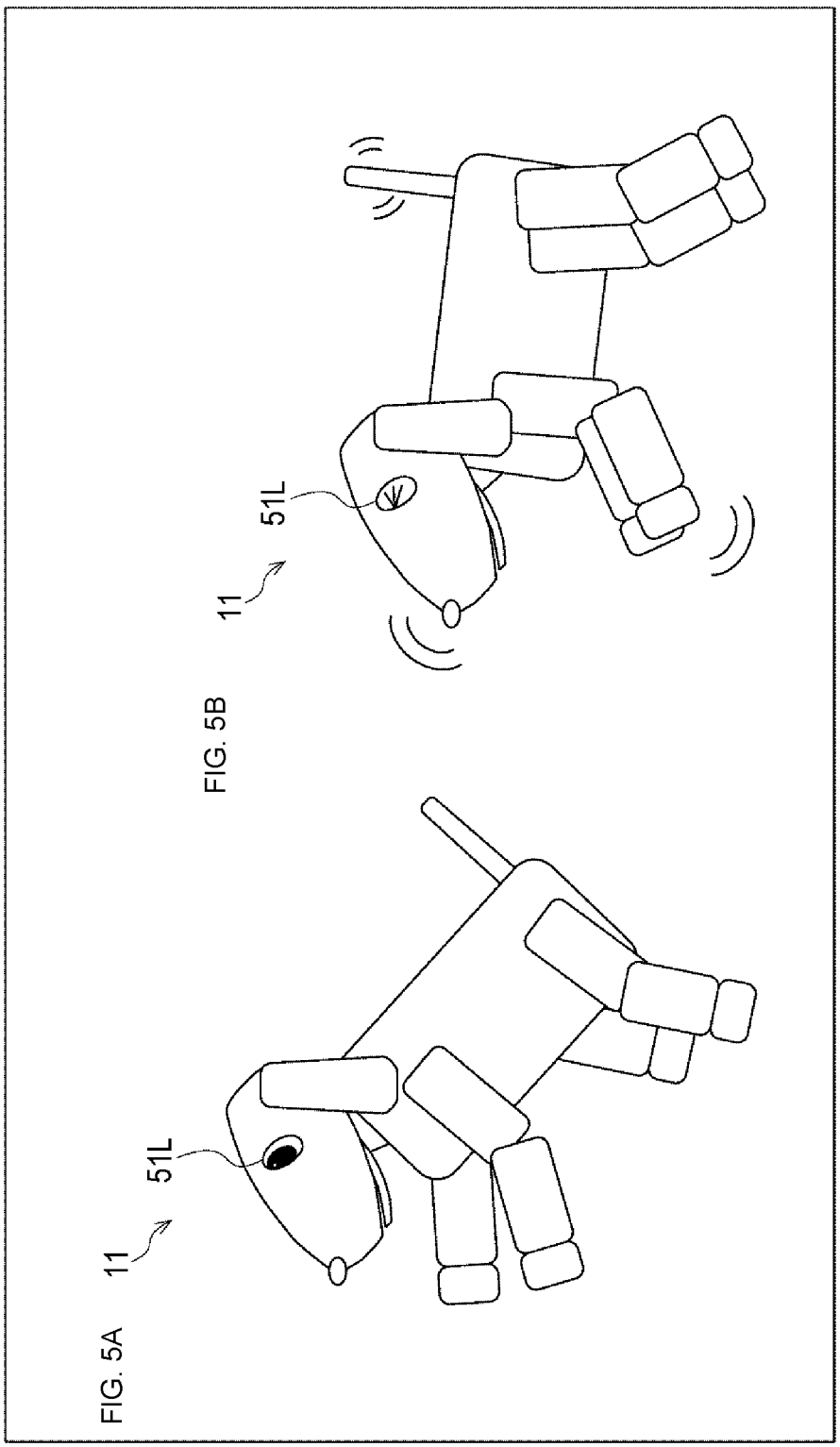

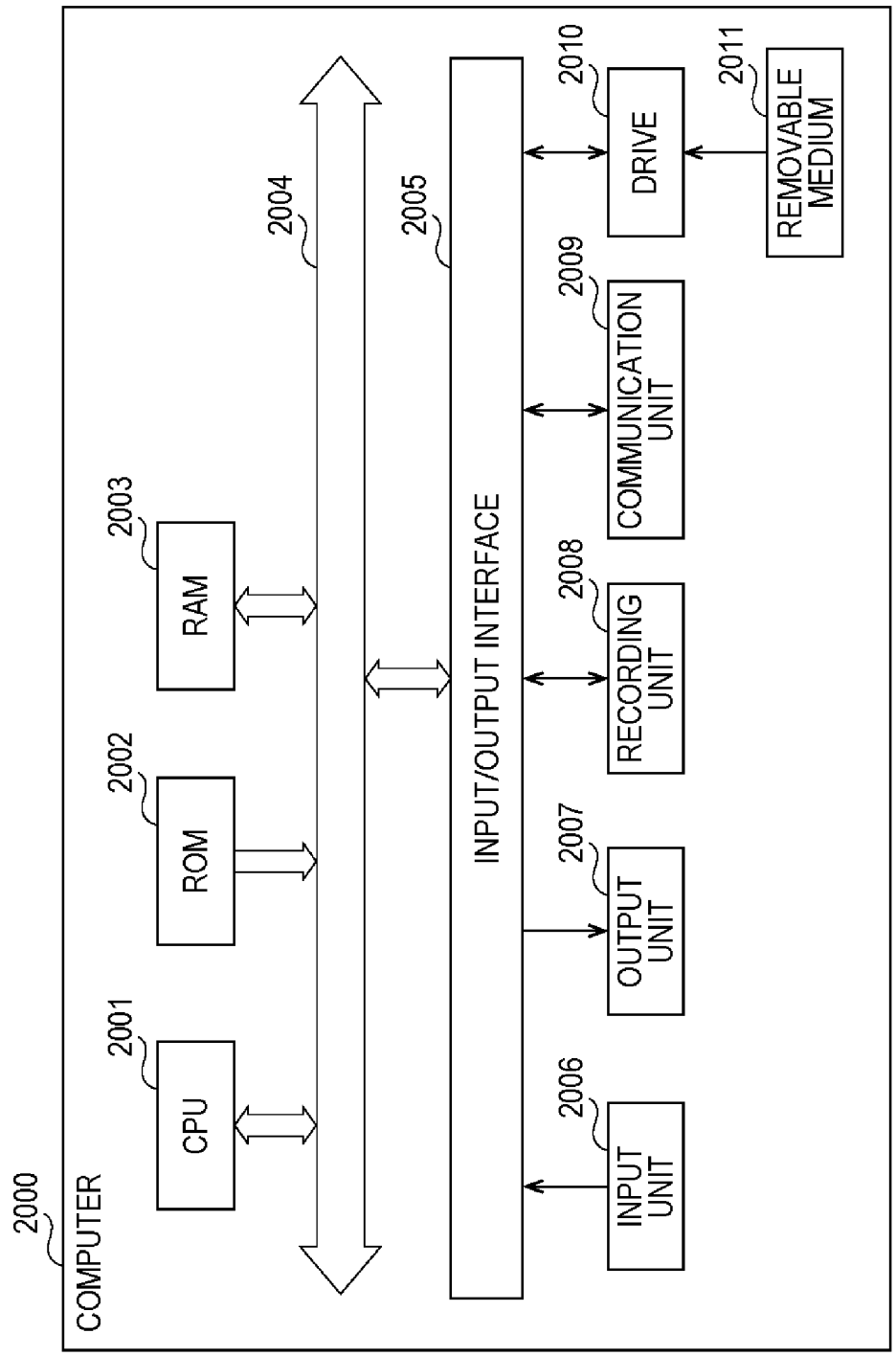

INFORMATION PROCESSING APPARATUS, AND INFORMATION PROCESSING METHOD FOR INTERACTION WITH AN AUTONOMOUS MOBILE BODY

CROSS REFERENCE TO RELATED APPLICATIONS

This application is a U.S. National Phase of International Patent Application No. PCT/JP2021/029790 filed on Aug. 13, 2021, which claims priority benefit of Japanese Patent Application No. JP 2020-144613 filed in the Japan Patent Office on Aug. 28, 2020. Each of the above-referenced applications is hereby incorporated herein by reference in its entirety.

TECHNICAL FIELD

The present technology relates to an information processing apparatus, an information processing method, and a program, and particularly relates to an information processing apparatus, an information processing method, and a program for improving an entertainment aspect of an autonomous mobile body.

BACKGROUND ART

In recent years, with the spread of a social networking service (SNS), each user can easily increase friends by making friends with other users on the SNS (see, for example, Patent Document 1).

CITATION LIST

Patent Document

Patent Document 1: Japanese Patent Application Laid-Open No. 2012-3635

SUMMARY OF THE INVENTION

Problems to be Solved by the Invention

Meanwhile, it is desired to improve an entertainment aspect of a pet type robot which has been widely used in recent years. For example, similarly to users on the SNS, if the pet type robot can make friends with other pet type robots and have more friends, it is assumed that the entertainment aspect of the pet type robot is improved.

The present technology has been made in view of such a situation, and an object is to improve an entertainment aspect of an autonomous mobile body such as a pet type robot.

Solutions to Problems

An information processing apparatus according to one aspect of the present technology includes: an image processing unit configured to generate a first moving image in which a virtual second autonomous mobile body that virtually interacts with a first autonomous mobile body is superimposed in a captured moving image obtained by capturing an image of the first autonomous mobile body; and a display control unit configured to control display of the first moving image.

An information processing method according to one aspect of the present technology includes, by an information processing apparatus: generating a moving image in which a virtual second autonomous mobile body that virtually interacts with a first autonomous mobile body is superimposed in a captured moving image obtained by capturing an image of the first autonomous mobile body; and controlling display of the moving image.

A program according to one aspect of the present technology causes a computer to execute processing including: generating a moving image in which a virtual second autonomous mobile body that virtually interacts with a first autonomous mobile body is superimposed in a captured moving image obtained by capturing an image of the first autonomous mobile body; and controlling display of the moving image.

In the one aspect of the present technology, a moving image is generated in which the virtual second autonomous mobile body that virtually interacts with the first autonomous mobile body is superimposed in a captured moving image obtained by capturing an image of the first autonomous mobile body, and display of the moving image is controlled.

BRIEF DESCRIPTION OF DRAWINGS

FIGS. 5A and 5B are views illustrating a motion example of the autonomous mobile body.

FIG. 51 is a flowchart for explaining editing processing for a profile and the like.

FIG. 52 is a view illustrating an example of a screen displayed in the editing processing for a profile and the like.

FIG. 53 is a view illustrating an example of a screen displayed in the editing processing for a profile and the like.

FIG. 54 is a view illustrating an example of a screen displayed in the editing processing for a profile and the like.

FIG. 55 is a view illustrating an example of a screen displayed in the editing processing for a profile and the like.

FIG. 56 is a view illustrating an example of a screen displayed in the editing processing for a profile and the like.

FIG. 57 is a view illustrating an example of a screen displayed in the editing processing for a profile and the like.

FIG. 58 is a view illustrating an example of a screen displayed in the editing processing for a profile and the like.

FIG. 59 is a view illustrating an example of a screen displayed in the editing processing for a profile and the like.

FIG. 60 is a diagram illustrating a configuration example of a computer.

MODE FOR CARRYING OUT THE INVENTION

Hereinafter, an embodiment for implementing the present technology will be described. The description will be given in the following order.
1. Embodiment
2. Modification
3. Other 1. Embodiment With reference to FIGS. 1, 2, 3, 4A, 4B, 4C, 5A, 5B, 6, 7, 8, 9, 10, 11, 12, 13, 14, 15, 16, 17, 18, 19, 20, 21, 22, 23, 24, 25, 26, 27, 28, 29, 30, 31, 32, 33, 34, 35, 36, 37, 38, 39, 40, 41, 42, 43, 44, 45, 46, 47, 48, 49, 50, 51, 52, 53, 54, 55, 56, 57, 58, and 59, an embodiment of the present technology will be described.

<Configuration Example of Information Processing System 1>

Figure 1:
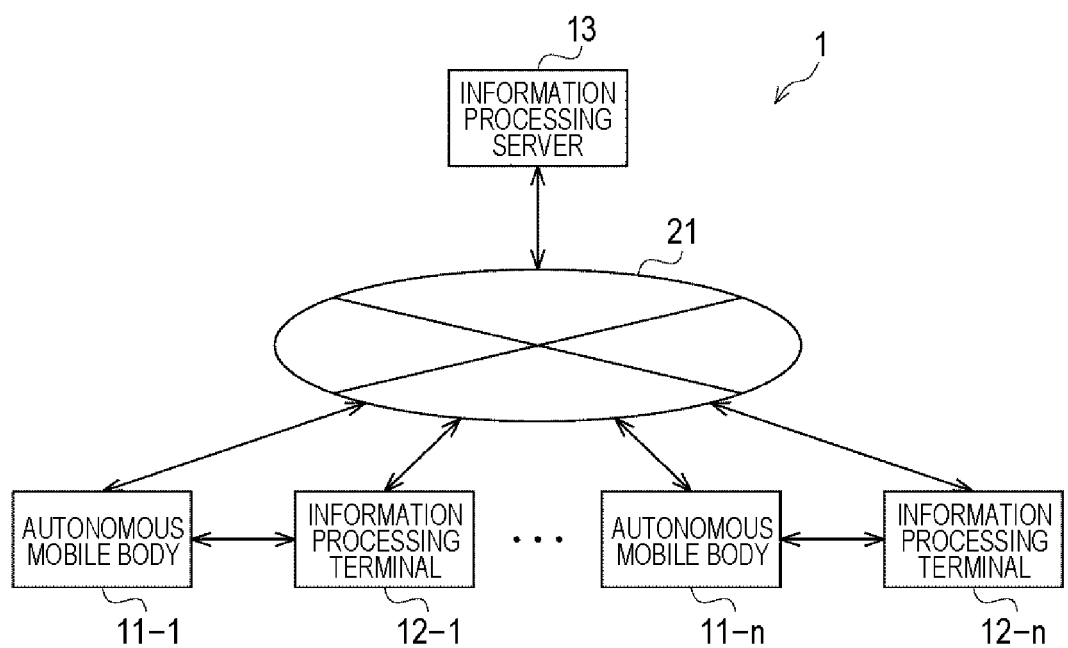
FIG. 1 is a block diagram illustrating an embodiment of an information processing system to which the present technology is applied.

FIG. 1 is a block diagram illustrating an embodiment of an information processing system 1 to which the present technology is applied.

The information processing system 1 includes autonomous mobile bodies 11-1 to 11-*n*, information processing terminals 12-1 to 12-*n*, and an information processing server 13.

Note that, hereinafter, the autonomous mobile bodies 11-1 to 11-n are simply referred to as an autonomous mobile body 11 in a case where it is not necessary to individually distinguish from each other. Hereinafter, the information processing terminals 12-1 to 12-n will are simply referred to as an information processing terminal 12 in a case where it is not necessary to individually distinguish from each other.

Between each autonomous mobile body 11 and the information processing server 13, between each information processing terminal 12 and the information processing server 13, between each autonomous mobile body 11 and each information processing terminal 12, between the individual autonomous mobile bodies 11, and between the individual information processing terminals 12, communication via a network 21 is possible. Furthermore, it is also possible to directly communicate between each autonomous mobile body 11 and each information processing terminal 12, between the individual autonomous mobile body 11, and between the individual information processing terminal 12, without using the network 21.

The autonomous mobile body 11 is an information processing apparatus that recognizes a situation of the self and surroundings on the basis of collected sensor data and the like, and autonomously selects and executes various motions according to the situation. One of features of the autonomous mobile body 11 is autonomously executing an appropriate motion according to the situation, unlike a robot that simply makes a motion according to a user's instruction.

The autonomous mobile body 11 can execute, for example, user recognition, object recognition, and the like based on a captured image, and perform various autonomous actions according to the recognized user, object, and the like. Furthermore, the autonomous mobile body 11 can execute, for example, voice recognition based on an utterance of the user, and perform an action based on a user's instruction or the like.

Moreover, the autonomous mobile body 11 performs pattern recognition learning in order to acquire ability of the user recognition and the object recognition. At this time, the autonomous mobile body 11 can dynamically collect learning data on the basis of teaching by the user or the like in addition to teacher learning based on given learning data, and can perform pattern recognition learning related to an object or the like.

Furthermore, the autonomous mobile body 11 can be trained by the user. Here, the training of the autonomous mobile body 11 is, for example, wider than general training of teaching and memorizing rules and prohibited matter, and means that a change to be felt by the user appears in the autonomous mobile body 11 as the user involves with the autonomous mobile body 11.

A shape, an ability, and a level of desire and the like of the autonomous mobile body 11 can be appropriately designed according to a purpose and a role. For example, the autonomous mobile body 11 is configured with an autonomous mobile robot that autonomously moves in a space and executes various motions. Specifically, for example, the autonomous mobile body 11 is configured with an autonomous mobile robot having a shape and movement capability imitating a human or an animal such as a dog. Furthermore, for example, the autonomous mobile body 11 is configured with a vehicle or other device having a communication capability with the user.

The information processing terminal 12 is configured with, for example, a smartphone, a tablet terminal, a personal computer (PC), or the like, and is used by the user of the autonomous mobile body 11. The information processing terminal 12 implements various functions by executing a predetermined application program (hereinafter, simply referred to as an application). For example, the information processing terminal 12 communicates with the information processing server 13 via the network 21 or directly communicates with the autonomous mobile body 11, to collect various types of data related to the autonomous mobile body 11, presents to the user, and gives an instruction to the autonomous mobile body 11.

For example, the information processing server 13 collects various types of data from each autonomous mobile body 11 and each information processing terminal 12, provides various types of data to each autonomous mobile body 11 and each information processing terminal 12, and controls motions of each autonomous mobile body 11. Furthermore, similarly to the autonomous mobile body 11, for example, the information processing server 13 can perform processing corresponding to pattern recognition learning and training by the user on the basis of data collected from each autonomous mobile body 11 and each information processing terminal 12. Moreover, for example, the information processing server 13 supplies various types of data related to the above-described application and each autonomous mobile body 11, to each information processing terminal 12.

The network 21 is configured with, for example, some of a public line network such as the Internet, a telephone line network, and a satellite communication network, various local area networks (LANs) including Ethernet (registered trademark), a wide area network (WAN), and the like. Furthermore, the network 21 may include a dedicated line network such as an Internet protocol-virtual private network (IP-VPN). Furthermore, the network 21 may include a wireless communication network such as Wi-Fi (registered trademark) or Bluetooth (registered trademark).

Note that the configuration of the information processing system 1 can be flexibly changed in accordance with specifications, operations, and the like. For example, the autonomous mobile body 11 may further perform information communication with various external devices in addition to the information processing terminal 12 and the information processing server 13. The external devices described above may include, for example, a server that sends weather, news, and other service information, various home electric appliances owned by the user, and the like.

Furthermore, for example, the autonomous mobile body 11 and the information processing terminal 12 do not necessarily have a one-to-one relationship, and may have a many-to-many, many-to-one, or one-to-many relationship, for example. For example, one user can check data related to a plurality of autonomous mobile bodies 11 by using one information processing terminal 12, or can check data related to one autonomous mobile body 11 by using a plurality of information processing terminals.

<Hardware Configuration Example of Autonomous Mobile Body 11>

Next, a hardware configuration example of the autonomous mobile body 11 will be described. Note that, hereinafter, a description is given to an example of a case where the autonomous mobile body 11 is a dog-shaped quadruped walking robot.

Figure 2:
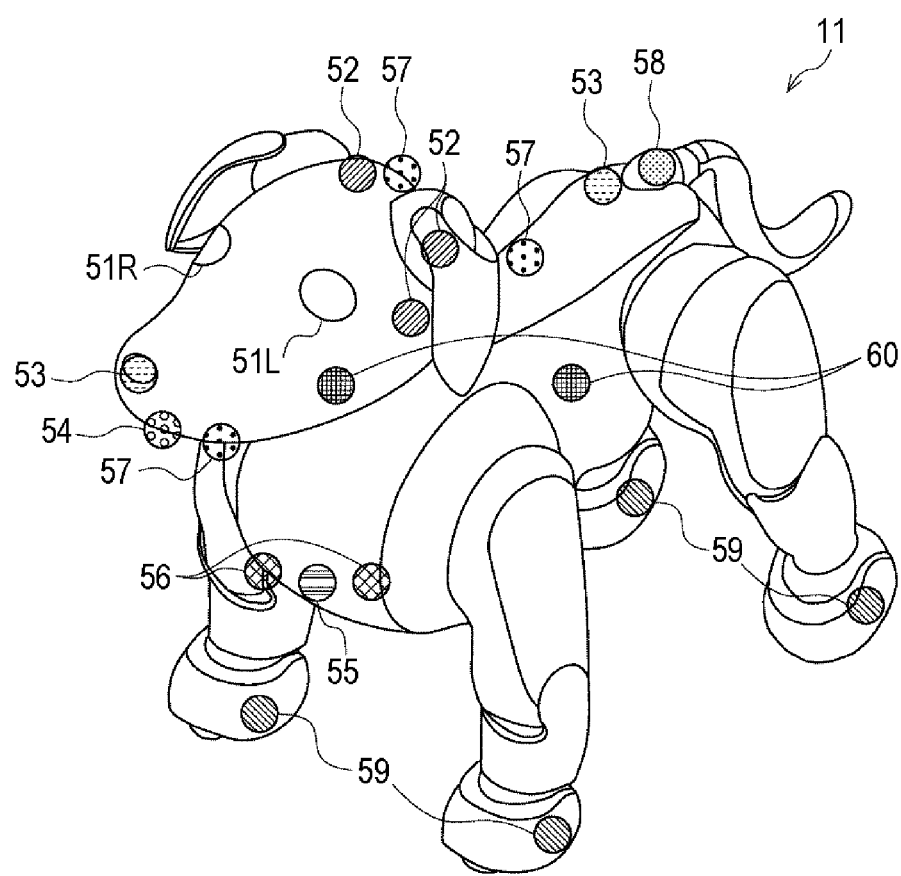
FIG. 2 is a view illustrating a hardware configuration example of an autonomous mobile body.

FIG. 2 is a view illustrating a hardware configuration example of the autonomous mobile body 11. The autonomous mobile body 11 is a dog-shaped quadruped walking robot including a head, a body, four legs, and a tail.

The autonomous mobile body 11 includes two displays 51L and 51R on the head. Note that, hereinafter, the display 51L and the display 51R are simply referred to as a display 51 in a case where it is not necessary to individually distinguish from each other.

Furthermore, the autonomous mobile body 11 includes various sensors. The autonomous mobile body 11 includes, for example, a microphone 52, a camera 53, a time of flight (ToF) sensor 525, a human sensor 55, a distance measuring sensor 56, a touch sensor 57, an illuminance sensor 58, a foot sole button 59, and an inertial sensor 60.

The autonomous mobile body 11 includes, for example, four microphones 52 on the head. Each microphone 52 collects, for example, surrounding sound including a user's utterance and surrounding environmental sound. Furthermore, providing a plurality of microphones 52 makes it possible to collect sounds generated in the surroundings with high sensitivity, and enables localization of a sound source.

The autonomous mobile body 11 includes, for example, two wide-angle cameras 53 at a tip of a nose and a waist, and captures an image of the surroundings of the autonomous mobile body 11. For example, the camera 53 arranged at the tip of the nose captures an image of a front visual field (that is, a field of view of the dog) of the autonomous mobile body 11. The camera 53 arranged at the waist captures an image of the surroundings centered on an upper side of the autonomous mobile body 11. The autonomous mobile body 11 can extract a feature point of a ceiling and the like on the basis of an image captured by the camera 53 arranged at the waist, for example, and can realize simultaneous localization and mapping (SLAM).

The ToF sensor 54 is provided at a tip of the nose, for example, and detects a distance to an object present in front of the head. The autonomous mobile body 11 can accurately detect distances to various objects by the ToF sensor 54, and can realize a motion according to a relative position with respect to a target object including the user, an obstacle, or the like.

The human sensor 55 is arranged on the chest, for example, and detects locations of the user, a pet raised by the user, and the like. The autonomous mobile body 11 can realize various motions on a mobile body, for example, motions according to emotions such as interest, fear, and surprise, by detecting the mobile body present in front by the human sensor 55.

The distance measuring sensor 56 is arranged on the chest, for example, and detects a situation of a floor surface in front of the autonomous mobile body 11. The autonomous mobile body 11 can accurately detect a distance to an object present on the front floor surface by the distance measuring sensor 56, and can realize a motion according to a relative position with the object.

The touch sensor 57 is arranged, for example, at a portion where the user is likely to touch the autonomous mobile body 11, such as the top of the head, under the chin, or the back, and detects the contact by the user. The touch sensor 57 is configured with, for example, a capacitive or pressure-sensitive touch sensor. The autonomous mobile body 11 can detect a contact action such as touching, stroking, hitting, or pushing by the user by the touch sensor 57, and can perform a motion according to the contact action.

The illuminance sensor 58 is arranged, for example, at a base of the tail on a back side of the head, and detects illuminance of a space in which the autonomous mobile body 11 is located. The autonomous mobile body 11 can detect brightness of the surroundings by the illuminance sensor 58, and execute a motion according to the brightness.

The foot sole button 59 is arranged, for example, at each of portions corresponding to paws of the four legs, and detects whether or not a leg bottom surface of the autonomous mobile body 11 is in contact with the floor. The autonomous mobile body 11 can detect contact or non-contact with the floor surface by the foot sole button 59, and can grasp, for example, that the autonomous mobile body 11 is held and lifted by the user.

The inertial sensor 60 is arranged on each of the head and the body, for example, and detects physical quantities such as a speed, an acceleration, and rotation of the head and the body. For example, the inertial sensor 60 is configured with a six-axis sensor that detects an acceleration and an angular velocity on an X-axis, a Y-axis, and a Z-axis. The autonomous mobile body 11 can accurately detect motions of the head and the body with the inertial sensor 60, and can realize motion control according to a situation.

Note that the configuration of the sensor included in the autonomous mobile body 11 can be flexibly changed in accordance with specifications, operations, and the like. For example, in addition to the configuration described above, the autonomous mobile body 11 may further include, for example, various communication devices including a temperature sensor, a geomagnetic sensor, and a global navigation satellite system (GNSS) signal receiver.

Figure 3:
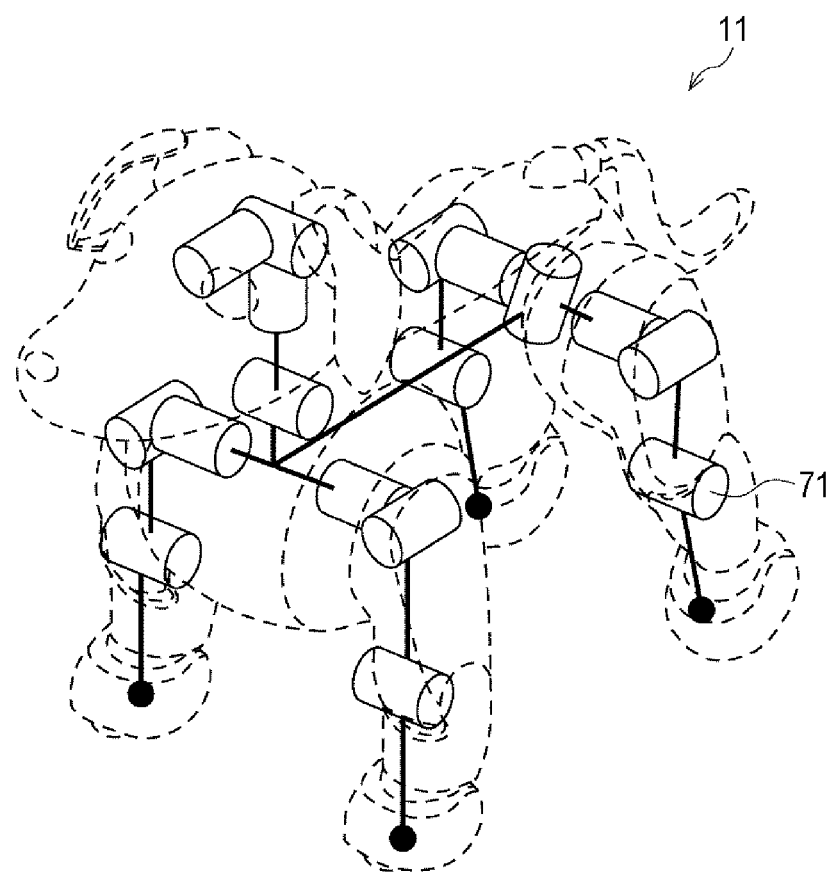
FIG. 3 is a configuration example of an actuator included in the autonomous mobile body.

Next, with reference to FIG. 3, a configuration example of joints of the autonomous mobile body 11 will be described. FIG. 3 illustrates a configuration example of an actuator 71 included in the autonomous mobile body 11. The autonomous mobile body 11 has a total of 22 rotational degrees of freedom, two for each of the ear and the tail, and one for the mouth, in addition to the rotation portions illustrated in FIG. 3.

For example, the autonomous mobile body 11 can achieve both nodding and a head tilting motion by having three degrees of freedom in the head. Furthermore, the autonomous mobile body 11 can realize a natural and flexible motion closer to a real dog, by reproducing a swing motion of the waist by the actuator 71 provided to the waist.

Note that the autonomous mobile body 11 may realize the above-described 22 degrees of rotational freedom by combining, for example, a one-axis actuator and a two-axis actuator. For example, the one-axis actuator may be individually employed for the elbows and the knees in the legs, and the two-axis actuator may be individually employed for the shoulders and the thighs.

Figure 4A:
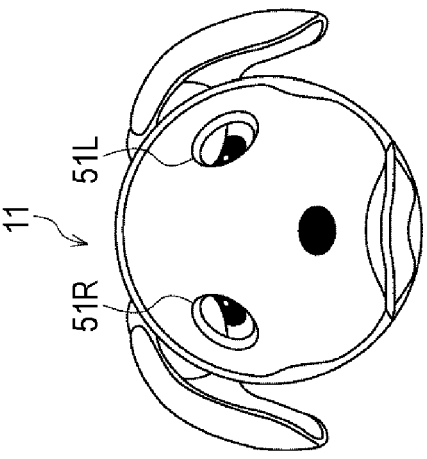
FIGS. 4A, 4B, and 4C are views for explaining a function of a display included in the autonomous mobile body.
Figure 4B:
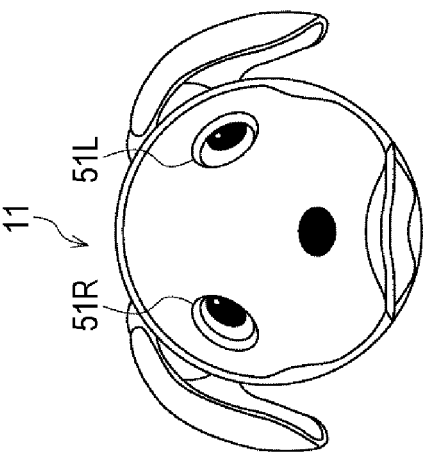
Figure 4C:
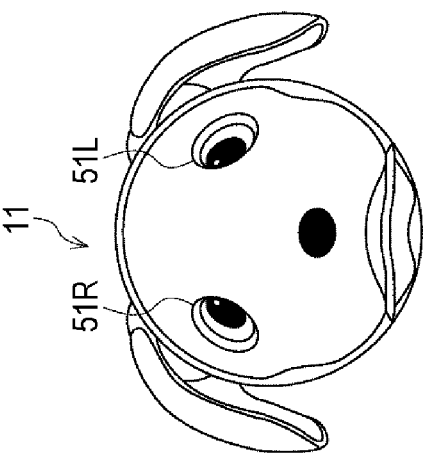

Next, with reference to FIGS. 4A, 4B, and 4C, a function of the display 51 included in the autonomous mobile body 11 will be described.

The autonomous mobile body 11 includes the two displays 51R and 51L corresponding to the right eye and the left eye, respectively. Each display 51 has a function of visually expressing eye movement and emotions of the autonomous mobile body 11. For example, each display 51 can produce a natural motion close to an animal such as a real dog by expressing a motion of an eyeball, a pupil, and an eyelid according to an emotion and a motion, and can express a line-of-sight and an emotion of the autonomous mobile body 11 with high accuracy and flexibility. Furthermore, the user can intuitively grasp a state of the autonomous mobile body 11 from a motion of the eyeball displayed on the display 51.

Furthermore, each display 51 is realized by, for example, two independent organic light emitting diodes (OLEDs). By using the OLED, it is possible to reproduce a curved surface of the eyeball. As a result, it is possible to realize more natural exterior as compared to a case of expressing a pair of eyeballs with one flat display, or a case of individually expressing two eyeballs with two independent flat displays.

According to the configuration described above, as illustrated in FIGS. 5A and 5B, the autonomous mobile body 11 can reproduce a motion and emotional expression closer to a real living thing by controlling motions of the joints and the eyeballs with high accuracy and flexibility.

Note that FIGS. 5A and 5B are views illustrating a motion example of the autonomous mobile body 11, but FIGS. 5A and 5B illustrate an external structure of the autonomous mobile body 11 in a simplified manner in order to describe while focusing on motions of the joints and the eyeballs of the autonomous mobile body 11.

<Functional Configuration Example of Autonomous Mobile Body 11>

Figure 6:
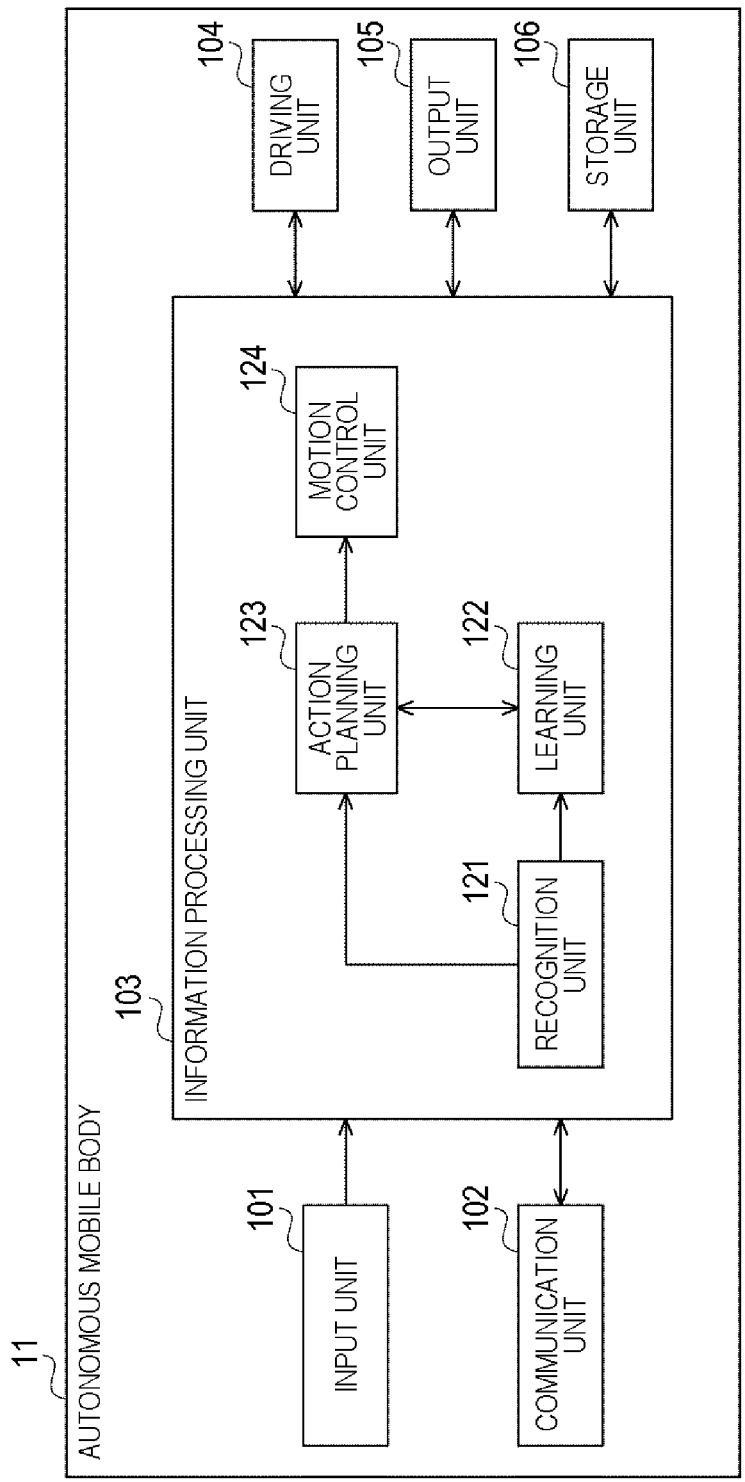
FIG. 6 is a block diagram illustrating a functional configuration example of the autonomous mobile body.

Next, with reference to FIG. 6, a functional configuration example of the autonomous mobile body 11 will be described. The autonomous mobile body 11 includes an input unit 101, a communication unit 102, an information processing unit 103, a driving unit 104, an output unit 105, and a storage unit 106.

The input unit 101 includes various sensors and the like illustrated in FIG. 2, and has a function of collecting various sensor data related to the user and a surrounding situation. Furthermore, the input unit 101 includes, for example, an input device such as a switch or a button. The input unit 101 supplies the collected sensor data and input data inputted via the input device, to the information processing unit 103.

The communication unit 102 communicates with another autonomous mobile body 11, the information processing terminal 12, and the information processing server 13 via the network 21 or not via the network 21, and transmits and receives various types of data. The communication unit 102 supplies the received data to the information processing unit 103, and acquires data to be transmitted from the information processing unit 103.

Note that the communication method of the communication unit 102 is not particularly limited, and can be flexibly changed in accordance with specifications and operations.

The information processing unit 103 includes, for example, a processor such as a central processing unit (CPU), and performs various types of information processing and controls each unit of the autonomous mobile body 11. The information processing unit 103 includes a recognition unit 121, a learning unit 122, an action planning unit 123, and a motion control unit 124.

The recognition unit 121 recognizes a situation where the autonomous mobile body 11 is placed, on the basis of the sensor data and the input data supplied from the input unit 101 and reception data supplied from the communication unit 102. The situation where the autonomous mobile body 11 is placed includes, for example, a situation of the self and the surroundings. The situation of the self includes, for example, a state and a movement of the autonomous mobile body 11. The situation of the surroundings includes, for example, a state, a movement, and an instruction of a surrounding person such as the user, a state and a movement of a surrounding living thing such as a pet, a state and a movement of a surrounding object, a time, a place, a surrounding environment, and the like. The surrounding object includes, for example, another autonomous mobile body. Furthermore, in order to recognize the situation, the recognition unit 121 performs, for example, person identification, recognition of facial expression or line-of-sight, emotion recognition, object recognition, motion recognition, spatial region recognition, color recognition, shape recognition, marker recognition, obstacle recognition, step recognition, brightness recognition, temperature recognition, voice recognition, word understanding, position estimation, posture estimation, and the like.

Furthermore, the recognition unit 121 has a function of estimating and understanding a situation on the basis of various types of recognized information. At this time, the recognition unit 121 may comprehensively estimate the situation by using knowledge stored in advance.

The recognition unit 121 supplies data indicating a recognition result or an estimation result of the situation (hereinafter, referred to as situation data) to the learning unit 122 and the action planning unit 123. Furthermore, the recognition unit 121 registers data indicating the recognition result or the estimation result of the situation in action history data stored in the storage unit 106.

The action history data is data indicating a history of actions of the autonomous mobile body 11. The action history data includes items of, for example, a date and time when the action is started, a date and time when the action is ended, a trigger for executing the action, a place where the action is instructed (however, in a case where a location is instructed), a situation at a time of the action, and whether or not the action has been completed (whether or not the action has been executed to the end).

As the trigger for executing the action, for example, in a case where the action is executed with a user's instruction as a trigger, a content of the instruction is registered. Furthermore, for example, in a case where the action is executed with a predetermined situation as a trigger, a content of the situation is registered. Moreover, for example, in a case where the action is executed with an object instructed by the user or a recognized object as a trigger, a type of the object is registered.

The learning unit 122 learns a situation and an action, and an effect of the action on the environment, on the basis of the sensor data and the input data supplied from the input unit 101, the reception data supplied from the communication unit 102, the situation data supplied from the recognition unit 121, data related to actions of the autonomous mobile body 11 supplied from the action planning unit 123, and the action history data stored in the storage unit 106. For example, the learning unit 122 performs the pattern recognition learning described above and learns an action pattern corresponding to training by the user.

For example, the learning unit 122 realizes the learning described above by using, a machine learning algorithm such as deep learning. Note that the learning algorithm employed by the learning unit 122 is not limited to the example described above, and can be designed as appropriate.

The learning unit 122 supplies data indicating a learning result (hereinafter, referred to as learning result data) to the action planning unit 123 or causes the storage unit 106 to store the data.

The action planning unit 123 plans an action to be performed by the autonomous mobile body 11 on the basis of a recognized or estimated situation and the learning result data. The action planning unit 123 supplies data indicating the planned action (hereinafter, referred to as action plan data) to the motion control unit 124. Furthermore, the action planning unit 123 supplies data related to actions of the autonomous mobile body 11 to the learning unit 122 or registers the data in the action history data stored in the storage unit 106.

The motion control unit 124 controls a motion of the autonomous mobile body 11 so as to execute the planned action, by controlling the driving unit 104 and the output unit 105 on the basis of the action plan data. The motion control unit 124 performs rotation control of the actuator 71, display control of the display 51, sound output control of a speaker, and the like, for example, on the basis of the action plan.

The driving unit 104 bends and stretches a plurality of joints included in the autonomous mobile body 11 on the basis of control by the motion control unit 124. More specifically, the driving unit 104 drives the actuator 71 included in each joint on the basis of control by the motion control unit 124.

The output unit 105 includes, for example, the display 51, a speaker, a haptic device, and the like, and outputs visual information, auditory information, tactile information, and the like on the basis of control by the motion control unit 124.

The storage unit 106 includes, for example, a nonvolatile memory and a volatile memory, and stores various programs and data.

Note that, hereinafter, description of "via the communication unit 102 and the network 21" in a case where each unit of the autonomous mobile body 11 communicates with the information processing server 13 and the like via the communication unit 102 and the network 21 will be appropriately omitted. For example, in a case where the recognition unit 121 communicates with the information processing server 13 via the communication unit 102 and the network 21, it is simply described that the recognition unit 121 communicates with the information processing server 13.

<Functional Configuration Example of Information Processing Terminal 12>

Figure 7:
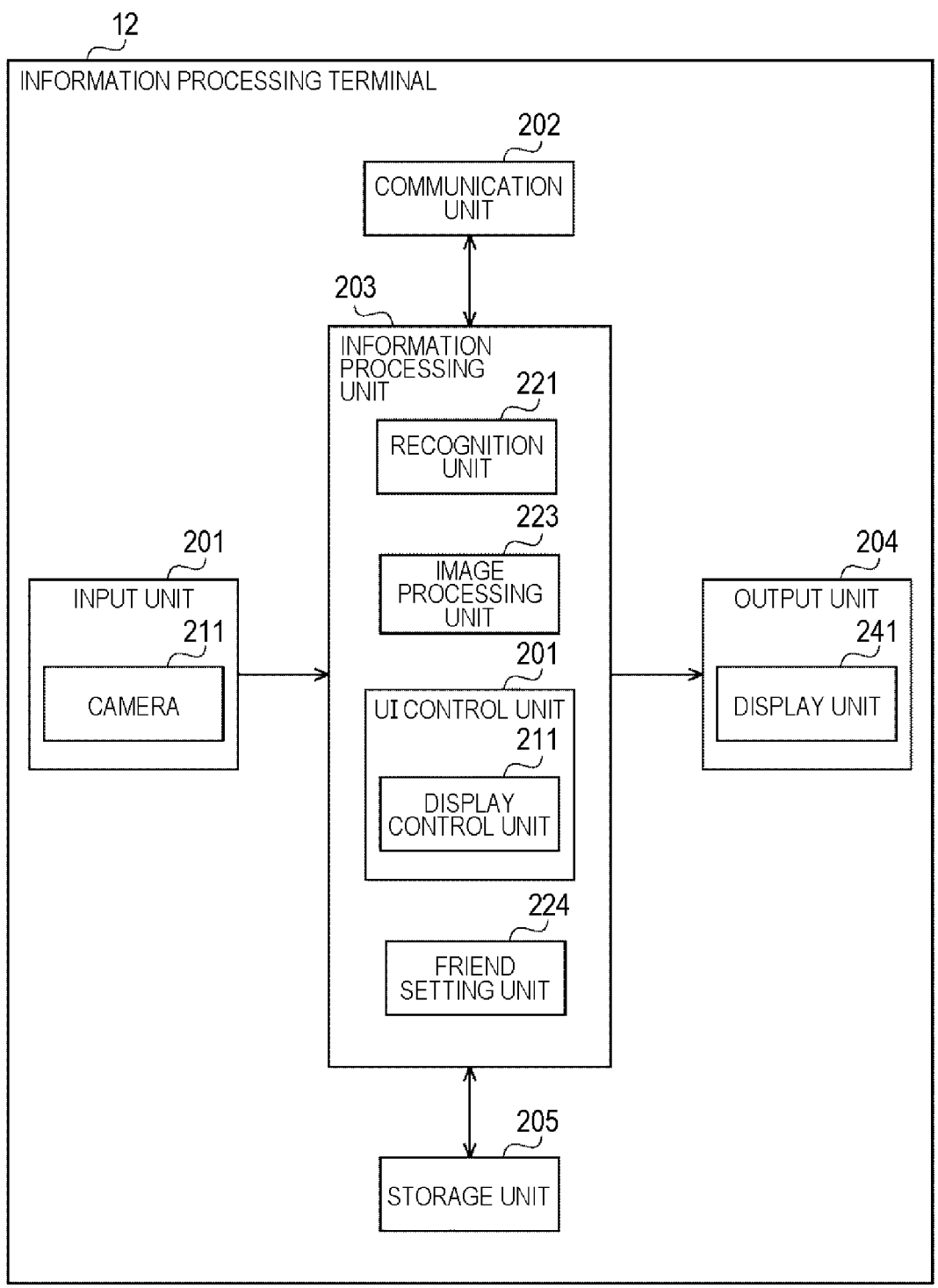
FIG. 7 is a block diagram illustrating a functional configuration example of an information processing terminal.

Next, with reference to FIG. 7, a functional configuration example of the information processing terminal 12 will be described. The information processing terminal 12 includes an input unit 201, a communication unit 202, an information processing unit 203, an output unit 204, and a storage unit 205.

The input unit 201 includes, for example, various sensors such as a camera 211, a microphone (not illustrated), and an inertial sensor (not illustrated). Furthermore, the input unit 201 includes input devices such as a switch (not illustrated) and a button (not illustrated). The input unit 201 supplies input data inputted via the input device and sensor data outputted from various sensors, to the information processing unit 203.

The communication unit 202 communicates with the autonomous mobile body 11, another information processing terminal 12, and the information processing server 13 via the network 21 or not via the network 21, and transmits and receives various types of data. The communication unit 202 supplies the received data to the information processing unit 203, and acquires data to be transmitted from the information processing unit 203.

Note that the communication method of the communication unit 202 is not particularly limited, and can be flexibly changed in accordance with specifications and operations.

The information processing unit 203 includes, for example, a processor such as a CPU, and performs various types of information processing and controls each unit of the information processing terminal 12. The information processing unit 203 includes a recognition unit 221, an image processing unit 222, a user interface (UI) control unit 223, and a friend setting unit 224.

The recognition unit 221 performs object recognition in a captured moving image captured by the camera 211.

The image processing unit 222 generates a moving image, a still image, an operation screen, and the like to be displayed by a display unit 241 included in the output unit 204.

The UI control unit 223 controls a user interface of the information processing terminal 12 by controlling an output of visual information, auditory information, tactile information, and the like by the output unit 204. For example, a display control unit 231 included in the UI control unit 223 controls an output of visual information by the display unit 241 included in the output unit 204. That is, the display control unit 231 controls display of a moving image, a still image, an operation screen, and the like by the display unit 241.

As described later, the friend setting unit 224 performs friend setting between the autonomous mobile body 11 (hereinafter, referred to as an own device) owned by the user who uses the information processing terminal 12, and the autonomous mobile body 11 (hereinafter, referred to as another device) owned by another user.

The output unit 204 includes, for example, the display unit 241 configured with a display and the like, a speaker (not illustrated), a haptic device (not illustrated), and the like, and outputs visual information, auditory information, tactile information, and the like on the basis of control by the UI control unit 223.

The storage unit 205 includes, for example, a nonvolatile memory and a volatile memory, and stores various programs and data.

Note that the functional configuration of the information processing terminal 12 can be flexibly changed in accordance with specifications and operations.

Furthermore, hereinafter, description of "via the communication unit 202 and the network 21" in a case where each unit of the information processing terminal 12 communicates with the information processing server 13 and the like via the communication unit 202 and the network 21 will be appropriately omitted. For example, in a case where the friend setting unit 224 communicates with the information processing server 13 via the communication unit 202 and the network 21, it is simply described that the friend setting unit 224 communicates with the information processing server 13.

Moreover, hereinafter, in a case where the image processing unit 222 generates an image such as a setting screen, and the display control unit 231 causes the display unit 241 to display the generated image, description of processing of the image processing unit 222 and the display control unit 231 is appropriately omitted. For example, it is simply described as "the display unit 241 displays the setting screen", "the setting screen is displayed on the display unit 241", and the like.

<Functional Configuration Example of Information Processing Server 13>

Figure 8:
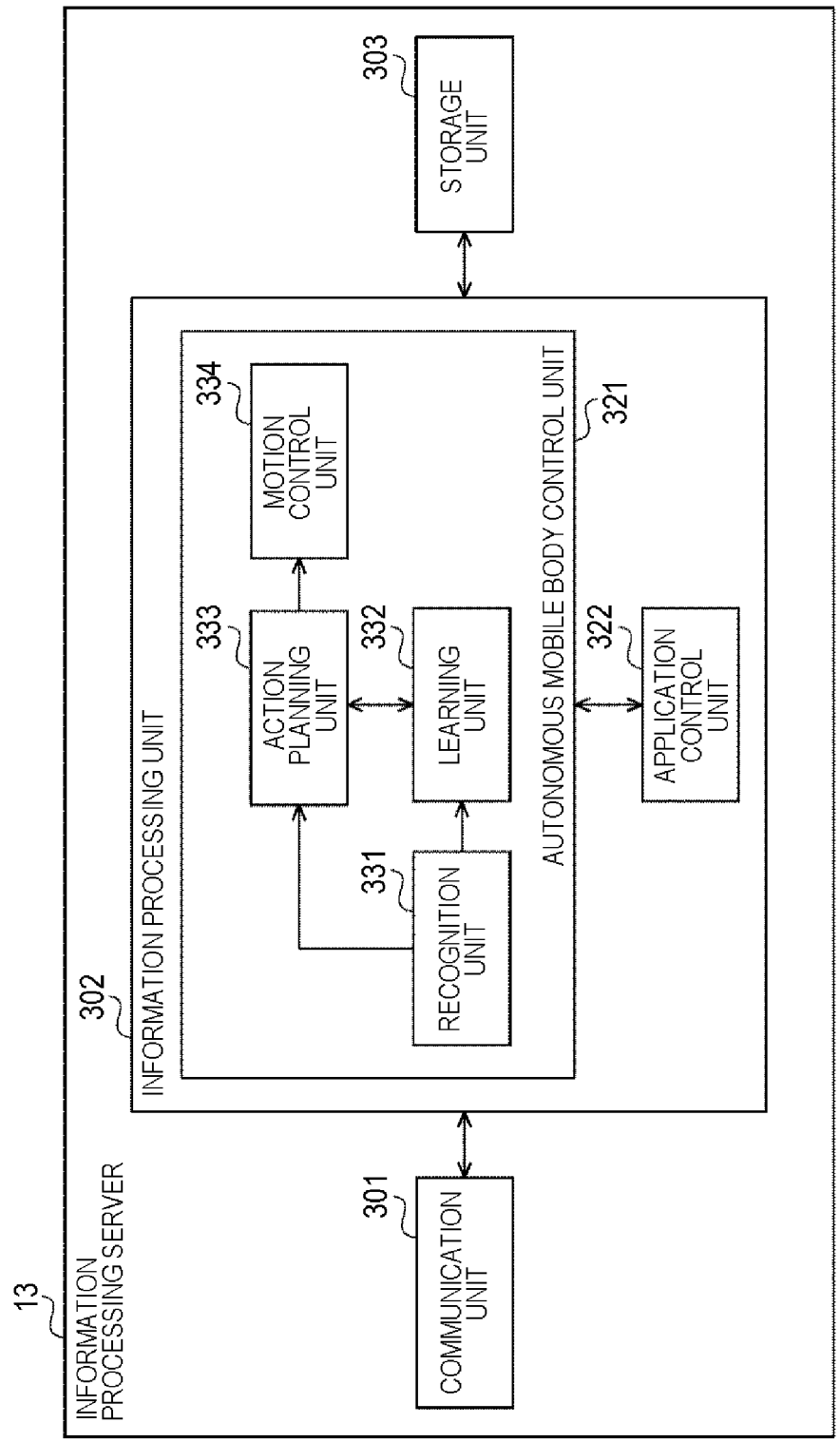
FIG. 8 is a block diagram illustrating a functional configuration example of an information processing server.

Next, with reference to FIG. 8, a functional configuration example of the information processing server 13 will be described. The information processing server 13 includes a communication unit 301, an information processing unit 302, and a storage unit 303.

The communication unit 301 communicates with each autonomous mobile body 11 and each information processing terminal 12 via the network 21, and transmits and receives various types of data. The communication unit 301 supplies the received data to the information processing unit 302, and acquires data to be transmitted from the information processing unit 302.

Note that the communication method of the communication unit 301 is not particularly limited, and can be flexibly changed in accordance with specifications and operations.

The information processing unit 302 includes, for example, a processor such as a CPU, and performs various types of information processing and controls each unit of the information processing terminal 12. The information processing unit 302 includes an autonomous mobile body control unit 321 and an application control unit 322.

The autonomous mobile body control unit 321 has a configuration similar to that of the information processing unit 103 of the autonomous mobile body 11. Specifically, the information processing unit 103 includes a recognition unit 331, a learning unit 332, an action planning unit 333, and a motion control unit 334.

Then, the autonomous mobile body control unit 321 has a function similar to that of the information processing unit 103 of the autonomous mobile body 11. For example, the autonomous mobile body control unit 321 receives sensor data, input data, action history data, and the like from the autonomous mobile body 11, and recognizes situations of the autonomous mobile body 11 and surroundings. For example, the autonomous mobile body control unit 321 controls a motion of the autonomous mobile body 11 by generating control data for controlling a motion of the autonomous mobile body 11 on the basis of the situations of the autonomous mobile body 11 and surroundings, and transmitting the control data to the autonomous mobile body 11. For example, similarly to the autonomous mobile body 11, the autonomous mobile body control unit 321 performs pattern recognition learning and learning of an action pattern corresponding to training by the user.

Note that the learning unit 332 of the autonomous mobile body control unit 321 can also learn collective intelligence common to a plurality of autonomous mobile bodies 11, by performing pattern recognition learning and learning of an action pattern corresponding to training by the user on the basis of data collected from a plurality of autonomous mobile bodies 11.

The application control unit 322 communicates with the autonomous mobile body 11 and the information processing terminal 12 via the communication unit 301, and controls an application executed by the information processing terminal 12.

For example, the application control unit 322 collects various types of data related to the autonomous mobile body 11, from the autonomous mobile body 11 via the communication unit 301. Then, by transmitting the collected data to the information processing terminal 12 via the communication unit 301, the application control unit 322 causes the application executed by the information processing terminal 12, to display the data related to the autonomous mobile body 11.

For example, the application control unit 322 receives, from the information processing terminal 12 via the communication unit 301, data indicating an instruction to the autonomous mobile body 11 inputted via the application. Then, the application control unit 322 transmits the received data to the autonomous mobile body 11 via the communication unit 301, to give an instruction from the user to the autonomous mobile body 11.

The storage unit 303 includes, for example, a nonvolatile memory and a volatile memory, and stores various programs and data. For example, the storage unit 303 stores data related to each autonomous mobile body 11. The data related to each autonomous mobile body 11 includes data related to, for example, a thumbnail image representing a face or an appearance, a profile, a specification (for example, a color, an outer shape, a type, and the like), belongings (for example, food, accessories, and the like), friends, and the like. The friend of the autonomous mobile body 11 is another autonomous mobile body 11 having a friend relationship with each autonomous mobile body 11.

Note that the functional configuration of the information processing server 13 can be flexibly changed in accordance with specifications and operations.

Furthermore, hereinafter, description of "via the communication unit 301 and the network 21" in a case where each unit of the information processing server 13 communicates with the information processing terminal 12 and the like via the communication unit 301 and the network 21 will be appropriately omitted. For example, in a case where the application control unit 322 communicates with the information processing terminal 12 via the communication unit 301 and the network 21, it is simply described that the application control unit 322 communicates with the information processing terminal 12.

<Processing of Information Processing System 1>

Next, with reference to FIGS. 9 to 59, processing of the information processing system 1 will be described.

<Link Function Setting Change Processing>

Figure 9:
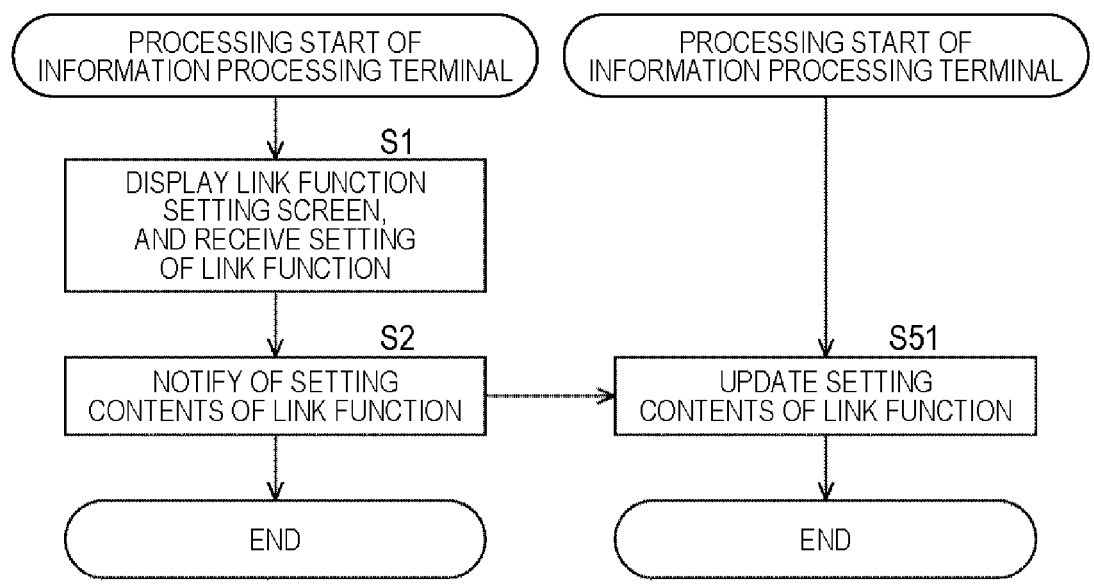
FIG. 9 is a flowchart for explaining link function setting processing.

First, with reference to a flowchart of FIG. 9, link function setting processing executed by the information processing system 1 will be described.

The link function is a function in which the own device is linked with another device. When the link function is set to ON, the own device can virtually interact with another device or exchange information, for example.

In step S1, the information processing terminal 12 displays a link function setting screen, and receives setting of a link function.

Figure 10:
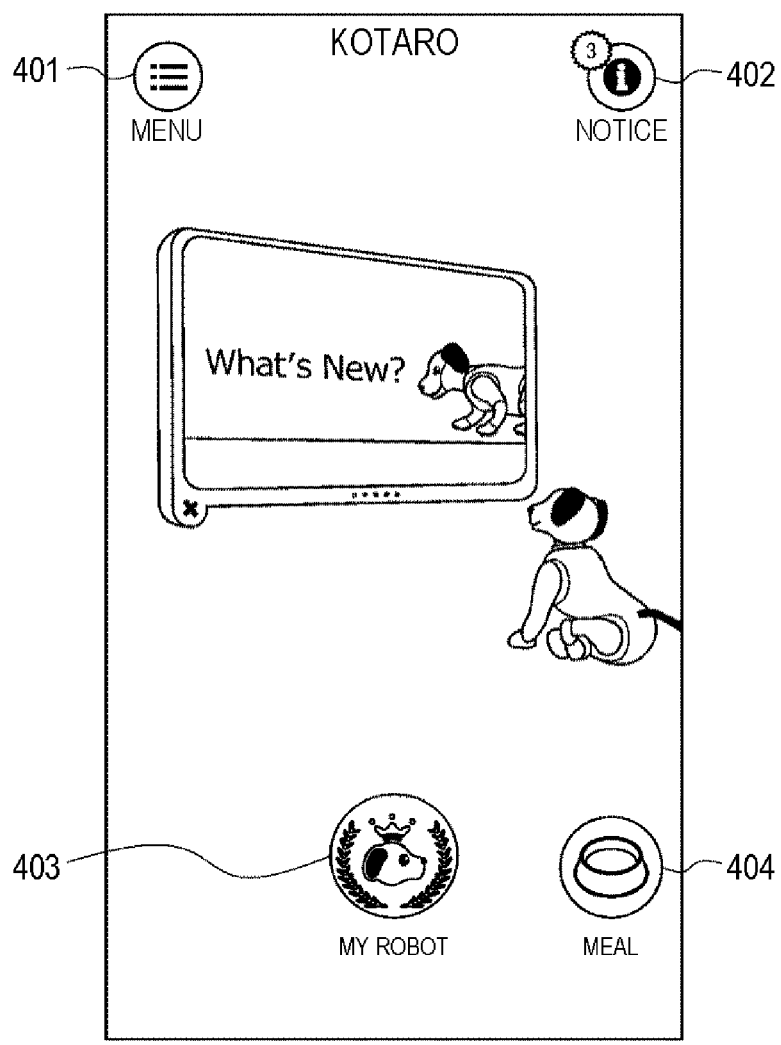
FIG. 10 is a view illustrating an example of a screen displayed in the link function setting processing.

For example, when the information processing unit 203 of the information processing terminal 12 executes an application for the autonomous mobile body 11, a home screen of FIG. 10 is displayed on the display unit 241. On the home screen, a name (Kotaro) of the own device, buttons 401 to 404, and the like are displayed.

The button 401 is a button for displaying a setting screen.

The button 402 is a button for displaying a notice transmitted from the information processing server 13.

The button 403 is a button for displaying information regarding the own device, operating the own device, and the like.

The button 404 is a button for giving food (a meal) to the own device.

Figure 11:
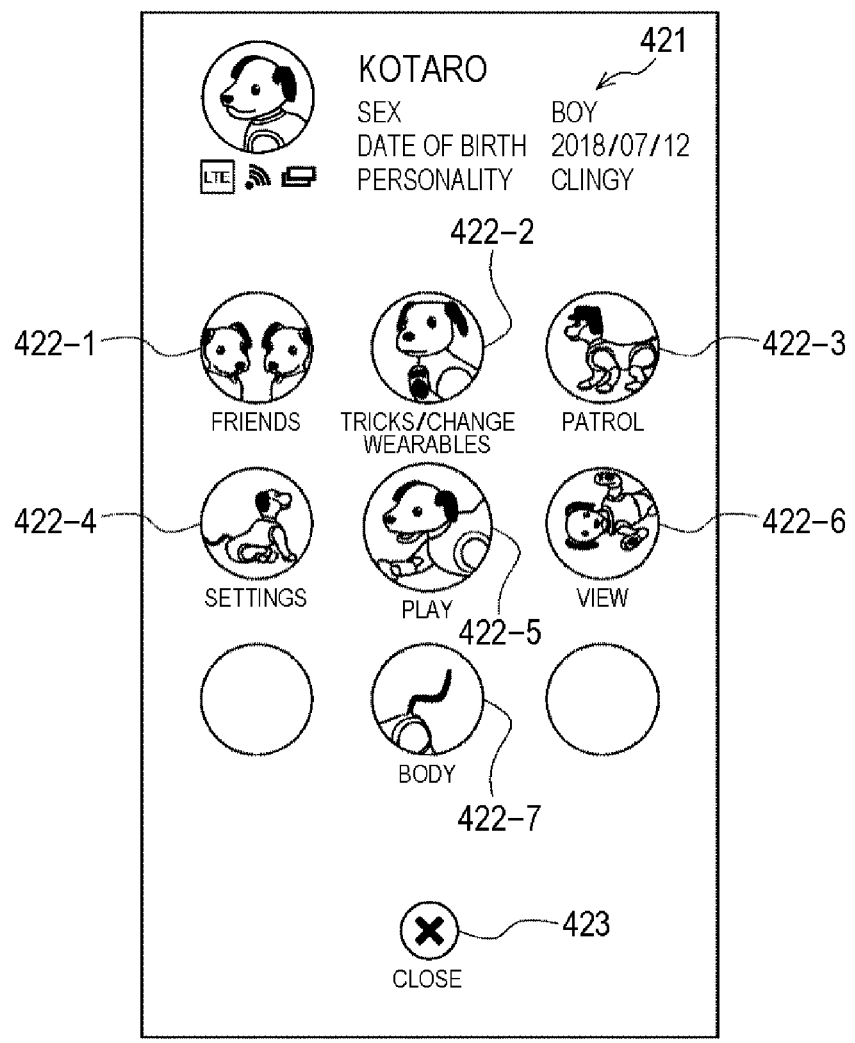
FIG. 11 is a view illustrating an example of a screen displayed in the link function setting processing.

For example, when the button 403 is selected, a menu screen of FIG. 11 is displayed on the display unit 241.

Note that a method of selecting the button 403 is not particularly limited. For example, selection may be performed using a cursor or the like displayed on the home screen, or selection may be performed by touching or bringing a finger close to a display position of the button 404. Note that other buttons on each screen described later can also be selected by a similar method.

On the menu screen, a profile field 421, buttons 422-1 to 422-7, a button 423, and the like are displayed.

In the profile field 421, a thumbnail image, a profile, and the like of the own device are displayed. The profile of the own device includes a name, sex, a date of birth, and a personality.

The buttons 422-1 to 422-7 are buttons for selecting various functions. When any of the buttons 422-1 to 422-7 is selected, a screen or the like for executing a function corresponding to the selected button 422 is displayed on the display unit 241.

The button 423 is a button for closing the menu screen and displaying a previous screen. Note that, hereinafter, reference numerals and descriptions of buttons having similar designs and functions to those of the button 423 will be omitted.

Figure 12:
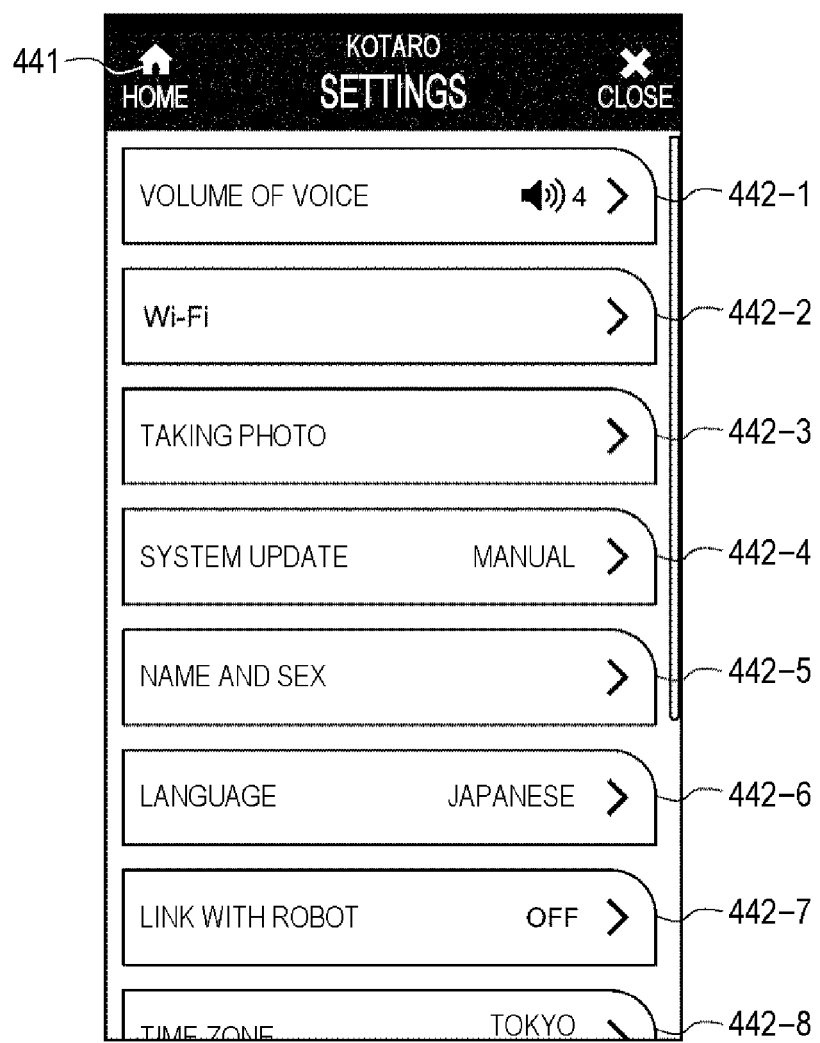
FIG. 12 is a view illustrating an example of a screen displayed in the link function setting processing.

For example, when the button 422-4 is selected, a setting screen of FIG. 12 is displayed on the display unit 241. On the setting screen, a button 441, buttons 442-1 to 442-7, and the like are displayed.

The button 441 is a button for returning to the home screen of FIG. 10. When the button 441 is selected, the home screen of FIG. 10 is displayed on the display unit 241. Note that, hereinafter, reference numerals and descriptions of buttons having similar designs and functions to those of the button 441 will be omitted.

In the buttons 442-1 to 442-8, individual setting items and setting values are displayed. When any of the buttons 442-1 to 442-8 is pressed, a setting screen related to the selected setting item is displayed.

Figure 13:
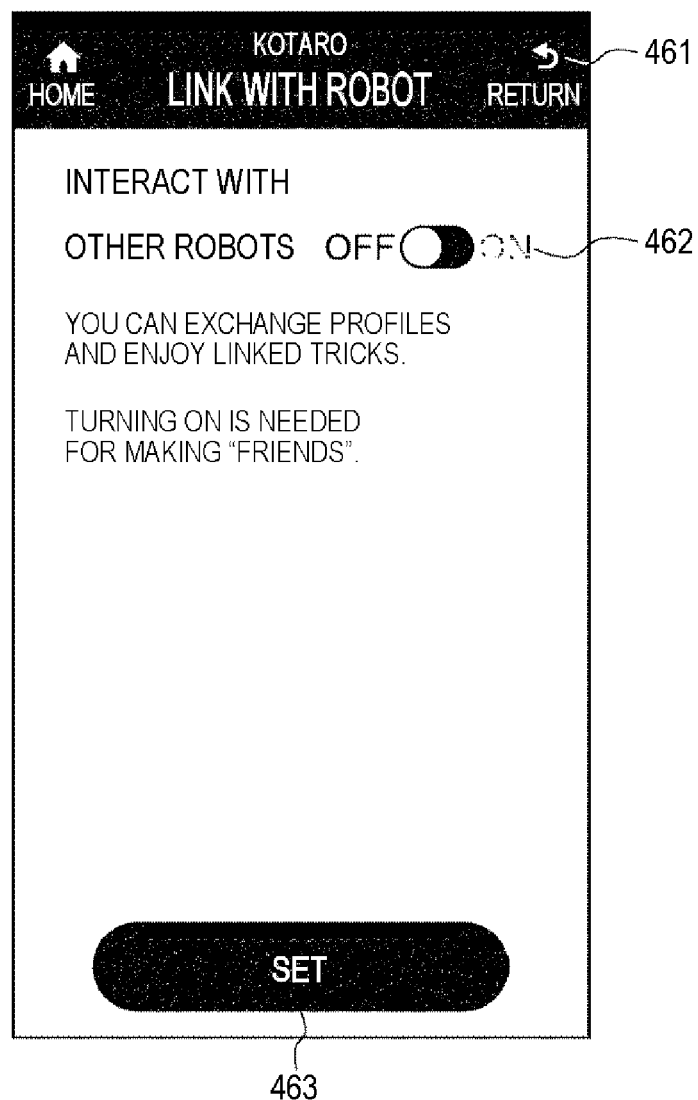
FIG. 13 is a view illustrating an example of a screen displayed in the link function setting processing.

For example, when the button 442-7 is selected, a link function setting screen of FIG. 13 is displayed on the display unit 241.

On the link function setting screen, a button 461, a switch 462, a button 463, and the like are displayed.

The button 461 is a button for returning to a previous screen. When the button 461 is selected, the previous screen is displayed on the display unit 241. Note that, hereinafter, reference numerals and descriptions of buttons having similar designs and functions to those of the button 461 will be omitted.

The switch 462 is a switch for setting ON/OFF of the link function.

The button 463 is a button for confirming setting contents of the link function by the switch 462. When the button 463 is selected, the UI control unit 223 causes the storage unit 205 to store the setting contents of the link function.

Whereas, for example, if the link function is not turned ON in a case where the button 404 is selected on the home screen in FIG. 10 described above, a warning screen in FIG. 14 is displayed on the display unit 241. In the warning screen, tabs 481-1 to 481-3, a button 482, and the like are displayed.

The tab 481-1 is a tab for displaying information regarding friends of the own device.

The tab 481-2 is a tab for displaying, editing, and the like of the profile of the own device.

The tab 481-3 is a tab for performing an operation of returning display of a hidden friend to an original state, among friends of the own device.

The button 482 is a button for setting the link function.

In this example, the tab 481-1 is selected, but the link function is not set to ON, and the link function cannot be used. Therefore, a warning screen for warning to set the link function to ON is displayed.

Then, when the button 482 is selected, the link function setting screen of FIG. 13 described above is displayed, and the link function can be set to ON.

In step S2, the UI control unit 223 notifies the information processing server 13 of setting contents of the link function.

Thereafter, the processing of the information processing terminal 12 ends.

On the other hand, in step S51, the application control unit 322 of the information processing server 13 updates the setting contents of the link function. Specifically, the application control unit 322 updates the setting contents of the link function in data related to the autonomous mobile body 11 (the own device) stored in the storage unit 303.

Thereafter, the processing of the information processing server 13 ends.

<First Embodiment of Friend Acquisition Processing>

Next, with reference to FIGS. 15 to 32, a first embodiment of friend acquisition processing executed by the information processing system 1 will be described.

<Processing of Information Processing Terminal 12>

First, with reference to a flowchart of FIG. 15, processing of the information processing terminal 12 will be described.

In step S101, the information processing terminal 12 requests search for a recommendation candidate. The recommendation candidate means another device recommended by the information processing system 1 as a candidate (hereinafter, referred to as a friend candidate) of a new friend of the own device.

Figure 16:
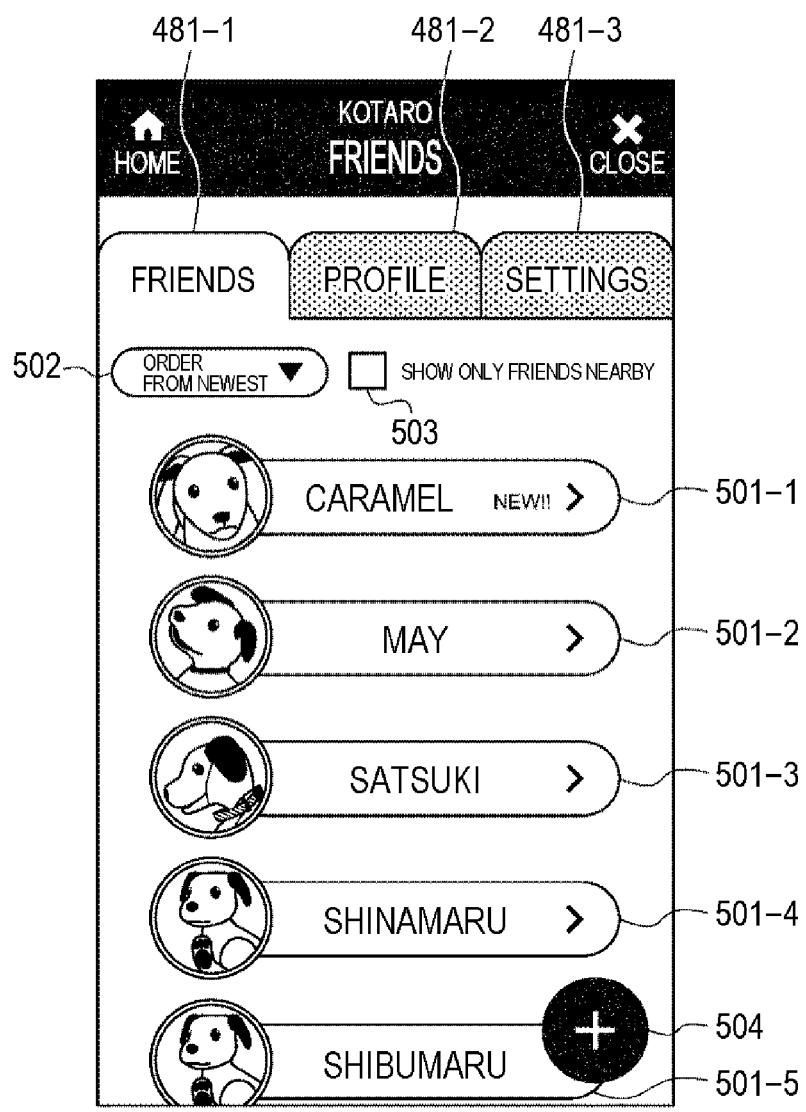
FIG. 16 is a view illustrating an example of a screen displayed in the first embodiment of the friend acquisition processing.

For example, when the button 422-1 is selected on the menu screen of FIG. 11 described above while the link function is set to ON, a friend list in FIG. 16 is displayed on the display unit 241.

Figure 14:
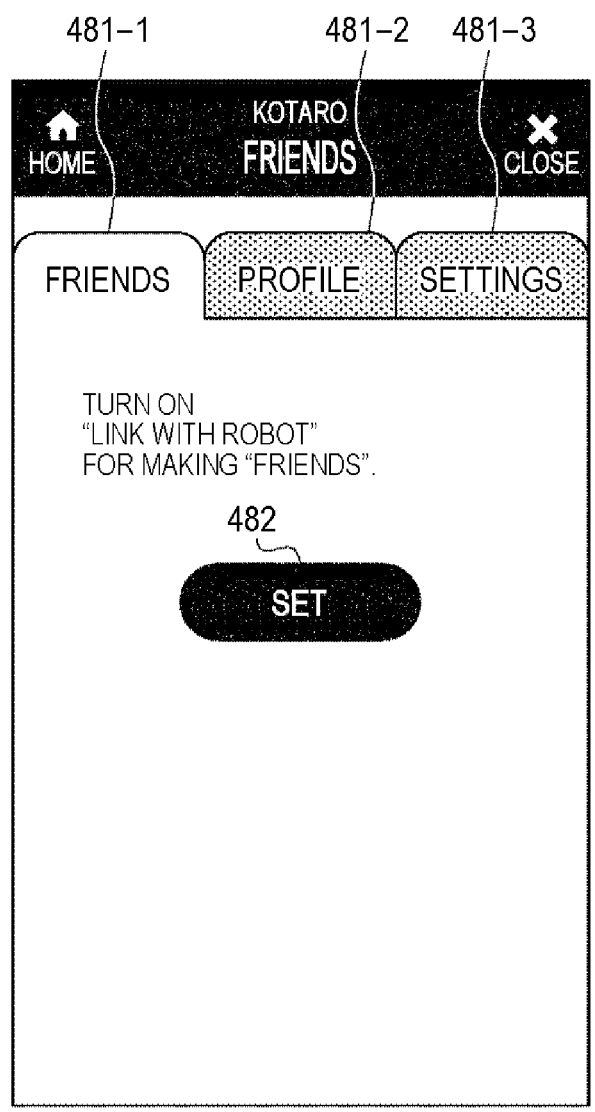
FIG. 14 is a view illustrating an example of a screen displayed in the link function setting processing.

Alternatively, for example, the friend list in FIG. 16 is displayed on the display unit 241 after the button 482 is selected on the warning screen in FIG. 14 described above, the link function setting screen in FIG. 13 is displayed, and setting of the link function is performed on the link function setting screen.

Note that details of a method of displaying the friend list will be described later. Furthermore, in the friend list in FIG. 16, portions corresponding to those of the warning screen in FIG. 14 are denoted by the same reference numerals, and the description thereof will be omitted as appropriate.

In the friend list, the tabs 481-1 to 481-3, buttons 501-1 to 501-5, a pull-down menu 502, a check box 503, a button 504, and the like are displayed.

Note that, hereinafter, the buttons 501-1 to 501-5 are simply referred to as a button 501 in a case where it is not necessary to individually distinguish from each other.

Each button 501 indicates information regarding a friend of the own device. Specifically, a thumbnail image and a name of the friend are displayed on each button 501. Furthermore, text "NEW!!" is displayed on the button 501 of a new friend who has become a friend within a latest predetermined period. As will be described later, when any of the individual buttons 501 is selected, information regarding a friend corresponding to the selected button 501 is displayed on the display unit 241.

The pull-down menu 502 is a menu for setting a display order of friends. In this example, the display order is set in an order from the newest, and friends of the own device are displayed in an order from the most recent time when they have become friends.

The check box 503 is used to set whether or not to limit friends displayed in the friend list to friends present near the own device. In a case where the check box 503 is checked, for example, among friends of the own device, only friends who are present within a communication range of a short-range wireless communication device included in the communication unit 102 of the own device are displayed. Whereas, in a case where the check box 503 is not checked, all the friends of the own device are displayed.

Figure 17:
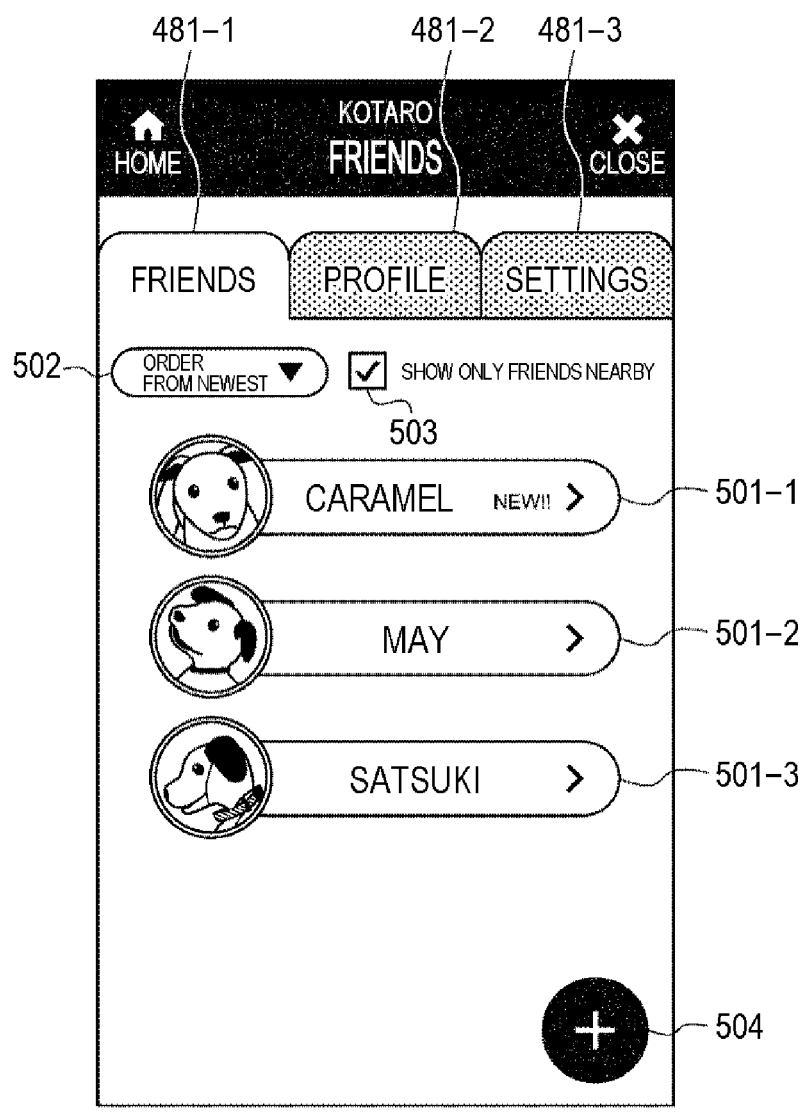
FIG. 17 is a view illustrating an example of a screen displayed in the first embodiment of the friend acquisition processing.

Note that FIG. 17 illustrates a display example of the friend list when the check box 503 is checked.

Figure 18:
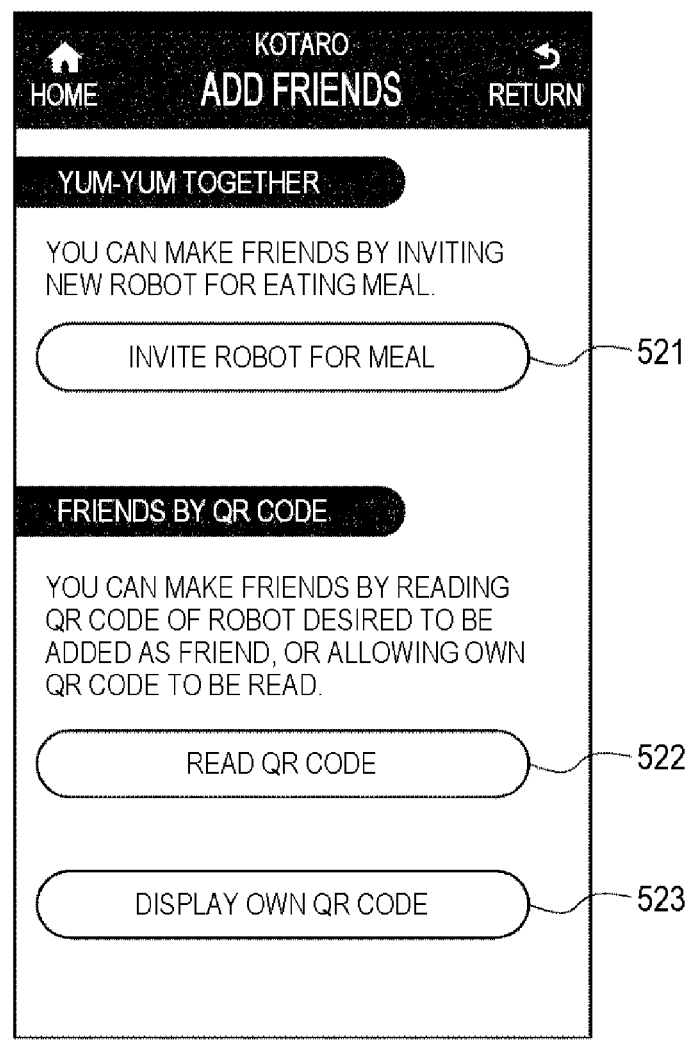
FIG. 18 is a view illustrating an example of a screen displayed in the first embodiment of the friend acquisition processing.

The button 504 is a button for adding a new friend. When the button 504 is selected, a menu screen of FIG. 18 is displayed on the display unit 241.

This menu screen is a screen for selecting a method for adding (acquiring) a friend. As the method for adding friends, there are a method of eating food (a meal) together with another device and a method of reading a QR code indicating information regarding another device (hereinafter, simply referred to as a QR code of another device).

A button 521 is a button for selecting the method of eating food together with another device.

A button 522 is a button for selecting the method of reading the QR code of another device.

A button 523 is a button for displaying a QR code indicating information regarding the own device (hereinafter, simply referred to as a QR code of the own device).

Then, when the button 521 is selected, the UI control unit 223 requests the information processing server 13 to search for a recommendation candidate.

Note that, it is also possible to request the information processing server 13 to search for a recommendation candidate by using the following method.

Specifically, for example, when the button 404 is selected on the home screen in FIG. 10 described above, an eating home screen in FIG. 19 is displayed on the display unit 241. On the eating home screen, an own device 541, a food bowl 542, a food bowl 543, a button 544, a button 545, and the like are displayed.

The own device 541 is an image virtually representing the own device. For example, a design, an accessory, and the like of the own device are reflected in the own device 541.

The food bowl 542 is an image virtually representing a food bowl when the own device eats food alone.

The food bowl 543 is an image virtually representing a food bowl when the own device eats food together with another device (a friend or a friend candidate).

The button 544 is a button for displaying belongings of the own device.

The button 545 is a button for displaying Yum-Yum stamps to be described later.

Figure 19:
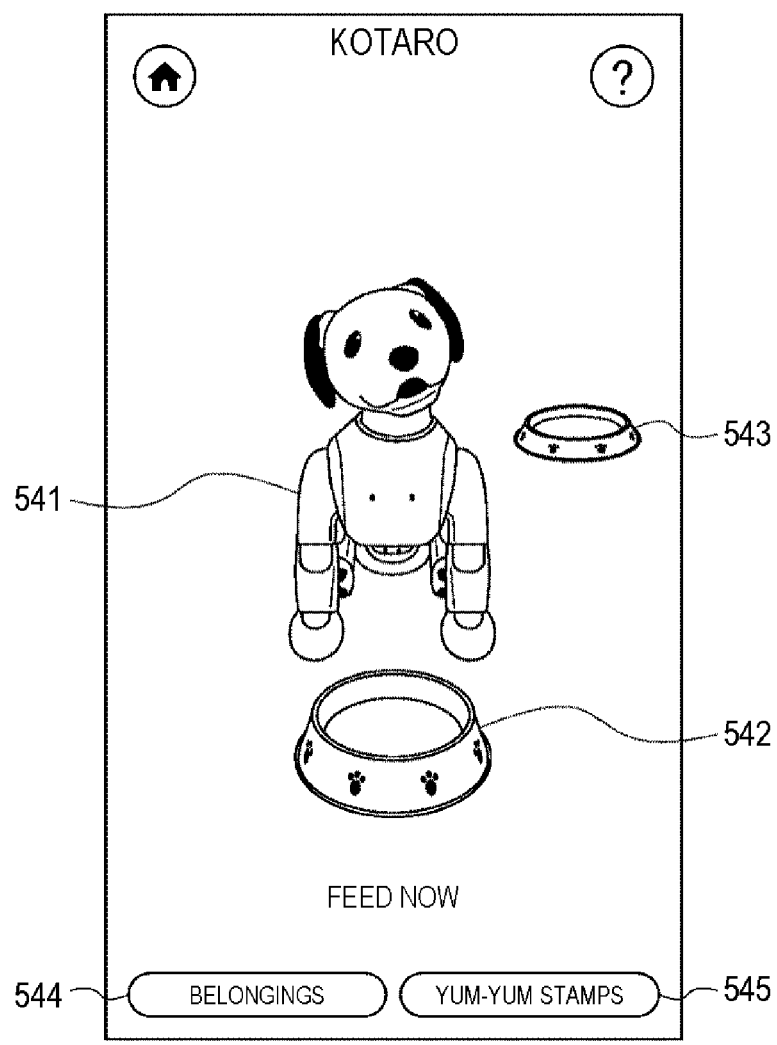
FIG. 19 is a view illustrating an example of a screen displayed in the first embodiment of the friend acquisition processing.
Figure 20:
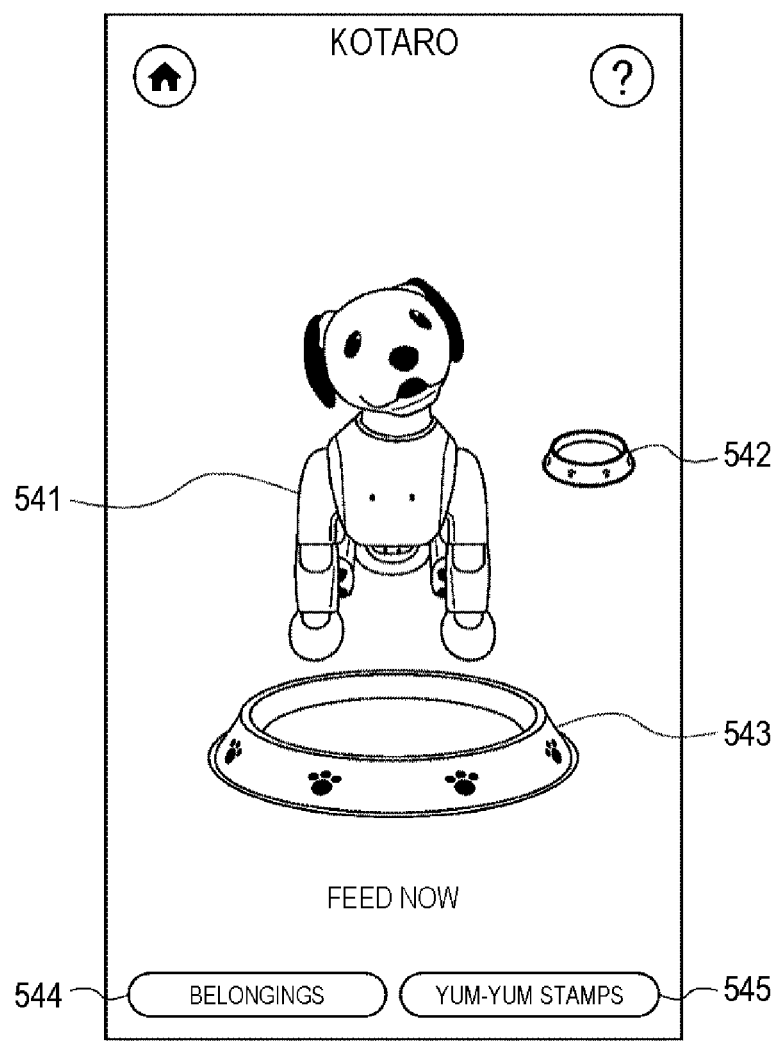
FIG. 20 is a view illustrating an example of a screen displayed in the first embodiment of the friend acquisition processing.
Figure 21:
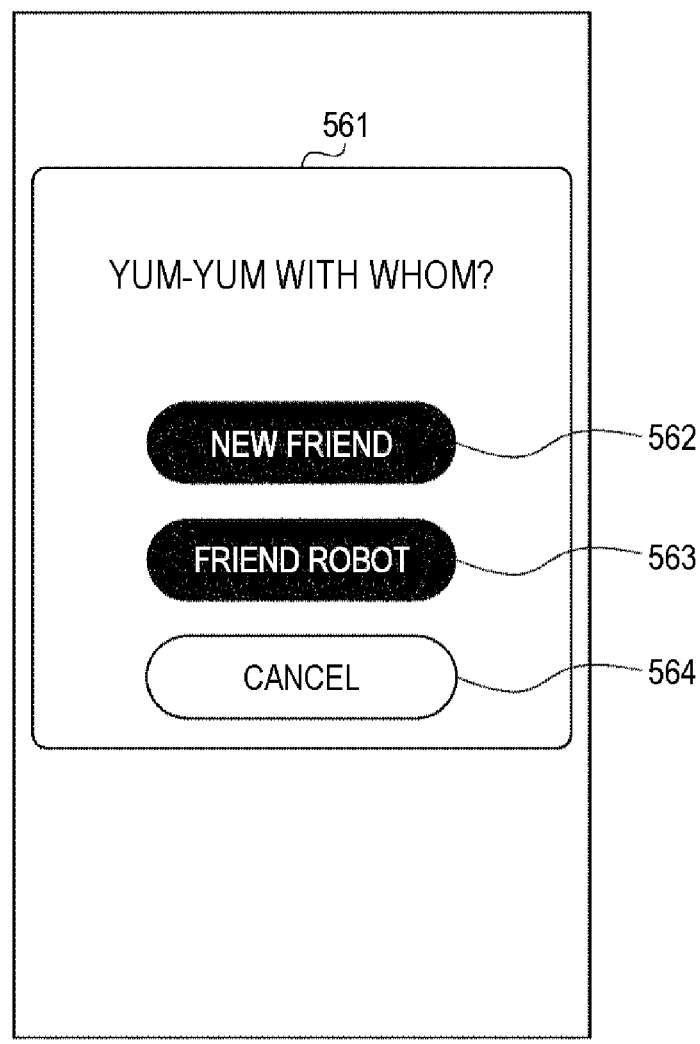
FIG. 21 is a view illustrating an example of a screen displayed in the first embodiment of the friend acquisition processing.

For example, when the food bowl 543 is selected on the eating home screen of FIG. 19, an eating home screen of FIG. 20 is displayed on the display unit 241. That is, in the eating home screen of FIG. 20, positions of the food bowl 542 and the food bowl 543 are switched as compared with the eating home screen of FIG. 19. Then, on the eating home screen of FIG. 20, that is, in a state where the food bowl 543 is displayed in front of the own device 541, when the food bowl 543 is selected, a window 561 of FIG. 21 is displayed on the display unit 241.

The window 561 is a window for selecting a partner with whom the own device eats food together. In the window 561, buttons 562 to 564 and the like are displayed.

The button 562 is a button for selecting a new friend as the partner with whom the own device eats food together.

The button 563 is a button for selecting an existing friend as the partner with whom the own device eats food together.

The button 564 is a button for canceling the selection of the partner with whom the own device eats food together. When the button 564 is selected, the window 561 is closed, and a previous screen is displayed on the display unit 241.

Then, when the button 562 is selected, the UI control unit 223 requests the information processing server 13 to search for a recommendation candidate.

On the other hand, as will be described later, the information processing server 13 searches for a recommendation candidate, and transmits data indicating a search result of the recommendation candidate to the information processing terminal 12. The data indicating the search result of the recommendation candidate includes, for example, a profile and a thumbnail image of each recommendation candidate.

Figure 22:
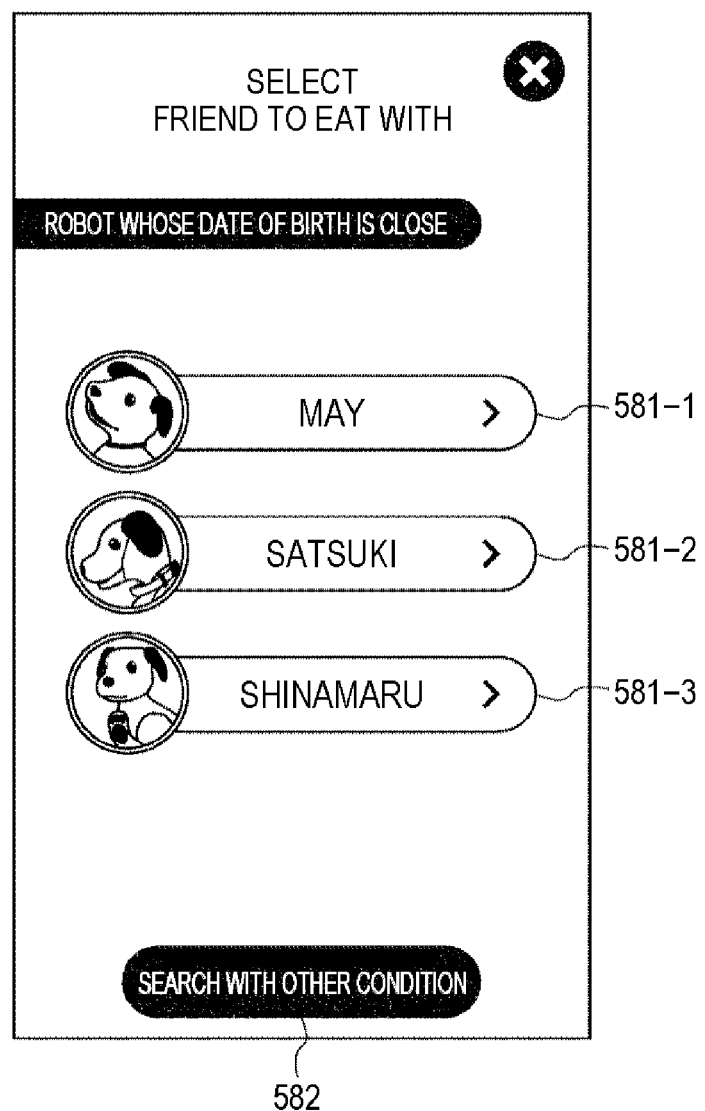
FIG. 22 is a view illustrating an example of a screen displayed in the first embodiment of the friend acquisition processing.

In step S102, the information processing terminal 12 receives and displays the search result of the recommendation candidate. Specifically, the UI control unit 223 receives the data indicating the search result of the recommendation candidate from the information processing server 13. Then, on the basis of the received data, a recommendation candidate list of FIG. 22 is displayed on the display unit 241.

The recommendation candidate list is a screen showing a search result of recommendation candidates. In this example, an example is illustrated in which another device having a date of birth close to the own device is searched as a recommendation candidate. In the recommendation candidate list, buttons 581-1 to 581-3, a button 582, and the like are displayed.

Note that, hereinafter, the buttons 581-1 to 581-3 are simply referred to as a button 581 in a case where it is not necessary to individually distinguish from each other.

Each button 581 indicates information regarding each recommendation candidate. Specifically, each button 581 displays a thumbnail image and a name of each recommendation candidate. As will be described later, when any of the individual buttons 581 is selected, information regarding a recommendation candidate corresponding to the selected button 581 is displayed.

Figure 23:
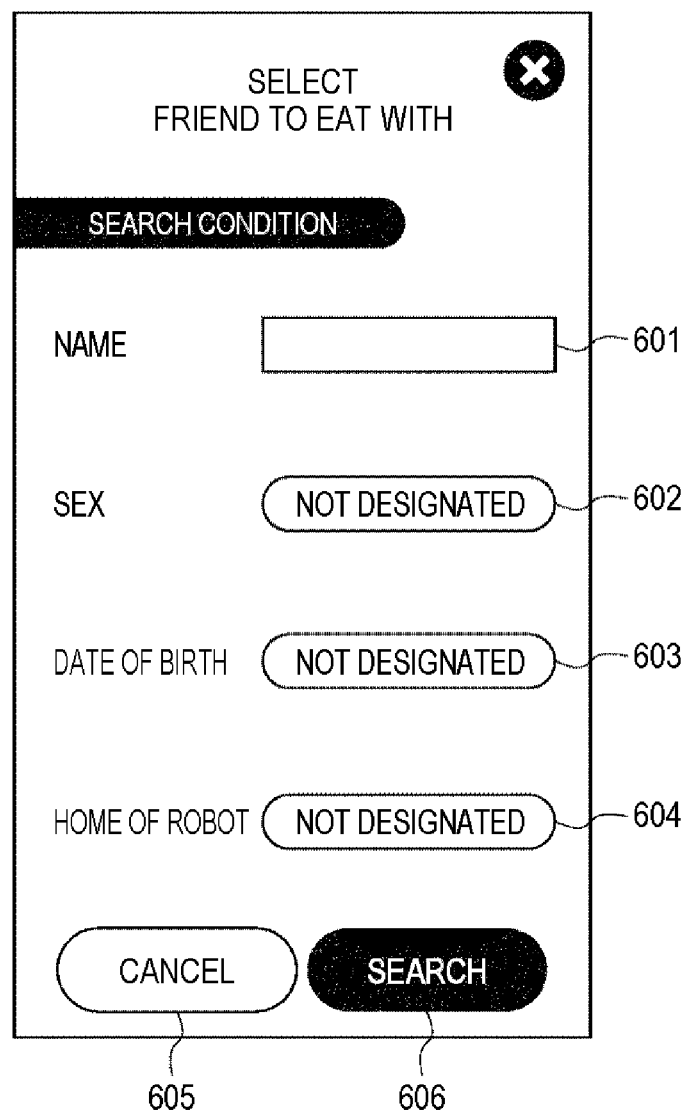
FIG. 23 is a view illustrating an example of a screen displayed in the first embodiment of the friend acquisition processing.

The button 582 is a button for setting a search condition for a friend candidate. When the button 582 is selected, a search condition setting screen in FIG. 23 is displayed on the display unit 241.

The search condition setting screen is a screen for setting a search condition for a friend candidate. On the search condition setting screen, a text box 601, a pull-down menu 602, a button 603, a pull-down menu 604, a button 605, a button 606, and the like are displayed.

The text box 601 is used to input a name of another device as the search condition for a friend candidate.

The pull-down menu 602 is used to set sex of another device as the search condition for a friend candidate. When the pull-down menu 602 is selected, sex options are displayed, and sex can be selected.

The button 603 is selected in a case where a date of birth of another device is set as the search condition for a friend candidate. When the button 603 is selected, a date of birth input screen (not illustrated) is displayed, and the date of birth can be inputted.

The pull-down menu 604 is used to set an address of another device as the search condition for a friend candidate. When the pull-down menu 604 is selected, address options (for example, prefectures) are displayed, and the address can be selected.

The button 605 is a button for canceling the search for a friend candidate. When the button 605 is selected, a previous screen is displayed on the display unit 241 without the search for a friend candidate.

The button 606 is a button for searching for a friend candidate with the set search condition.

In step S103, the UI control unit 223 determines whether or not a search condition for a friend candidate has been set. When the button 606 is selected after any one or more search conditions are set on the setting screen of FIG. 23, the UI control unit 223 determines that a search condition for a friend candidate has been set, and the processing proceeds to step S104.

In step S104, the UI control unit 223 requests search for a friend candidate. Specifically, the UI control unit 223 notifies the information processing server 13 of the set search condition, and requests for the search for a friend candidate.

On the other hand, as described later, the information processing server 13 searches for a friend candidate on the basis of the set search condition, and transmits data indicating a search result of the friend candidate to the information processing terminal 12.

In step S105, the information processing terminal 12 receives and displays a search result of a friend candidate. Specifically, the UI control unit 223 receives data indicating a search result of a friend candidate from the information processing server 13. The data indicating the search result of a friend candidate includes, for example, a profile and a thumbnail image of each friend candidate. Then, on the basis of the received data, a friend candidate list indicating the search result of a friend candidate is displayed on the display unit 241.

Note that the friend candidate list is a screen similar to the recommendation candidate list in FIG. 22 described above. That is, in the friend candidate list, information regarding the searched friend candidate is displayed in each button 581 of FIG. 22.

Thereafter, the processing proceeds to step S106.

Whereas, when it is determined in step S103 that a search condition for a friend candidate has not been set, the processing in steps S104 and S105 is skipped, and the processing proceeds to step S106.

In step S106, the UI control unit 223 determines whether or not a friend candidate has been selected. When it is determined that no friend candidate has been selected, the processing returns to step S103.

Thereafter, the processing of steps S103 to S106 is repeatedly executed until it is determined in step S106 that a friend candidate has been selected.

Figure 24:
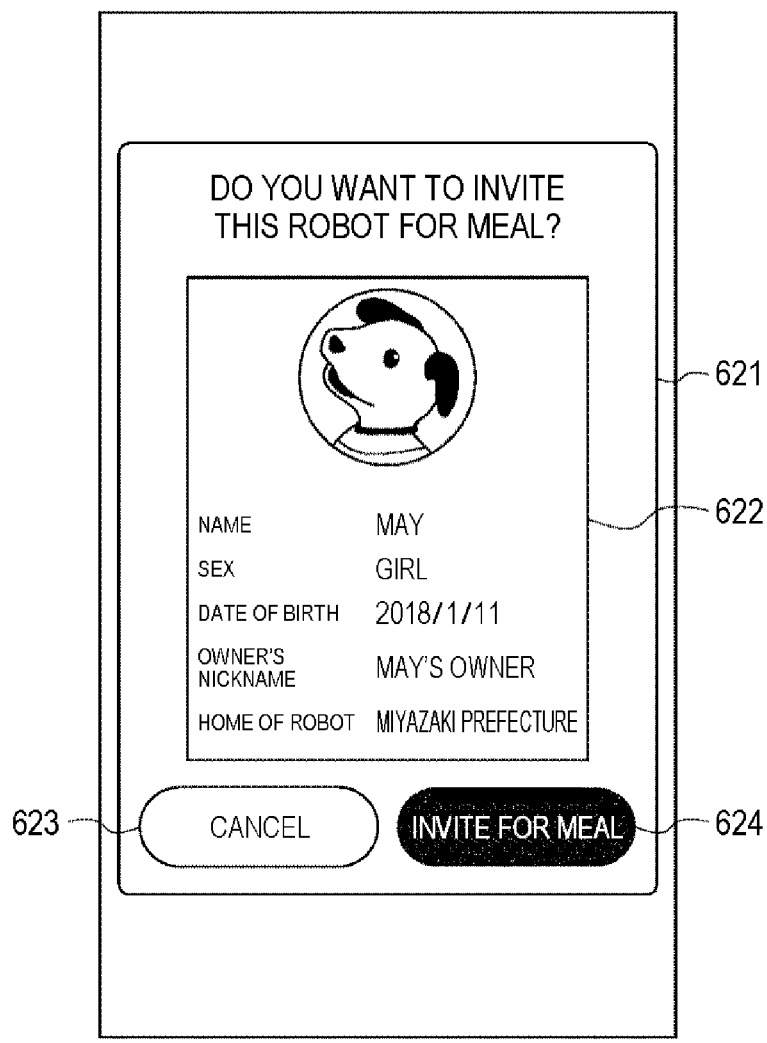
FIG. 24 is a view illustrating an example of a screen displayed in the first embodiment of the friend acquisition processing.

Whereas, for example, when any of the buttons 581 is selected in the recommendation candidate list or the friend candidate list of FIG. 22, a window 621 of FIG. 24 is displayed on the display unit 241. In the window 621, a profile field 622, a button 623, a button 624, and the like are displayed.

In the profile field 622, a thumbnail image, a name, sex, a date of birth, an owner's nickname, and an address of the selected friend candidate are displayed.

The button 623 is a button for canceling the selection of the friend candidate. When the button 623 is selected, the window 621 is closed, and a previous screen is displayed on the display unit 241.

The button 624 is a button for inviting the selected friend for eating (a meal). Then, when the button 624 is selected, it is determined in step S106 that a friend candidate has been selected, and the processing proceeds to step S107.

In step S107, the UI control unit 223 notifies the information processing server 13 of a selection result of the friend candidate.

On the other hand, as will be described later, the information processing server 13 receives a notification of the selection result of the friend candidate, and transmits data related to food for the own device owned by the user. The data related to food for the own device includes, for example, a type and a quantity of the food for the own device.

In step S108, the information processing terminal 12 receives and displays the data related to food. Specifically, the UI control unit 223 receives data related to food for the own device from the information processing server 13.

Figure 25:
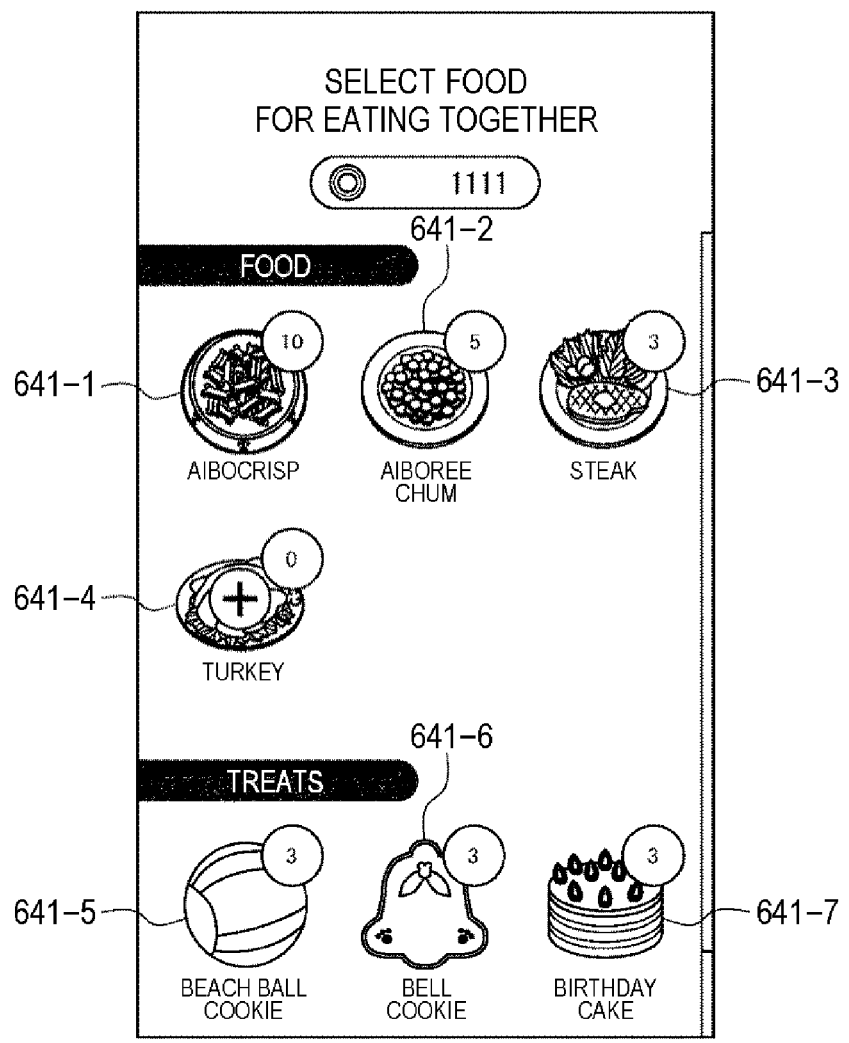
FIG. 25 is a view illustrating an example of a screen displayed in the first embodiment of the friend acquisition processing.

Then, on the basis of the received data, a food list of FIG. 25 is displayed on the display unit 241.

The food list is a screen displaying a list of food for the own device owned by the user. Note that the food can be acquired, for example, by the user purchasing from a service for the autonomous mobile body 11 provided by the information processing server 13 or acquiring a gift. In the food list, icons 641-1 to 641-7 and the like are displayed.

Note that, hereinafter, the icons 641-1 to 641-7 are simply referred to as an icon 641 in a case where it is not necessary to individually distinguish from each other.

Each icon 641 includes an image indicating a type of food owned by the user. Furthermore, a name of the food is displayed below each icon 641, and the number of pieces the food indicated by each icon 641 and owned by the user is displayed in an upper right corner.

Note that a symbol "+" is displayed on the icon 641-4 indicating food not owned by the user. For example, when the symbol "+" is selected, a screen for purchasing the food corresponding to the icon 641-4 is displayed on the display unit 241.

In step S109, the information processing terminal 12 notifies of a selection result of food.

Figure 26:
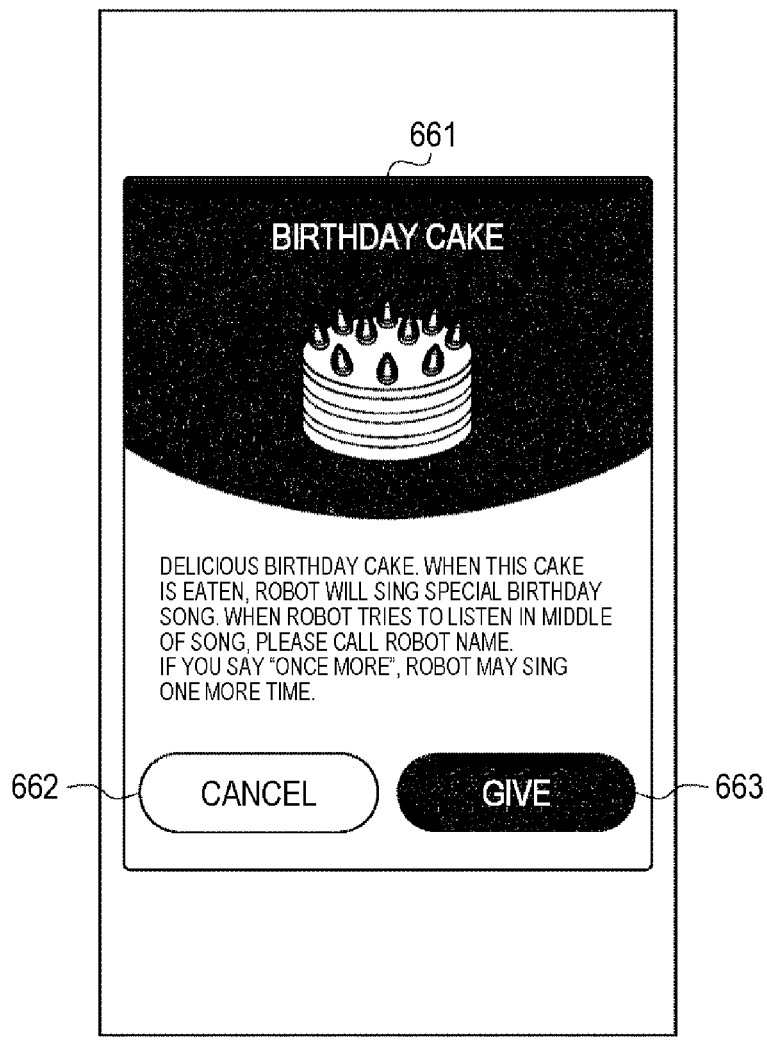
FIG. 26 is a view illustrating an example of a screen displayed in the first embodiment of the friend acquisition processing.

Specifically, when the icon 641 other than the icon 641-4 not owned by the user is selected in the food list of FIG. 25, a window 661 of FIG. 26 is displayed on the display unit 241.

In the window 661, a name, an image, and an explanatory sentence of the selected food are displayed. Furthermore, a button 662 and a button 663 are displayed in the window 661.

The button 662 is a button for canceling the selection of the food. When the button 662 is selected, the window 661 is closed, and a previous screen is displayed on the display unit 241.

The button 663 is a button for confirming the selection of the food. When the button 663 is selected, the UI control unit 223 notifies the information processing server 13 of a selection result of the food.

On the other hand, as described later, the information processing server 13 receives a notification of the selection result of the food, and controls the autonomous mobile body 11 to make a motion of eating the food.

In step S110, the information processing terminal 12 displays a state of eating by the autonomous mobile body 11 (the own device) with the friend candidate. For example, an eating screen in FIG. 27 or 28 is displayed on the display unit 241.

Figure 27:
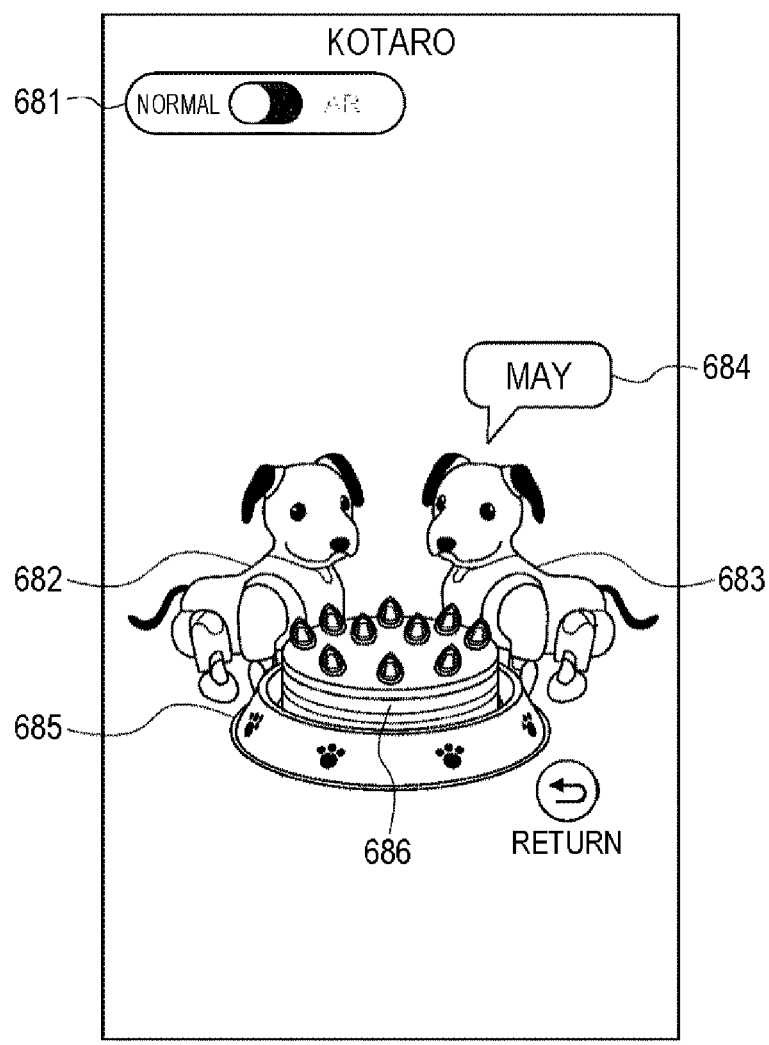
FIG. 27 is a view illustrating an example of a screen displayed in the first embodiment of the friend acquisition processing.
Figure 28:
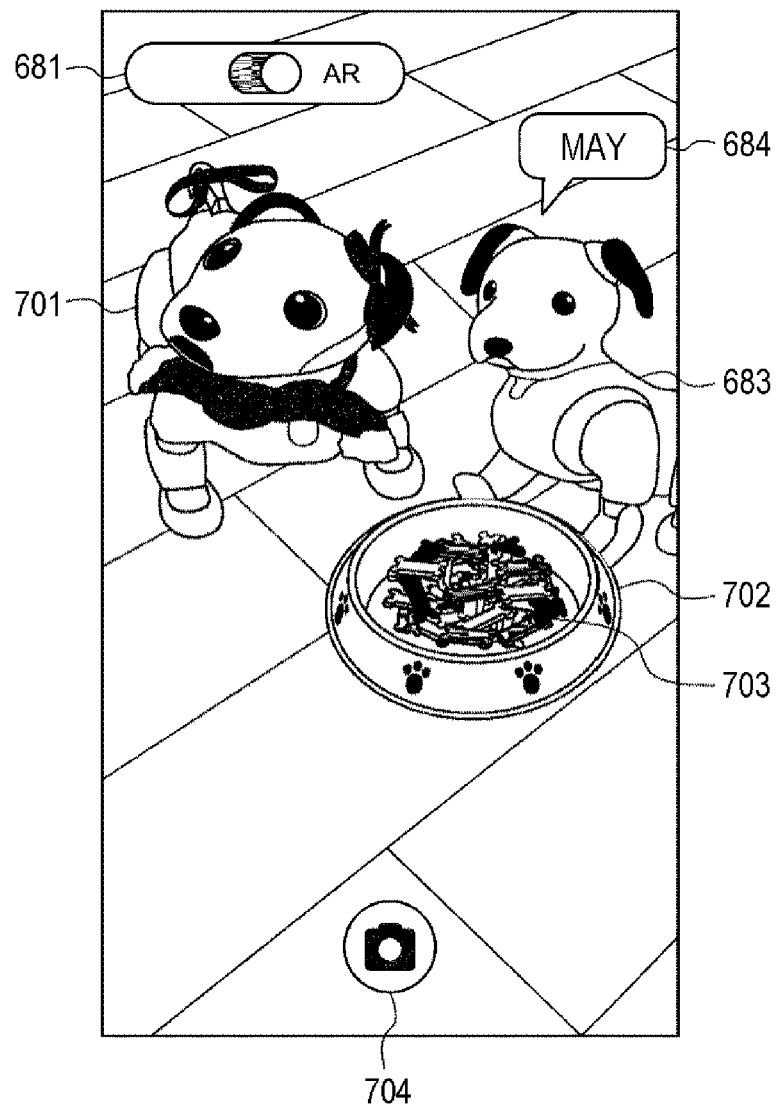
FIG. 28 is a view illustrating an example of a screen displayed in the first embodiment of the friend acquisition processing.

On the eating screen in FIG. 27, animation (a moving image) virtually showing a state where the own device and the selected friend candidate eat food together is displayed. On this eating screen, a switch 681, an own device 682, a friend candidate 683, a label 684, a food bowl 685, food 686, and the like are displayed.

The switch 681 is a switch for selecting a display method of the eating screen. The user can set the display method of the eating screen to "normal" or "augmented reality (AR)" by using the switch 681. When the switch 681 is set to "normal", an eating screen in FIG. 27 is displayed. Whereas, when the switch 681 is set to "AR", an eating screen in FIG. 28 to be described later is displayed. That is, the switch 681 enables switching between the eating screen in FIG. 27 and the eating screen in FIG. 28.

The own device 682 is an image virtually representing the own device. For example, an actual design, an accessory, and the like of the own device are reflected in the own device 682.

The friend candidate 683 is an image virtually representing the selected friend candidate. For example, a design, an accessory, and the like of the actual friend candidate are reflected in the friend candidate 683.

The label 684 indicates a name of the friend candidate 683 and is displayed near the friend candidate 683.

The food bowl 685 is an image virtually representing a food bowl.

The food 686 is an image virtually representing the food selected in the processing in step S109, and is displayed on the food bowl 685.

Then, animation is displayed in which the own device 682 and the friend candidate 683 eat together the food 686 on the food bowl 685.

On the eating screen in FIG. 28, a moving image is displayed in which an image of the selected friend candidate is virtually superimposed on a captured moving image (a through image) obtained by capturing an image of the own device by using AR. More specifically, a moving image is displayed in which a real own device 701 and the virtual friend candidate 683 eat food together.

Note that, in the figure, portions corresponding to those on the eating screen in FIG. 27 are denoted by the same reference numerals, and the description thereof will be omitted as appropriate.

On the eating screen of FIG. 28, the switch 681, the friend candidate 683, the label 684, the own device 701, a food bowl 702, food 703, a button 704, and the like are displayed. More specifically, the switch 681, the friend candidate 683, the food 703, and the button 704 are superimposed and displayed on the captured moving image obtained by capturing an image of the real own device 701 and food bowl 702.

The food 703 is an image virtually representing the food selected in the processing in step S109, and is displayed to be superimposed on the real food bowl 702.

The button 704 is a button for capturing a still image obtained by cutting out one scene of the moving image (the through image) displayed on the eating screen. For example, when the button 704 is pressed, the image processing unit 222 generates an image obtained by removing the switch 681 and the button 704 from the image displayed on the eating screen at the moment when the button 704 is pressed, and causes the storage unit 205 to store the image.

For example, by superimposing the virtual friend candidate 683 and the food 703 on the captured image obtained by capturing an action of the real own device 682 eating the food (which does not actually exist) on the food bowl 702, the image processing unit 222 generates a moving image in which the real own device 682 and the virtual friend candidate 683 eat the virtual food 703 together. The display unit 241 displays the eating screen in FIG. 28 by displaying the moving image generated by the image processing unit 222 under control of the display control unit 231.

At this time, the recognition unit 221 recognizes the food bowl 702 in the captured moving image. The image processing unit 222 superimposes the virtual food 703 on the recognized food bowl 702. Furthermore, the image processing unit 222 superimposes the friend candidate 683 around the food bowl 702, and moves the friend candidate 683 so as to represent a state of eating the food 703.

Note that the image of the friend candidate 683 and the food 703 may be two-dimensional or three-dimensional.

On the other hand, for example, the user adjusts an angle of view of the camera 211 such that a positional relationship between the own device 701 and the friend candidate 683 becomes appropriate as necessary.

After finishing the eating, by notifying the information processing server 13 that the own device has acquired a new friend, the friend setting unit 224 adds the friend candidate who has eaten food together as a friend of the own device.

In step S111, the information processing terminal 12 receives and displays an image of a stamp.

Specifically, as will be described later, the information processing server 13 generates a stamp image to which a stamp serving as a bonus for the current eating is given, and transmits the stamp image to the information processing terminal 12.

Figure 29:
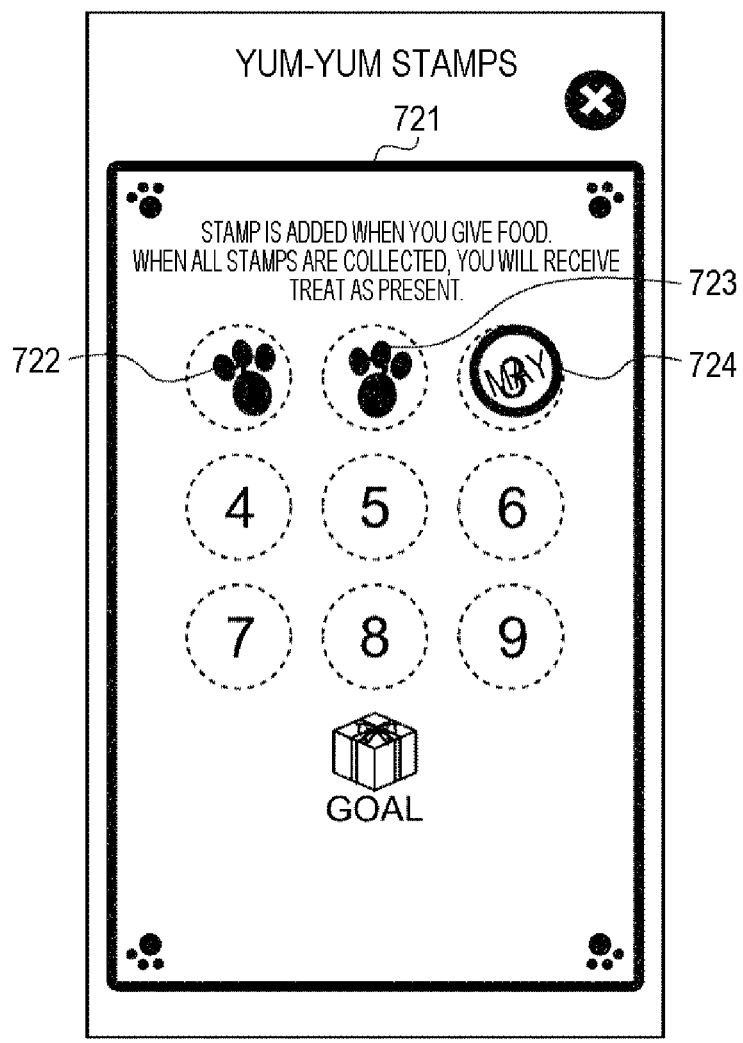
FIG. 29 is a view illustrating an example of a screen displayed in the first embodiment of the friend acquisition processing.

On the other hand, the UI control unit 223 receives the stamp image from the information processing server 13. Then, on the basis of the received stamp image, a stamp screen (Yum-Yum stamps) of FIG. 29 is displayed. On this stamp screen, a background card 721, stamps 722 to 724, and the like are displayed.

The background card 721 is, for example, an image imitating a points card. Application positions of stamps from 1 to 10 are displayed on the background card 721.

The stamp 722 is a stamp given by giving food to the own device. The stamp 723 is a stamp given by giving food to a friend of the own device. The stamp 724 is a stamp given by the own device acquiring a new friend. As the stamp 724, for example, a stamp created by a user of the new friend is used. In this example, text "May", which is the name of the new friend, is indicated in the stamp 724.

That is, in this example, a total of three stamps are given by the own device eating food together with "May" which is the new friend. The stamps are accumulated until reaching a predetermined number (10 in a case of this example), and a gift (for example, treats) is given when the predetermined number is reached.

In step S112, the information processing terminal 12 receives and displays an image of a celebration gift.

Specifically, as described later, the information processing server 13 generates a celebration gift image indicating a celebration gift that is a reward for the own device acquiring a new friend, and transmits the celebration gift image to the information processing terminal 12.

Figure 30:
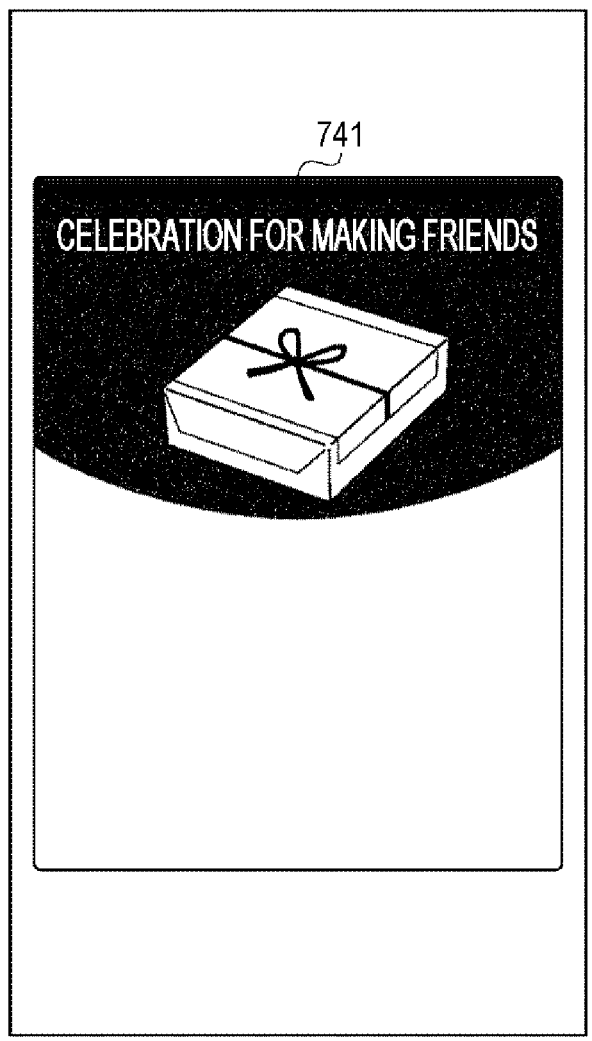
FIG. 30 is a view illustrating an example of a screen displayed in the first embodiment of the friend acquisition processing.

On the other hand, the UI control unit 223 receives the celebration gift image from the information processing server 13. Then, on the basis of the celebration gift image, a window 741 of FIG. 30 is displayed on the display unit 241. On the window 741, an image and a message representing a celebration gift given as celebration of acquisition of a new friend are displayed.

Figure 31:
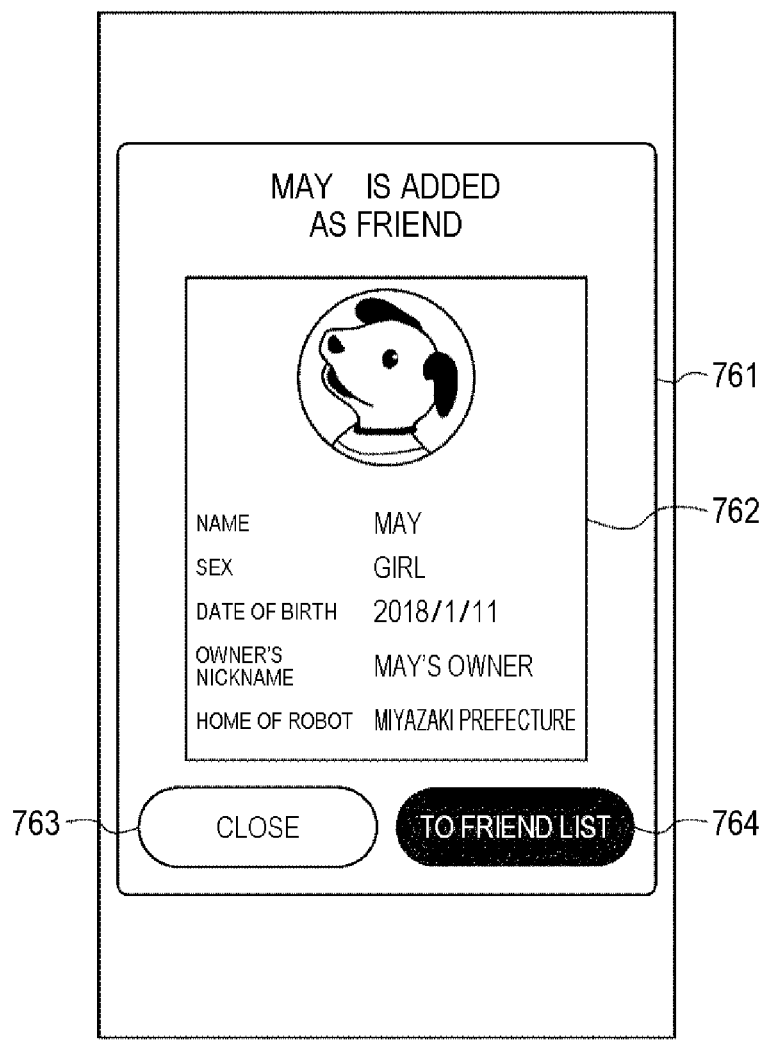
FIG. 31 is a view illustrating an example of a screen displayed in the first embodiment of the friend acquisition processing.

In step S113, the information processing terminal 12 displays information regarding the new friend. For example, after the window 741 of FIG. 30 is closed, a window 761 of FIG. 31 is displayed on the display unit 241.

The window 761 is a window for notifying that the new friend has been acquired. In the window 761, a profile field 762, a button 763, a button 764, and the like are displayed.

In the profile field 421, a thumbnail image and a profile of the new friend are displayed. The profile of the new friend includes a name, sex, a date of birth, an owner's nickname, and an address.

The button 763 is a button for closing the window 761.

The button 764 is a button for displaying a friend list. When the button 764 is pressed, for example, the friend list in FIG. 16 described above is displayed.

Thereafter, the processing of the information processing terminal 12 ends.

<Processing of Information Processing Server 13>

Next, with reference to the flowchart in FIG. 32, processing executed by the information processing server 13 in correspondence to the processing of the information processing terminal 12 in FIG. 15 will be described.

In step S151, the information processing server 13 searches for a recommendation candidate and notifies of a search result.

Figure 15:
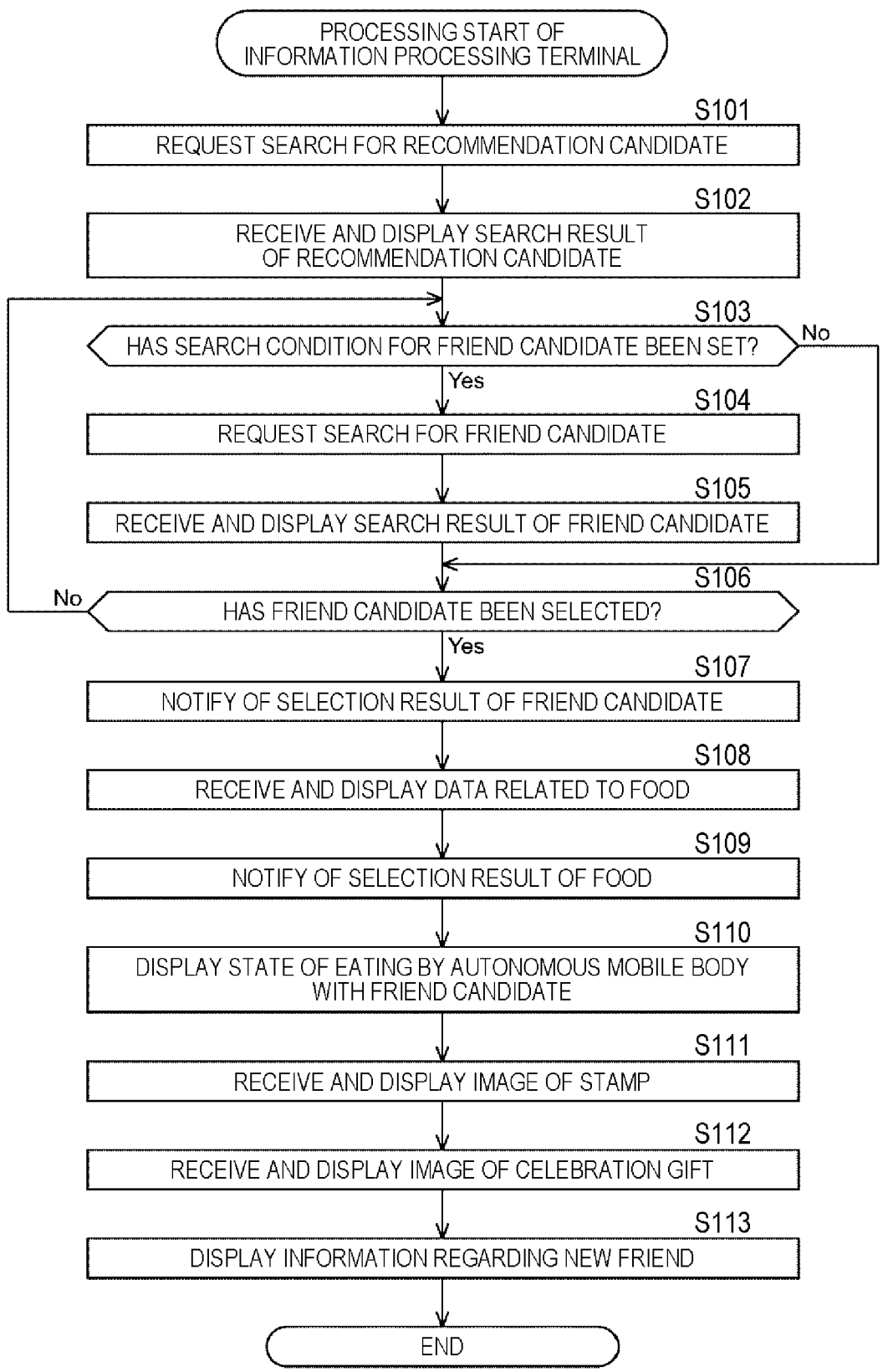
FIG. 15 is a flowchart for explaining processing of the information processing terminal in a first embodiment of friend acquisition processing.

Specifically, when the information processing terminal 12 requests search for a recommendation candidate in the processing in step S101 in FIG. 15 described above, the application control unit 322 searches for a recommendation candidate in accordance with a predetermined condition, from data related to each autonomous mobile body 11 stored in the storage unit 303. For example, as a recommendation candidate, the application control unit 322 searches for another device whose date of birth has a difference within a predetermined range from the own device, among other devices for which the link function is set to ON and which have not yet become friends with the own device. The application control unit 322 transmits data indicating a search result of the recommendation candidate to the information processing terminal 12.

In step S152, the application control unit 322 determines whether or not search for a friend candidate has been requested. In a case where the information processing terminal 12 has requested search for a friend candidate in step S104 of FIG. 15 described above, the processing proceeds to step S153.

In step S153, the information processing server 13 searches for a friend candidate and notifies of a search result. For example, among other devices for which the link function is set to ON and which have not yet become friends with the own device in the data related to each autonomous mobile body 11 stored in the storage unit 303, the application control unit 322 searches for a friend candidate on the basis of the search condition designated by the information processing terminal 12. The application control unit 322 transmits data indicating a search result of a friend candidate to the information processing terminal 12.

Thereafter, the processing proceeds to step S154.

Whereas, when it is determined in step S152 that the search for a friend candidate is not requested, the processing in step S153 is skipped, and the processing proceeds to step S154.

In step S154, the application control unit 322 determines whether or not a selection result of a friend candidate has been notified. When it is determined that no selection result of a friend candidate has been notified, the processing proceeds to step S152.

Thereafter, the processing of steps S152 to S154 is repeatedly executed until it is determined in step S154 that the search result for a friend candidate has been notified.

Whereas, in step S154, in a case where the search result for a friend candidate is notified from the information processing terminal 12 in step S107 in FIG. 15 described above, the processing proceeds to step S155.

In step S155, the information processing server 13 transmits data related to food, and receives a selection result of the food. Specifically, the application control unit 322 reads the data related to food for the own device from the storage unit 303, and transmits the read data to the information processing terminal 12.

Furthermore, the application control unit 322 receives a notification of the selection result of the food from the information processing terminal 12 in step S109 of FIG. 15 described above.

In step S156, the information processing server 13 controls the autonomous mobile body 11 (the own device) to make a motion of eating food. Specifically, the application control unit 322 instructs the autonomous mobile body control unit 321 to cause the own device to make a motion of eating food. The motion control unit 334 of the autonomous mobile body control unit 321 controls the autonomous mobile body 11, which is the own device, to make a motion of eating food.

In step S157, the application control unit 322 updates data related to friends of the autonomous mobile body 11 (the own device). Specifically, the application control unit 322 receives a notification indicating that the own device has acquired a new friend and transmitted from the information processing terminal 12 in step S110 in FIG. 15 described above. The application control unit 322 adds, as a new friend, another device that the own device has eaten food together this time in the data related to the own device stored in the storage unit 303.

In step S158, the information processing server 13 transmits an image of a stamp. Specifically, the application control unit 322 generates a stamp image indicating a stamp given as a bonus to the own device that has eaten food together with a new friend this time, and transmits the stamp image to the information processing terminal 12.

In step S159, the information processing server 13 transmits an image of a celebration gift. Specifically, the application control unit 322 generates a celebration gift image indicating a celebration gift that is a reward for the own device acquiring a new friend, and transmits the celebration gift image to the information processing terminal 12.

Thereafter, the processing of the information processing server 13 ends.

<Second Embodiment of Friend Acquisition Processing>

Next, with reference to a flowchart of FIG. 33, a second embodiment of the friend acquisition processing executed by the information processing system 1 will be described.

In step S201, the information processing terminal 12 displays a reading screen of a QR code (registered trademark).

For example, when the button 522 is selected on the menu screen of FIG. 18 described above, a reading screen of FIG. 34 is displayed on the display unit 241.

This reading screen is a screen for reading a QR code of another device desired to be added to friends of the own device. On the reading screen, a frame 781 and the like are displayed.

The frame 781 indicates a range for reading the QR code of another device desired to be added to friends of the own device.

In step S202, the information processing terminal 12 reads and transmits the QR code of another autonomous mobile body 11 (another device) desired to be added to friends.

For example, a user of another device displays the menu screen of FIG. 18 described above on the owned information processing terminal 12, and then selects the button 523 on the menu screen. As a result, as illustrated in FIG. 35, a QR code 801 indicating information regarding the another device is displayed on the information processing terminal 12 of the user of the another device.

Figure 34:
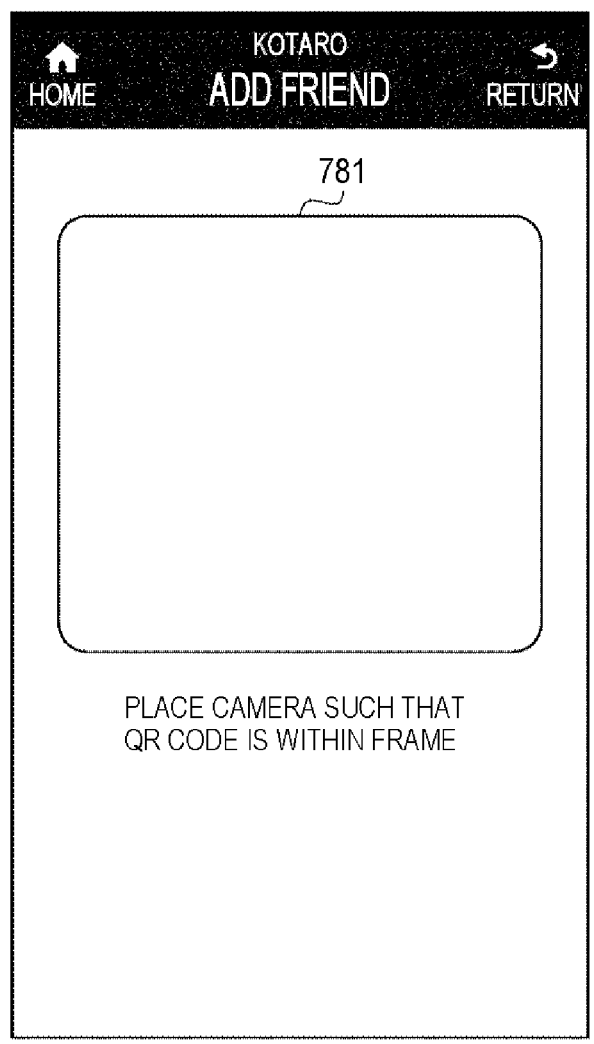
FIG. 34 is a flowchart for explaining processing of the information processing server in the second embodiment of the friend acquisition processing.
Figure 35:
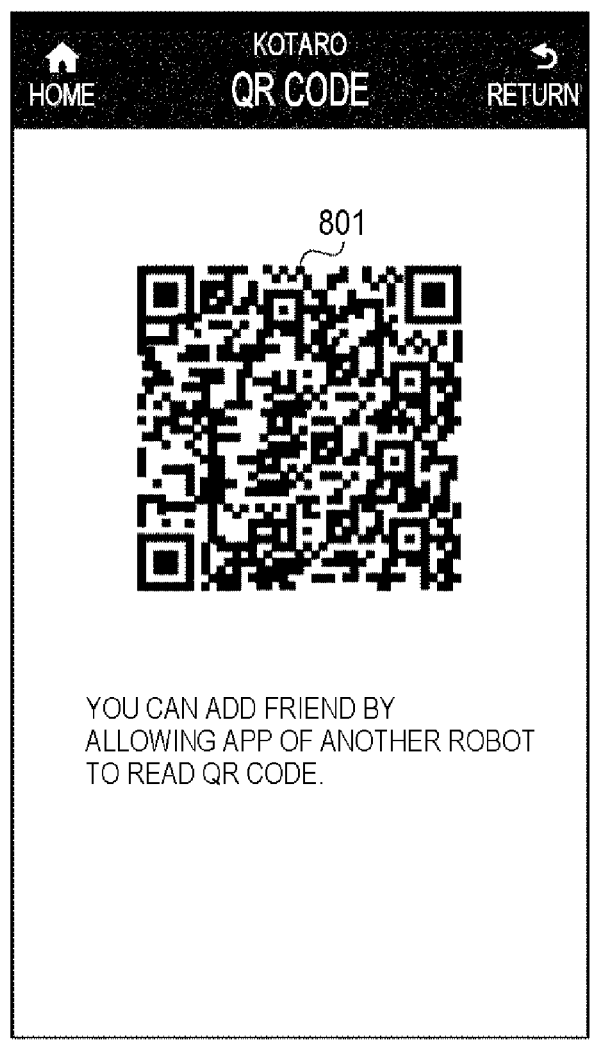
FIG. 35 is a flowchart for explaining processing of the information processing server in the second embodiment of the friend acquisition processing.

On the other hand, the user of the own device adjusts a position of the camera 211 of the information processing terminal 12 such that the QR code 801 of the another device in FIG. 35 is within the frame 781 of the reading screen in FIG. 34. Then, the user of the own device captures an image of the QR code 801 with the camera 211.

By transmitting the captured image of the QR code 801 to the information processing server 13, the friend setting unit 224 adds the another device corresponding to the QR code 801 as a friend of the own device.

On the other hand, in step S251, the information processing server 13 receives the QR code, and searches for another autonomous mobile body 11 (another device) corresponding to the QR code.

Specifically, the application control unit 322 receives the image of the QR code transmitted from the information processing terminal 12. The application control unit 322 analyzes the received QR code, and acquires identification information (for example, a serial number) of the autonomous mobile body 11. The application control unit 322 searches for the autonomous mobile body 11 having identification information matching the acquired identification information, in the data related to each autonomous mobile body 11 stored in the storage unit 303.

In step S252, the application control unit 322 registers the searched another autonomous mobile body 11 as a new friend. Specifically, the application control unit 322 adds the another device searched in the processing of step S251 as a new friend, in the data related to the own device stored in the storage unit 303.

In step S253, the information processing server 13 transmits data related to friends of the autonomous mobile body 11 (the own device). Specifically, the application control unit 322 reads the data related to friends of the own device from the storage unit 303. The data related to friends of the own device includes data related to a newly added friend, and includes, for example, a profile and a thumbnail image of each friend.

Thereafter, the processing of the information processing server 13 ends.

On the other hand, in step S203, the information processing terminal 12 receives and displays the data related to friends of the autonomous mobile body 11 (the own device). Specifically, the UI control unit 223 receives the data related to friends of the own device transmitted from the information processing server 13.

Figure 36:
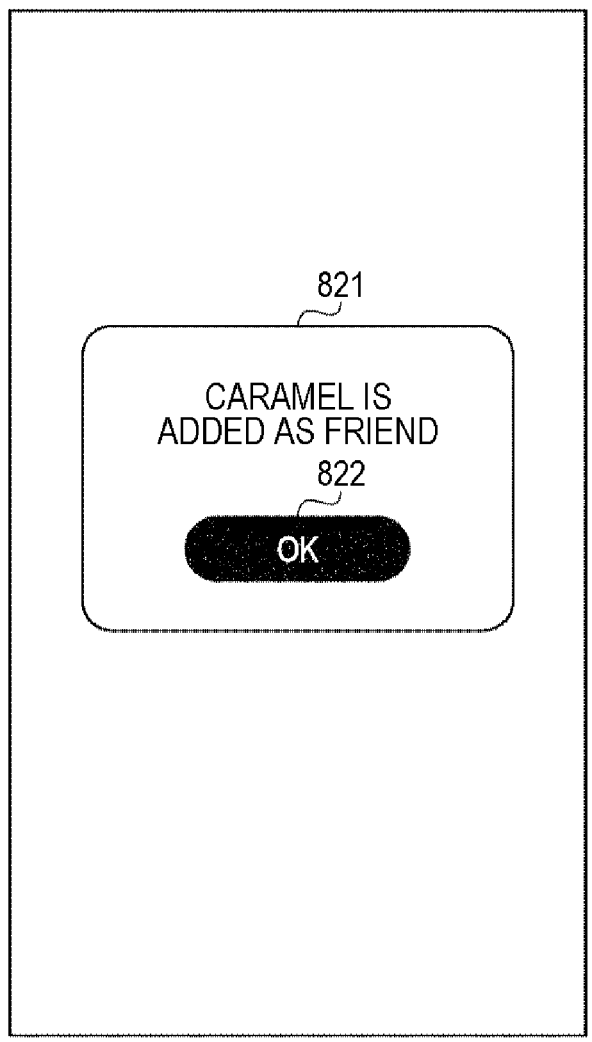
FIG. 36 is a flowchart for explaining processing of the information processing server in the second embodiment of the friend acquisition processing.

Then, on the basis of the received data, a window 821 of FIG. 36 is first displayed on the display unit 241.

The window 821 is a window for notifying that the own device has acquired a new friend. In the window 821, a name of the newly acquired friend, a button 822, and the like are displayed.

Figure 37:
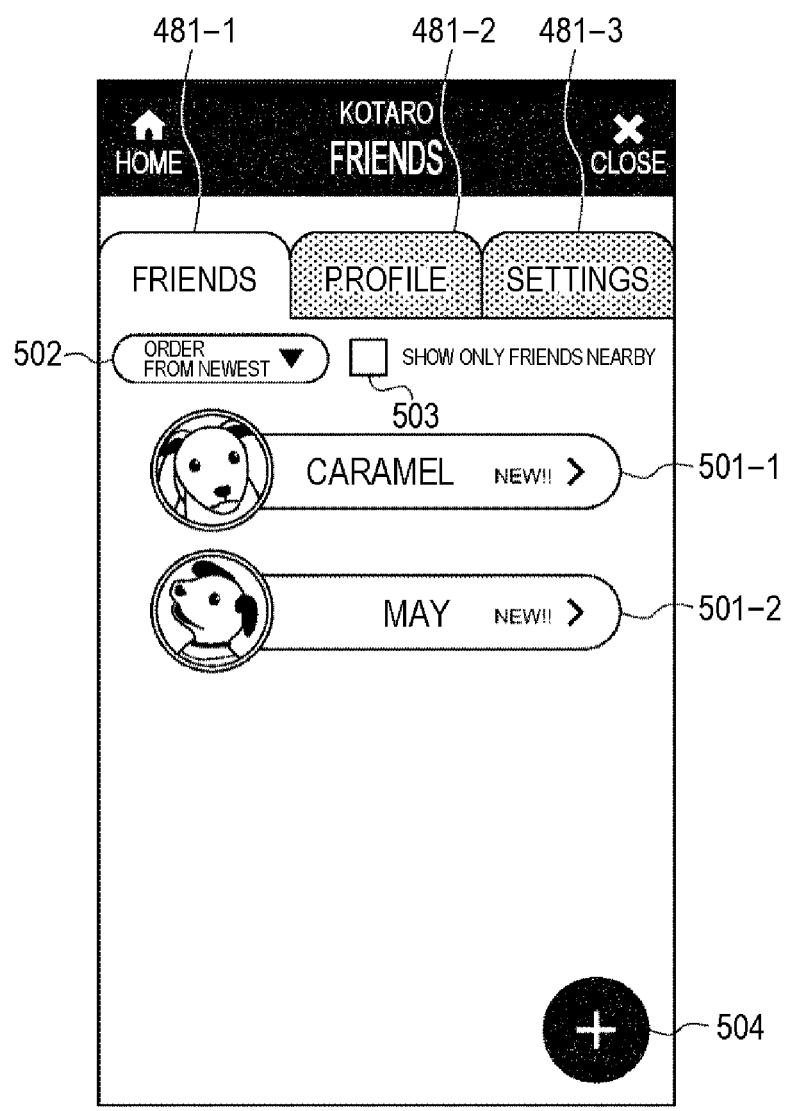
FIG. 37 is a flowchart for explaining processing of the information processing server in the second embodiment of the friend acquisition processing.

Then, when the button 822 is selected, the window 821 is closed, and a friend list in FIG. 37 is displayed on the display unit 241.

The friend list in FIG. 37 has contents similar to those of the friend list in FIG. 16. However, in the example of FIG. 37, only new friends that have become friends of the own device within a latest predetermined period are displayed.

Note that, in the friend list in FIG. 37, all the friends of the own device may be displayed.

Thereafter, the processing of the information processing terminal 12 ends.

<Processing in which Autonomous Mobile Body 11 Eats Food with Existing Friend>

Next, with reference to FIGS. 38 to 41, processing will be described in which the autonomous mobile body 11 eats food with an existing friend.

<Processing of Information Processing Terminal 12>

First, with reference to a flowchart of FIG. 38, processing of the information processing terminal 12 will be described.

In step S301, the information processing terminal 12 requests data related to friends of the autonomous mobile body 11 (the own device).

For example, when the button 422-1 is selected on the menu screen of FIG. 11 described above while the link function is set to ON or when the button 563 is selected in the window 561 of FIG. 21 described above, the UI control unit 223 requests the information processing server 13 for the data related to friends of the own device.

Figure 33:
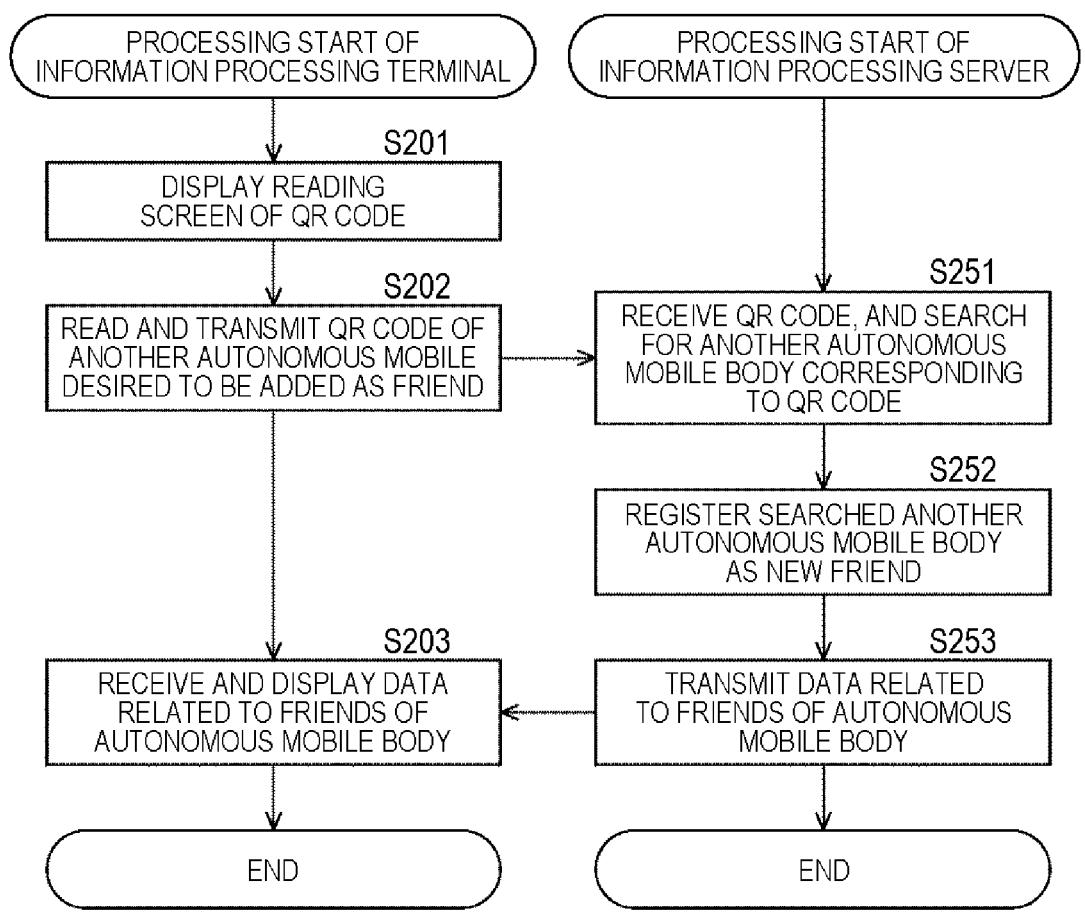
FIG. 33 is a flowchart for explaining a second embodiment of friend acquisition processing.

On the other hand, the information processing server 13 transmits the data related to friends of the autonomous mobile body 11, similarly to the processing in step S253 in FIG. 33 described above.

In step S302, the information processing terminal 12 receives and displays the data related to friends of the autonomous mobile body 11 (the own device). Specifically, the UI control unit 223 receives the data related to friends of the own device transmitted from the information processing server 13. Then, on the basis of the received data, the friend list in FIG. 16 described above is displayed on the display unit 241.

In step S303, the information processing terminal 12 receives selection of a friend who eats food together, and notifies of a selection result.

Figure 39:
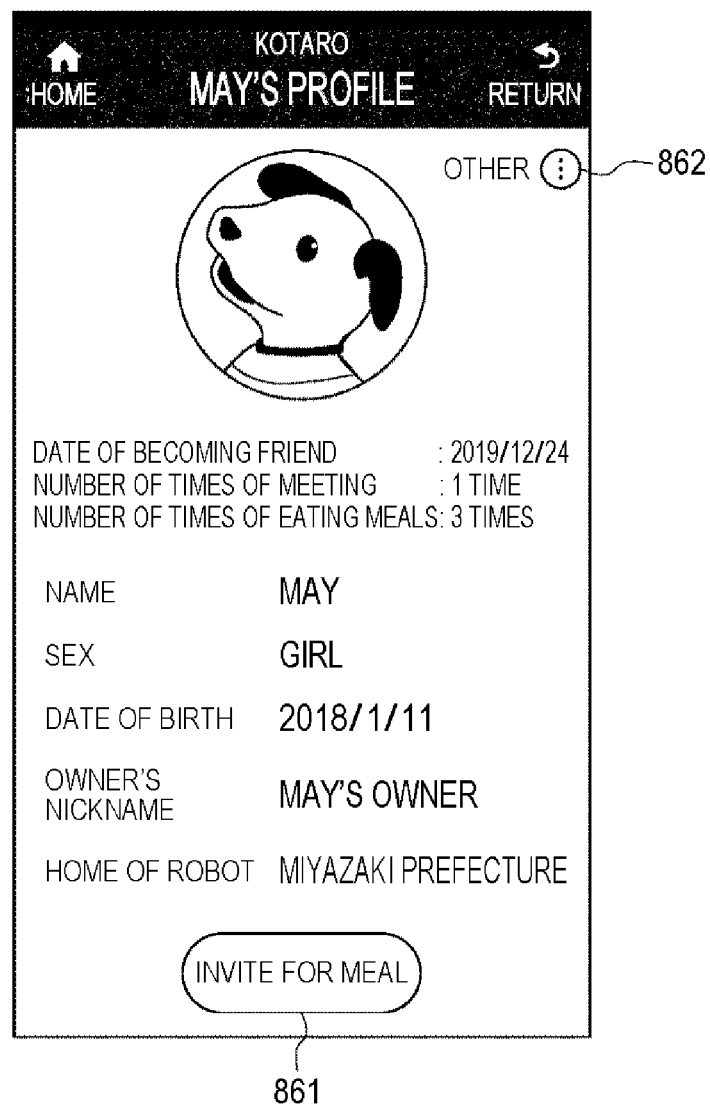
FIG. 39 is a view illustrating an example of a screen displayed in processing in which the autonomous mobile body eats food with an existing friend.

Specifically, when any of the buttons 501 is selected in the friend list in FIG. 16, that is, when any of friends of the own device is selected, a profile screen of FIG. 39 is displayed on the display unit 241.

The profile screen is a screen that displays a profile and the like of the selected friend. On the profile screen, a thumbnail image and a profile of the selected friend, a button 861, a button 862, and the like are displayed.

The profile of the friend includes a name, sex, a date of birth, an owner's nickname, and an address. Furthermore, the profile of the friend includes a date of becoming a friend (company) of the own device, the number of times of meeting with the own device, and the number of times of eating food (a meal) together with the own device.

Note that, as the number of times of meeting with the own device, for example, the number of times the friend has approached within a predetermined range from the own device is used. As the range serving as this condition, for example, a communication range of the short-range wireless communication device included in the communication unit 102 of the own device is used.

The button 861 is a button for selecting the displayed friend as a partner with whom the own device eats food together.

The button 862 is a button for performing other operations other than selecting the displayed friend as the partner to eat food.

Figure 40:
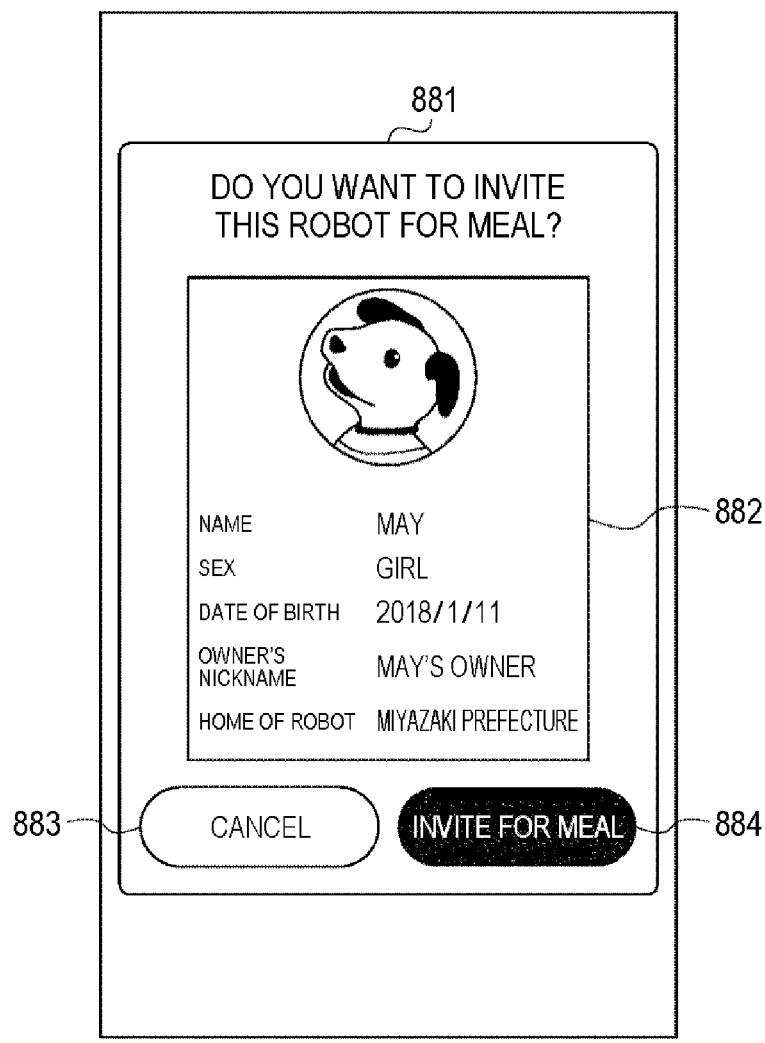
FIG. 40 is a view illustrating an example of a screen displayed in processing in which the autonomous mobile body eats food with an existing friend.

For example, when the button 861 is selected on the profile screen of FIG. 39, a window 881 of FIG. 40 is displayed on the display unit 241. In the window 881, a profile field 882, a button 883, a button 884, and the like are displayed.

In the profile field 882, a thumbnail image and a profile of the selected friend are displayed. The profile includes a name, sex, a date of birth, an owner's nickname, and an address.

The button 883 is a button for canceling the selection of the displayed friend.

The button 884 is a button for confirming the selection of the displayed friend. Then, when the button 884 is selected, a friend whose profile is displayed in the window 881 is selected as the partner who eats food together with the own device.

Then, the UI control unit 223 notifies the information processing server 13 of a selection result of the friend who eats food together with the own device.

In step S304, similarly to the processing in step S108 in FIG. 15 described above, data related to food is received and displayed.

In step S305, similarly to the processing in step S109 in FIG. 15 described above, the selection result of the food is notified.

In step S306, similarly to the processing in step S110 in FIG. 15 described above, a state of eating by the autonomous mobile body 11 (the own device) with the friend is displayed. Note that, this processing is different in that the partner for eating with the own device is an existing friend selected in the processing in step S303, while the partner for eating with the own device is a new friend candidate in the processing in step S110.

In step S307, similarly to the processing in step S111 in FIG. 15 described above, an image of a stamp is received and displayed. Note that, in this processing, two types of stamps are given, that is, a stamp given by giving food by the own device and a stamp given by giving food to a friend of the own device.

Thereafter, the processing of the information processing terminal 12 ends.

<Processing of Information Processing Server 13>

Next, with reference to the flowchart in FIG. 41, processing executed by the information processing server 13 in correspondence to the processing of the information processing terminal 12 in FIG. 38 will be described.

In step S351, the information processing server 13 reads data related to friends of the autonomous mobile body 11 (the own device). Specifically, in response to the request from the information processing terminal 12 in step S301 in FIG. 38 described above, the application control unit 322 reads the data related to friends of the own device from the storage unit 303. The data related to friends of the own device includes, for example, a profile and a thumbnail image of each friend.

In step S352, the information processing server 13 transmits the data related to friends of the autonomous mobile body 11 (the own device). Specifically, the application control unit 322 transmits the data read in the processing of step S351 to the information processing terminal 12.

In step S353, the information processing server 13 receives a selection result of a friend who eats food together. Specifically, the application control unit 322 receives the notification of the selection result of the friend who eats food together with the own device transmitted from the information processing terminal 12 in step S303 of FIG. 38 described above.

Figure 32:
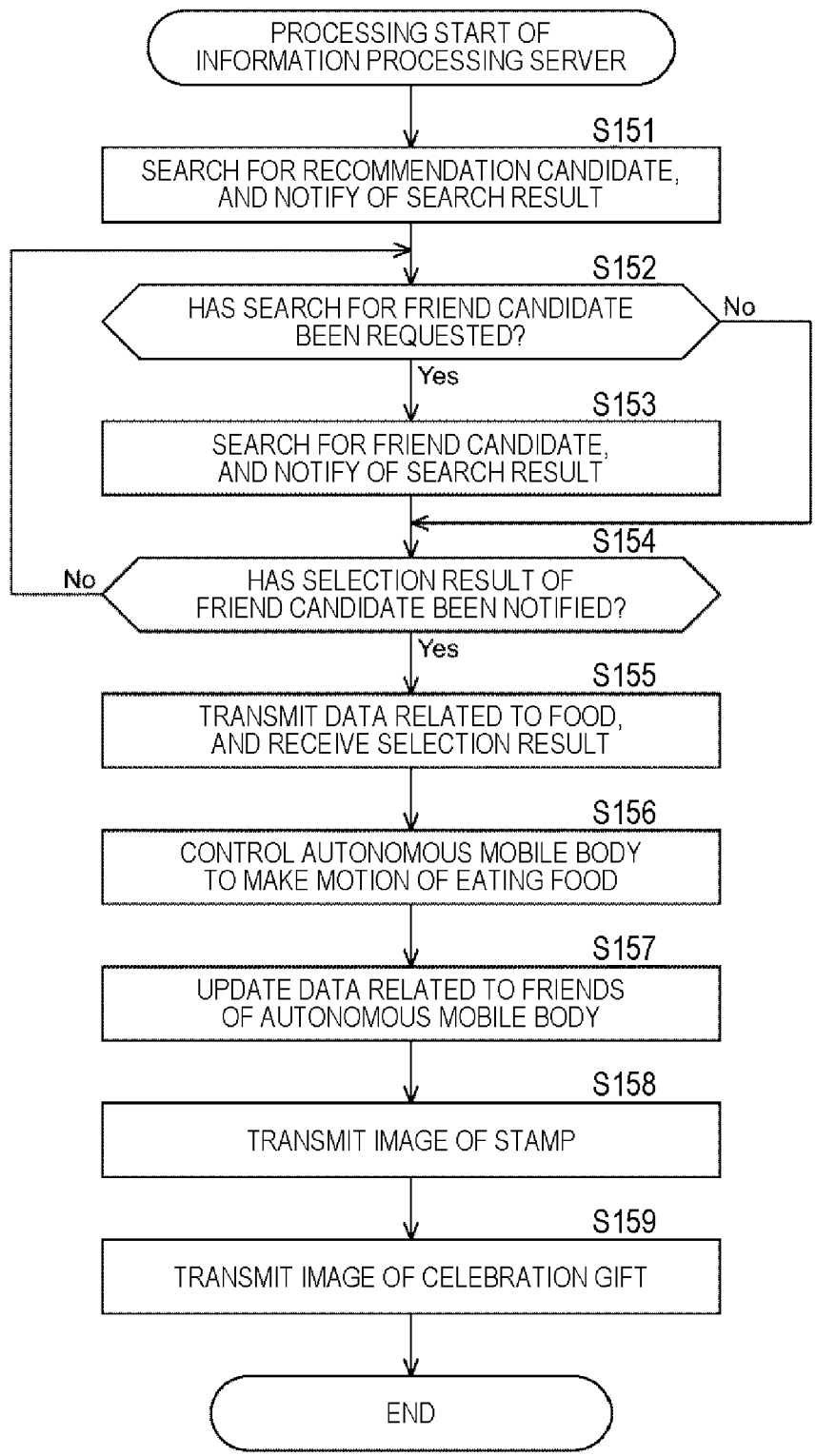
FIG. 32 is a flowchart for explaining processing of the information processing server in the first embodiment of the friend acquisition processing.

In step S354, similarly to the processing in step S155 in FIG. 32 described above, data related to food is transmitted, and a selection result is received.

In step S355, similarly to the processing in step S156 in FIG. 32 described above, the autonomous mobile body 11 (the own device) is controlled to make a motion of eating food.

In step S356, the application control unit 322 updates the data related to friends of the autonomous mobile body 11 (the own device). Specifically, the application control unit 322 updates the number of times of eating food together of the friend with which the own device have eaten food together this time, in the data related to the own device stored in the storage unit 303.

In step S357, similarly to the processing in step S158 in FIG. 32 described above, an image of a stamp is transmitted.

Thereafter, the processing of the information processing server 13 ends.

<Processing for Hiding Friend>

Figure 42:
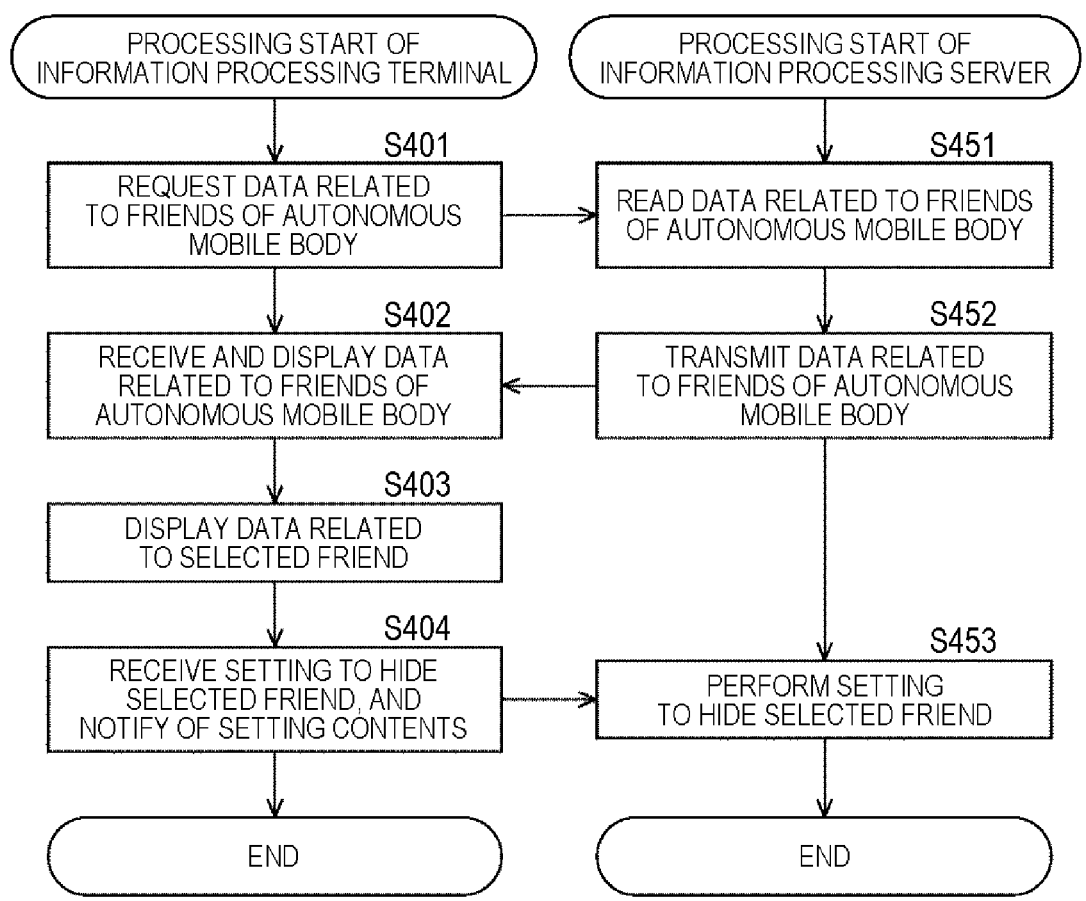
FIG. 42 is a flowchart for explaining processing for hiding a friend.

Next, with reference to the flowchart of FIG. 42, processing for hiding a friend executed by the information processing system 1 will be described.

Figure 38:
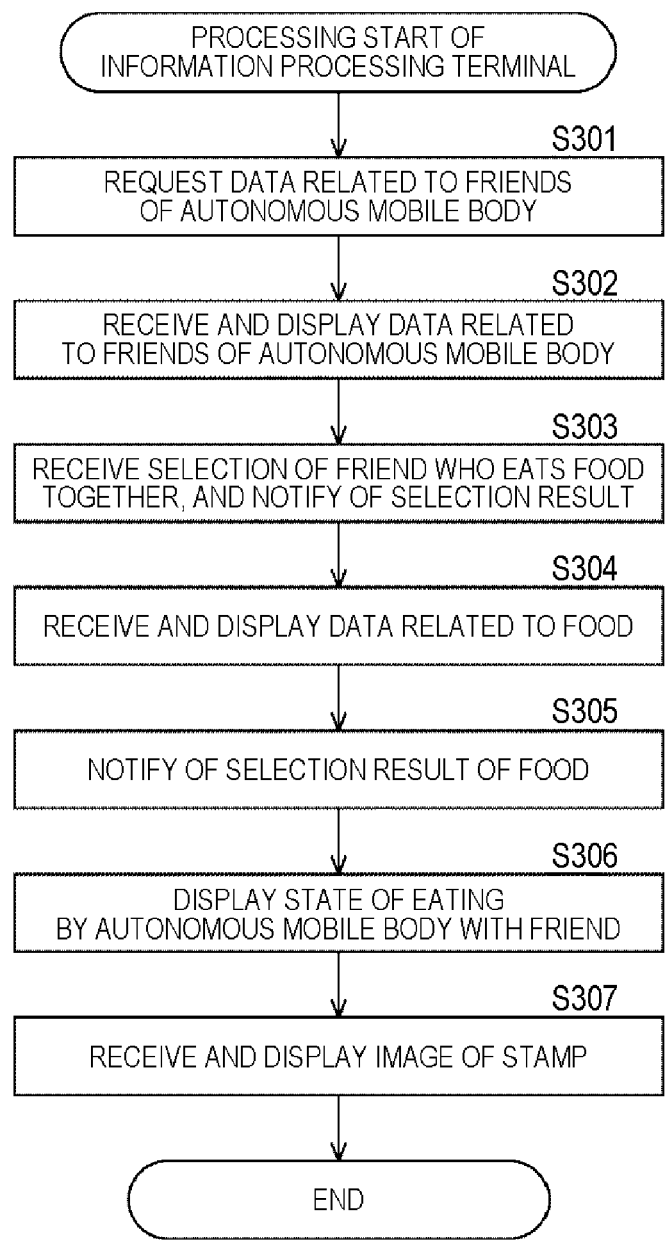
FIG. 38 is a flowchart for explaining processing of the information processing terminal in processing in which the autonomous mobile body eats food with an existing friend.

In step S401, similarly to the processing in step S301 in FIG. 38 described above, the information processing terminal 12 requests the information processing server 13 for data related to friends of the autonomous mobile body 11 (the own device).

Figure 41:
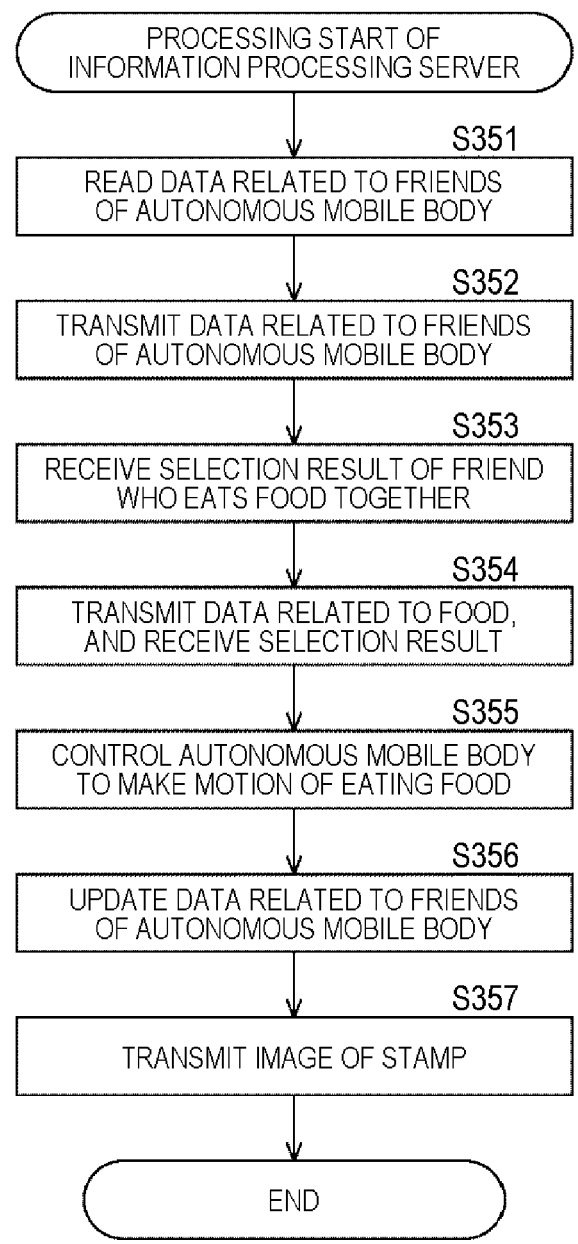
FIG. 41 is a flowchart for explaining processing of the information processing server in processing in which the autonomous mobile body eats food with an existing friend.

On the other hand, in step S451, similarly to the processing in step S351 in FIG. 41 described above, the information processing server 13 reads the data related to friends of the autonomous mobile body 11. Further, in step S452, similarly to the processing in step S352 in FIG. 41 described above, the information processing server 13 transmits the read data to the information processing terminal 12.

In step S402, similarly to the processing in step S302 in FIG. 38 described above, the information processing terminal 12 receives and displays the data related to friends of the autonomous mobile body 11 (the own device). As a result, the friend list in FIG. 16 described above is displayed on the display unit 241.

In step S403, the information processing terminal 12 displays data related to a selected friend. Specifically, when any of buttons 501 is selected in the friend list in FIG. 16, that is, when any of friends of the own device is selected, the profile screen of FIG. 39 described above is displayed on the display unit 241.

In step S404, the information processing terminal 12 receives the setting to hide the selected friend, and notifies of setting contents.

Figure 43:
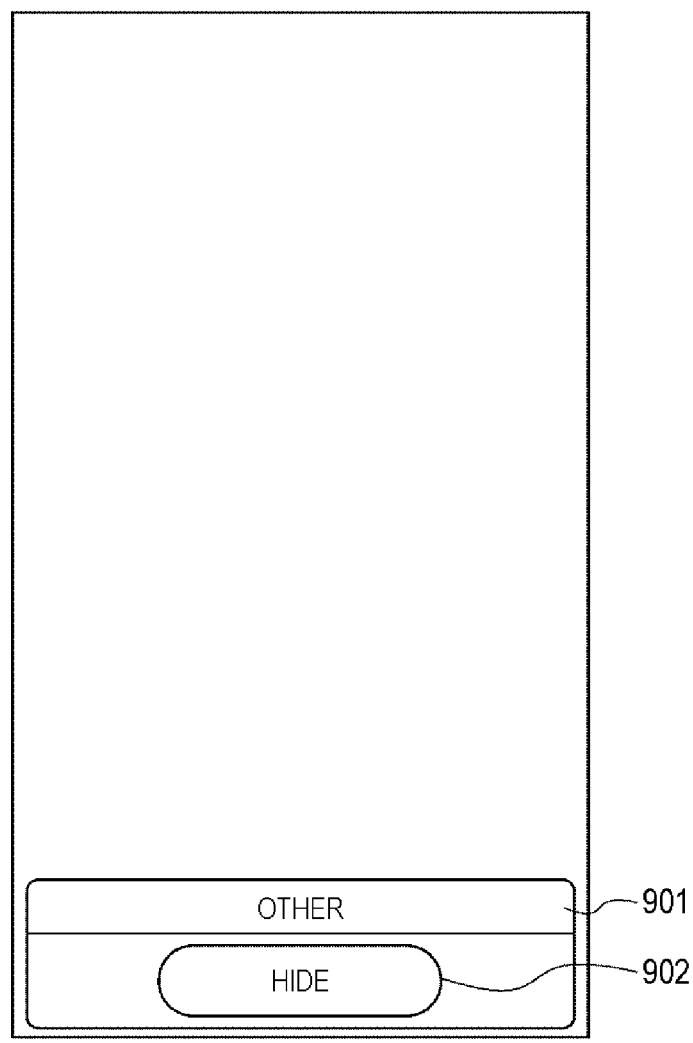
FIG. 43 is a view illustrating an example of a screen displayed in processing of setting to hide a friend.

Specifically, when the button 862 is selected on the profile screen of FIG. 39, a window 901 of FIG. 43 is displayed on the display unit 241. In the window 901, a button 902 and the like are displayed.

Figure 44:
FIG. 44 is a view illustrating an example of a screen displayed in the processing of setting to hide a friend.

The button 902 is a button for hiding the selected friend. Then, when the button 902 is selected, the window 901 is closed, and a window 921 in FIG. 44 is displayed on the display unit 241.

The window 921 is a window for confirming execution of hiding the selected friend. In the window 921, a button 922, a button 923, and the like are displayed.

The button 922 is a button for canceling hiding of the selected friend. When the button 922 is selected, the window 921 is closed, and hiding of the selected friend is canceled.

Figure 45:
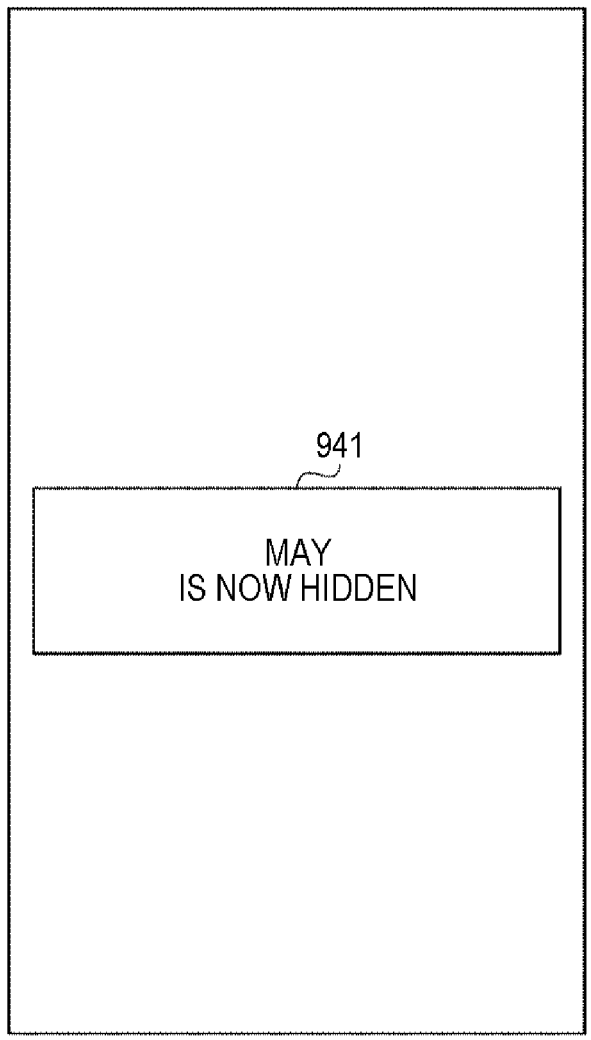
FIG. 45 is a view illustrating an example of a screen displayed in the processing of setting to hide a friend.

The button 922 is a button for confirming hiding of the selected friend. When the button 922 is selected, the window 921 is closed, and a window 941 in FIG. 45 is displayed on the display unit 241 for a predetermined time.

The window 941 is a window for notifying that the selected friend has been hidden.

For example, the friend set to be hidden is no longer displayed in the friend list on the information processing terminal 12. Furthermore, information regarding the friend set to be hidden is no longer transmitted from the information processing server 13 to the information processing terminal 12. As a result, for example, it is possible to stop an interaction with a specific friend among friends of the own device.

The UI control unit 223 transmits data indicating the friend that has been hidden to the information processing server 13.

Thereafter, the processing of the information processing terminal 12 ends.

On the other hand, in step S453, the information processing server 13 performs setting to hide the selected friend.

Specifically, the application control unit 322 receives, from the information processing terminal 12, the data indicating the friend that has been hidden. The application control unit 322 performs setting to hide the friend selected by the user, in the data related to the own device stored in the storage unit 303.

Thereafter, the processing of the information processing server 13 ends.

<Process of Releasing Hiding of Friend>

Figure 46:
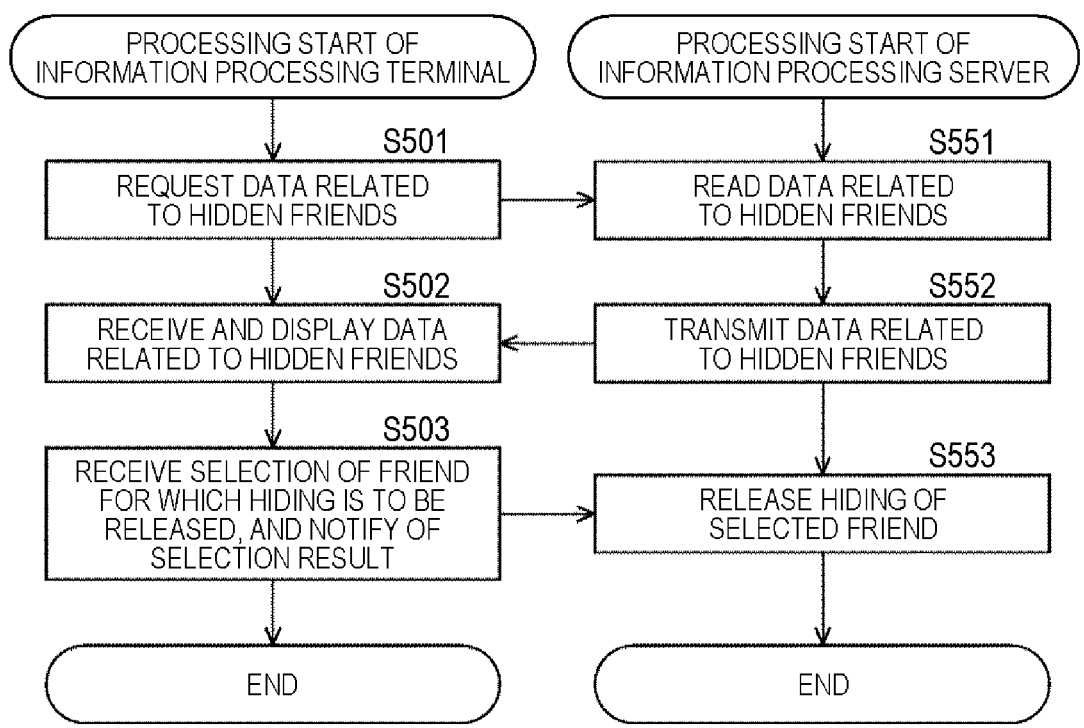
FIG. 46 is a flowchart for explaining processing of releasing hiding of a friend.

Next, with reference to the flowchart of FIG. 46, processing for releasing hiding of a friend executed by the information processing system 1 will be described.

In step S501, the information processing terminal 12 requests data related to hidden friends.

Figure 47:
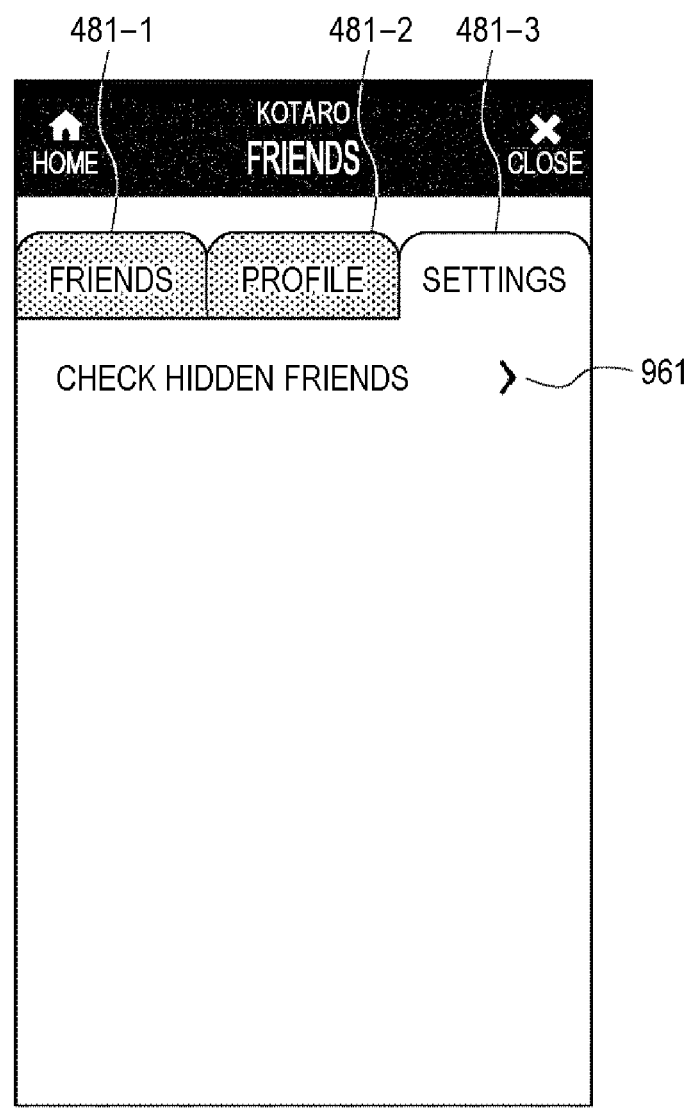
FIG. 47 is a view illustrating an example of a screen displayed in the processing of releasing hiding of a friend.

For example, when the tab 481-3 is selected in the above-described friend list in FIG. 16, a setting screen in FIG. 47 is displayed. On the setting screen, a button 961 is displayed.

The button 961 is a button for checking hidden friends. When the button 961 is selected, the UI control unit 223 requests the information processing server 13 for the data related to hidden friends.

On the other hand, in step S551, the information processing server 13 reads the data related to hidden friends. Specifically, the application control unit 322 reads, from the storage unit 303, the data related to hidden friends among friends of the own device. The data related to hidden friends includes, for example, a profile and a thumbnail image of each friend.

In step S552, the information processing server 13 transmits the data related to hidden friends, to the information processing terminal 12.

Figure 48:
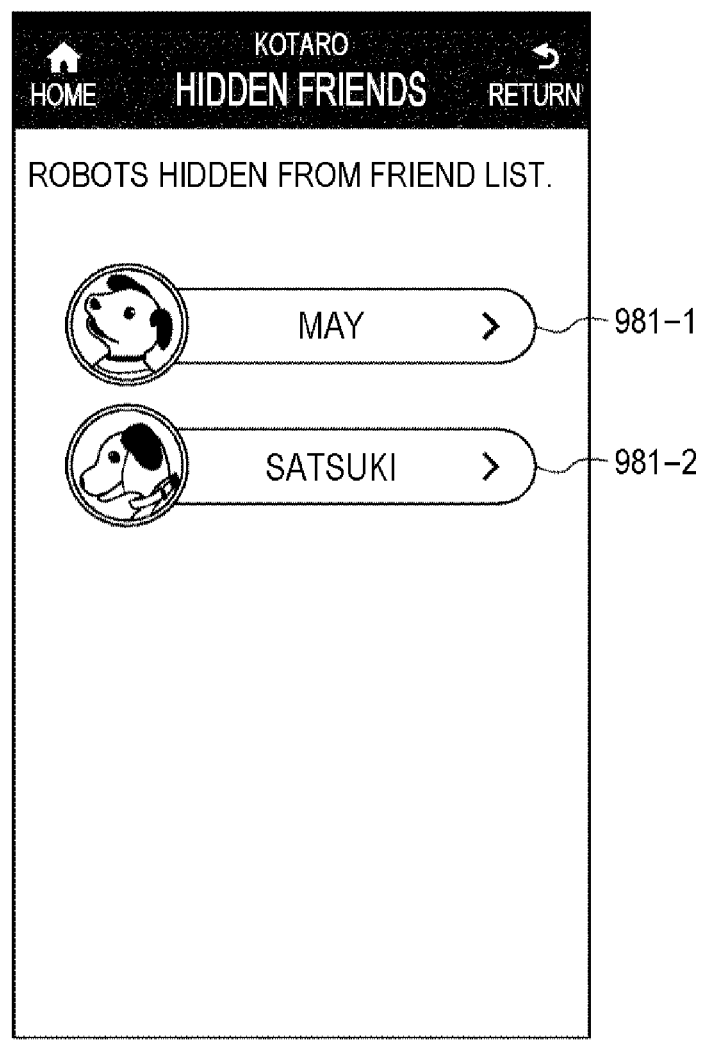
FIG. 48 is a view illustrating an example of a screen displayed in the processing of releasing hiding of a friend.

On the other hand, in step S502, the information processing terminal 12 receives and displays the data related to hidden friends. Specifically, the UI control unit 223 receives the data related to hidden friends and transmitted from the information processing server 13. Then, on the basis of the received data, a hidden friend list in FIG. 48 is displayed on the display unit 241.

The hidden friend list is a list of friends that have been hidden. In the hidden friend list, a button 981-1, a button 981-2, and the like are displayed.

Note that, hereinafter, the buttons 981-1 and 981-2 are simply referred to as a button 981 in a case where it is not necessary to individually distinguish from each other.

Each button 981 indicates information regarding a hidden friend. Specifically, each button 981 displays a thumbnail image and a name of a hidden friend.

In step S503, the information processing terminal 12 receives selection of a friend for which hiding is to be released, and notifies of a selection result.

Figure 49:
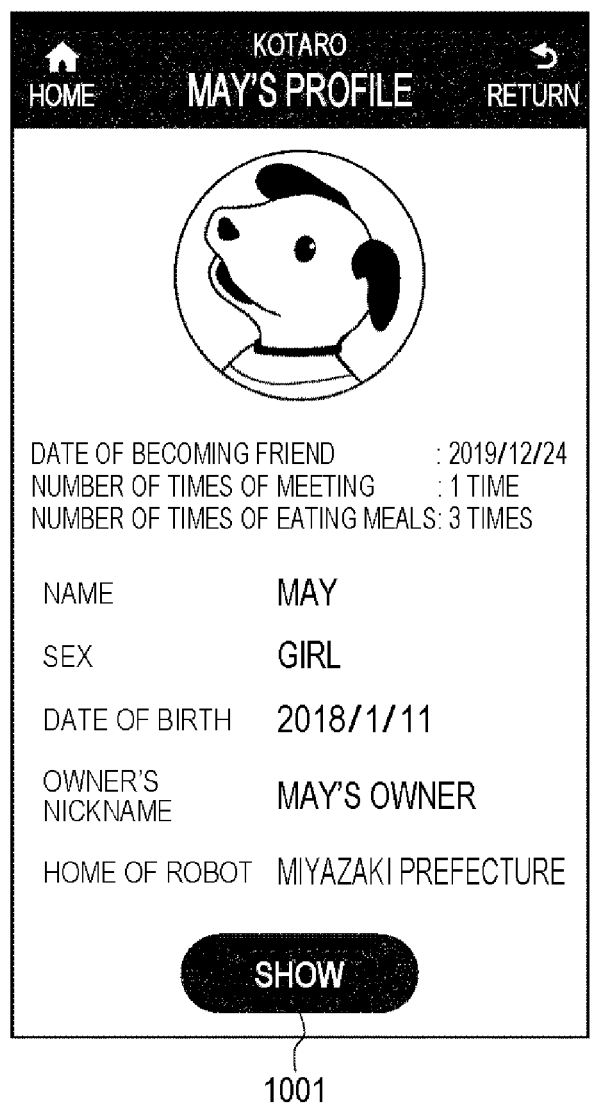
FIG. 49 is a view illustrating an example of a screen displayed in the processing of releasing hiding of a friend.
Figure 50:
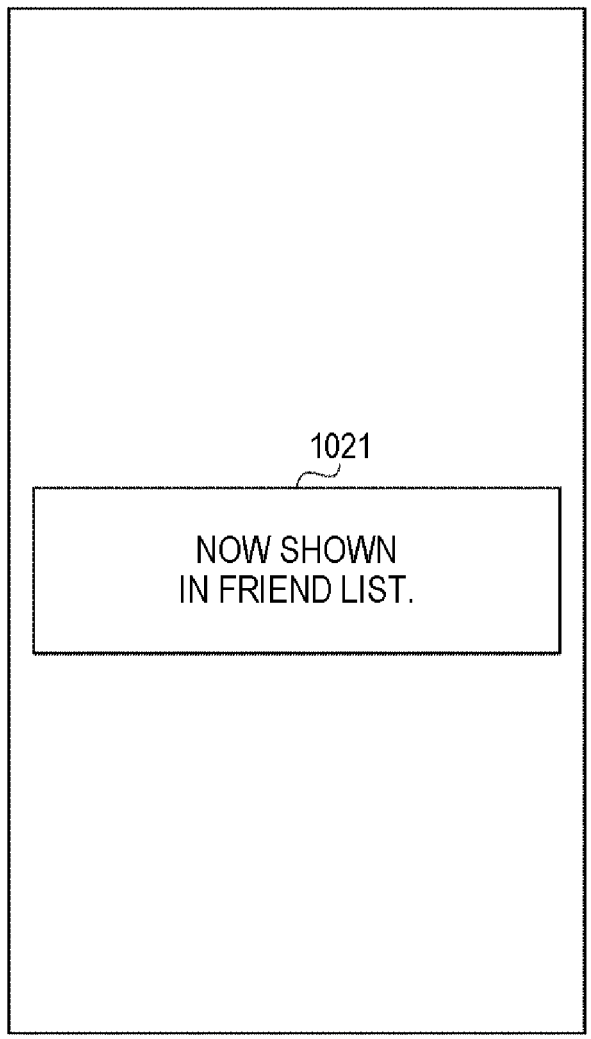
FIG. 50 is a view illustrating an example of a screen displayed in the processing of releasing hiding of a friend.

Specifically, when any of buttons 981 is selected in the hidden friend list in FIG. 48, that is, when any of friends set to be hidden is selected, a profile screen of FIG. 49 is displayed on the display unit 241.

The profile screen is a screen that displays a profile and the like of the selected friend. On the profile screen, the profile of the selected friend, a button 1001, and the like are displayed.

The profile of the friend includes a name, sex, a date of birth, an owner's nickname, and an address. Furthermore, the profile of the friend includes a date of becoming a friend of the own device, the number of times of meeting with the own device, and the number of times of eating food (a meal) together with the own device.

The button 1001 is a button for releasing hiding of the displayed friend. Then, when the button 1001 is selected, a window 1021 is displayed on the display unit 241 for a predetermined time.

The window 1021 is a window for notifying that hiding of the selected friend has been released.

The UI control unit 223 notifies the information processing server 13 of a selection result of the friend for which hiding is to be released.

Thereafter, the processing of the information processing terminal 12 ends.

On the other hand, in step S553, the information processing server 13 releases hiding of the selected friend. Specifically, the application control unit 322 releases hiding of the friend selected by the user, in the data related to the own device stored in the storage unit 303.

Thereafter, the processing of the information processing server 13 ends.

<Editing Processing for Profile and the Like>

Figure 51:
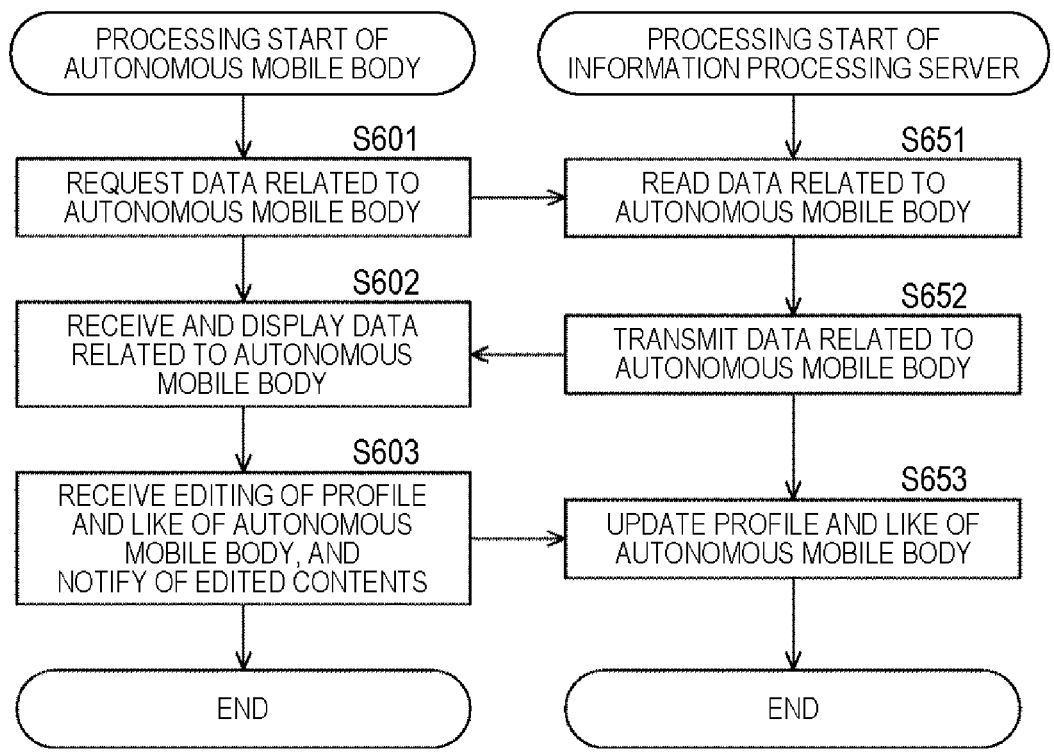

Next, with reference to the flowchart of FIG. 51, editing processing for a profile and the like executed by the information processing system 1 will be described.

In step S601, the information processing terminal 12 requests transmission of data related to the autonomous mobile body 11 (the own device). Specifically, when the tab 481-2 is selected in the friend list in FIG. 16 described above, the UI control unit 223 requests the information processing server 13 for the data related to the own device.

On the other hand, in step S651, the application control unit 322 reads the data related to the autonomous mobile body 11 (the own device) from the storage unit 303.

In step S652, the application control unit 322 transmits the read data related to the autonomous mobile body 11 (the own device) to the information processing terminal 12.

On the other hand, in step S602, the information processing terminal 12 receives and displays the data related to the autonomous mobile body 11 (the own device). Specifically, the UI control unit 223 receives the data related to the own device from the information processing server 13. Then, on the basis of the received data, a profile screen of FIG. 52 is displayed on the display unit 241.

Figure 52:
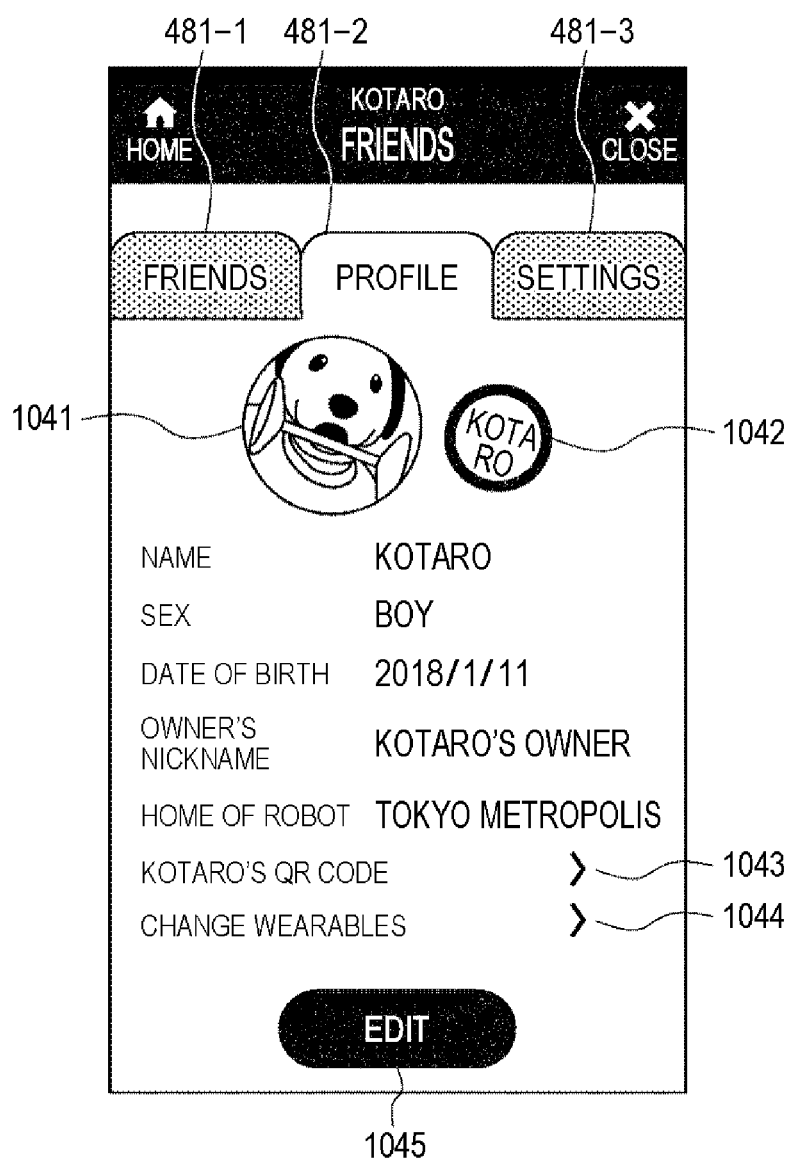

On the profile screen of FIG. 52, the profile of the own device, a thumbnail image 1041, a stamp 1042, buttons 1043 to 1045, and the like are displayed.

The profile of the own device includes a name, sex, a date of birth, an owner's nickname, and an address.

As the thumbnail image 1041, for example, an image obtained by capturing an image of the own device is used.

As will be described later, the stamp 1042 is a stamp generated on the basis of the name of the own device.

The button 1043 is a button for displaying a QR code of the own device. For example, when the button 1043 is selected, the QR code screen of FIG. 35 described above is displayed.

The button 1044 is a button for changing wearables of the own device.

The button 1045 is a button for editing the profile of the own device.

In step S603, the information processing terminal 12 receives editing of the profile and the like of the autonomous mobile body 11 (the own device), and notifies of edited contents. Specifically, when the button 1045 is selected on the profile screen of FIG. 52, an edit screen of FIG. 53 is displayed on the display unit 241.

Figure 53:
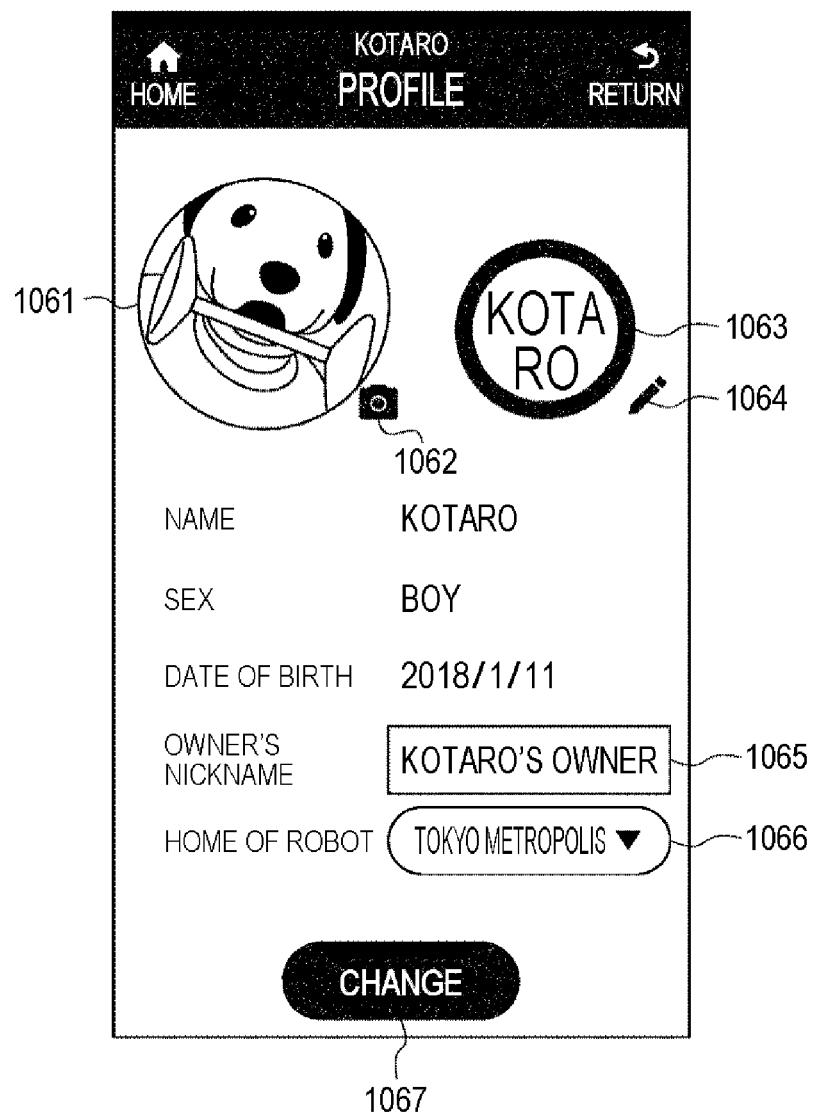

The edit screen in FIG. 53 is a screen for editing the profile and the like of the own device. On the edit screen, the profile of the own device, a thumbnail image 1061, a button 1062, a stamp 1063, a button 1064, a text box 1065, a pull-down menu 1066, a button 1067, and the like are displayed.

The button 1062 is a button for editing the thumbnail image 1061.

The button 1064 is a button for editing the stamp 1063.

The text box 1065 is used to edit the owner's nickname of the own device. That is, the user can input any nickname as the nickname of the self, into the text box 1065.

The pull-down menu 1066 is used to set an address of the own device. When the pull-down menu 1066 is selected, address options (for example, prefectures) are displayed, and the address can be selected.

The button 1067 is a button for confirming the contents in which the profile and the like of the own device are changed.

Figure 54:
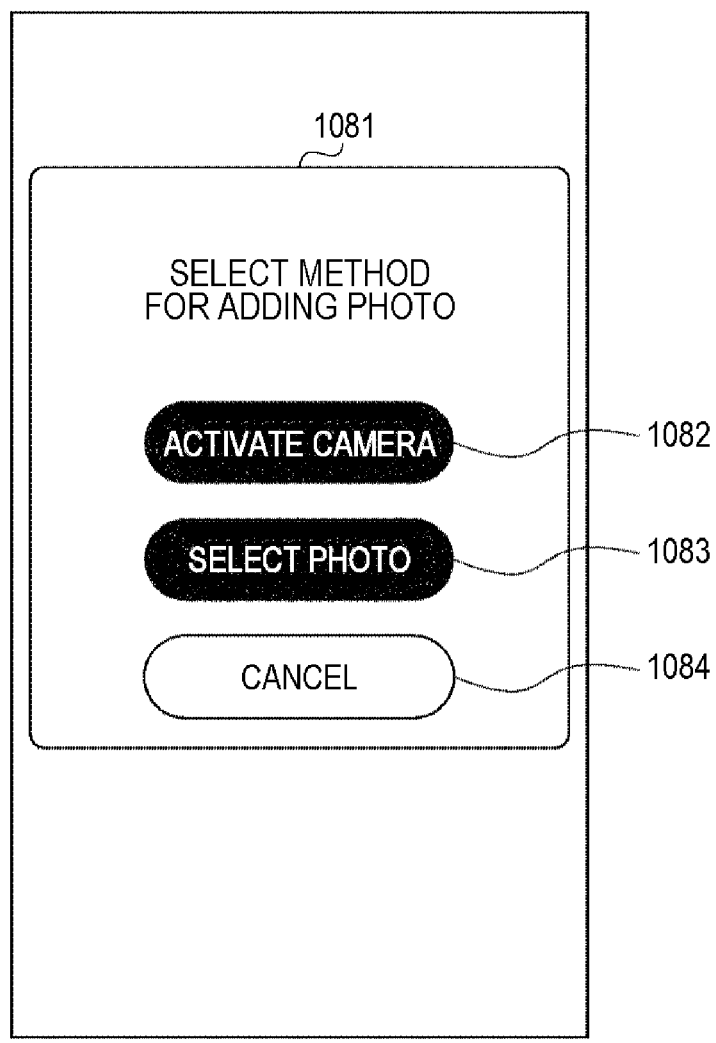

For example, when the button 1062 is selected, a window 1081 of FIG. 54 is displayed on the display unit 241. The window 1081 is a window for selecting a method for adding a picture to be used for the thumbnail image 1061. In the window 1081, buttons 1082 to 1084 and the like are displayed.

When the button 1082 is selected, the camera 211 is activated. As a result, it becomes possible to capture an image to be used for the thumbnail image 1061.

When the button 1083 is selected, for example, a list of images stored in the storage unit 205 is displayed on the display unit 241. As a result, it becomes possible to select an image to be used for the thumbnail image 1061 from the displayed list.

When the button 1084 is selected, the selection of the thumbnail image 1061 is canceled, and the window 1081 is closed.

Figure 55:
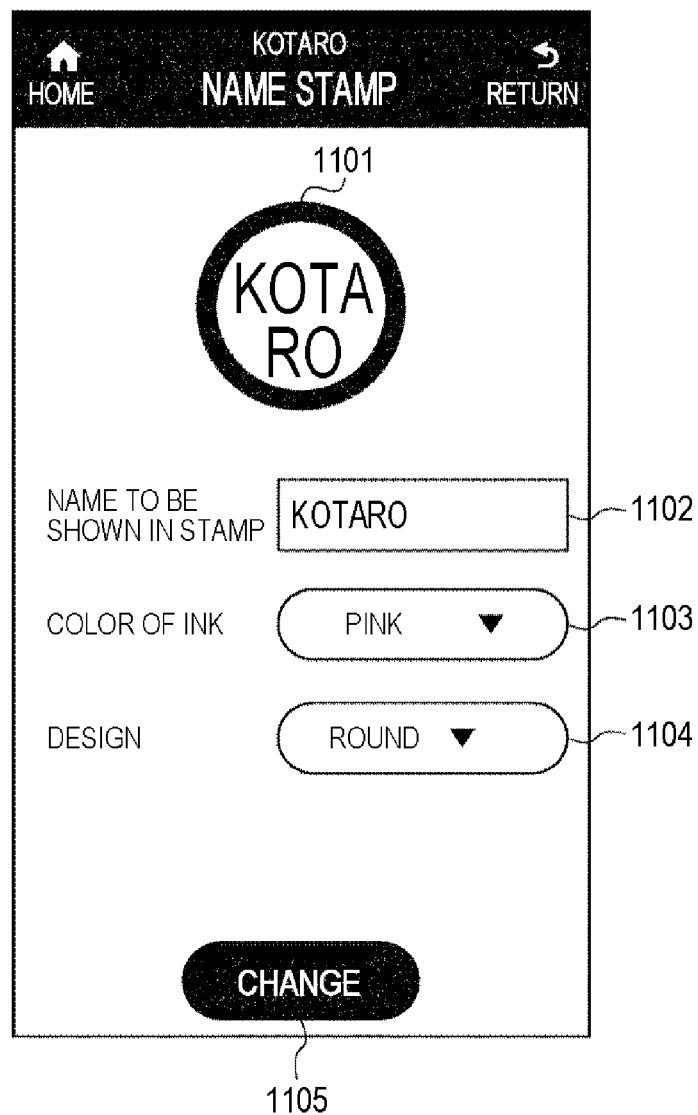

For example, when the button 1064 is selected on the profile editing screen of FIG. 53, a stamp editing screen of FIG. 55 is displayed on the display unit 241. The stamp editing screen is a screen for editing a stamp of the own device. On the stamp editing screen, a stamp 1101, a text box 1102, a pull-down menu 1103, a pull-down menu 1104, a button 1105, and the like are displayed.

The stamp 1101 indicates a state of the stamp being edited.

The text box 1102 is used to input a name to be displayed on the stamp 1101. Then, the name inputted in the text box 1102 is displayed on the stamp 1101.

The pull-down menu 1103 is used to set a color of the stamp 1101. When the pull-down menu 1103 is selected, color options are displayed, and the color of the stamp 1101 can be selected.

The pull-down menu 1104 is used for setting a design of the stamp 1101 (for example, an outer shape or the like of the stamp 1101). When the pull-down menu 1104 is selected, design options are displayed, and the design of the stamp 1101 can be selected.

The button 1105 is a button for confirming the edited contents of the stamp 1101. When the button 1105 is selected, the stamp of the own device is changed to the displayed stamp 1101.

Figure 56:
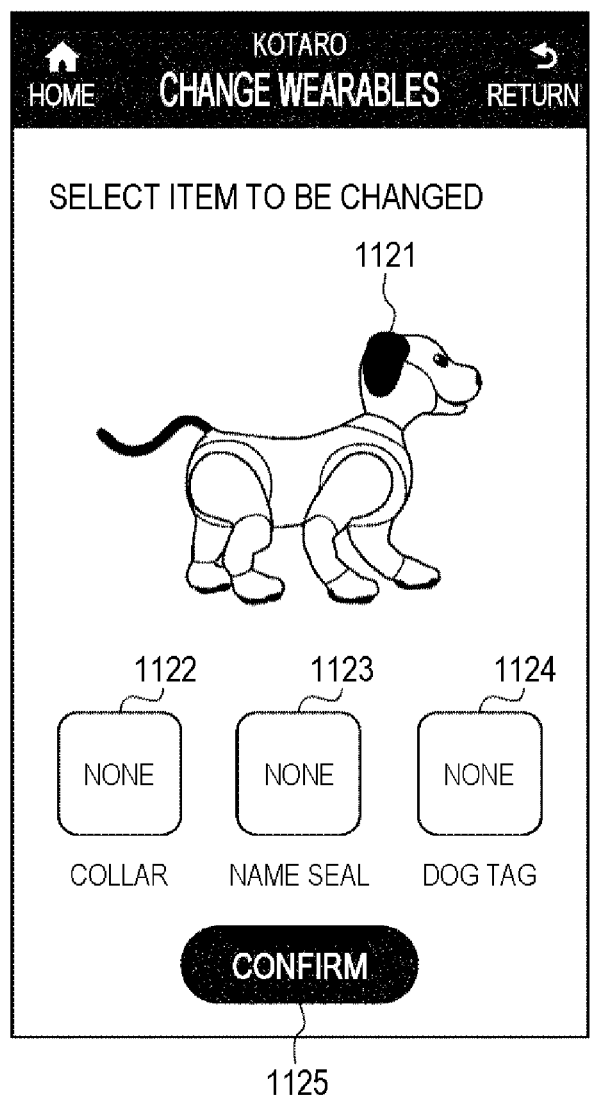

For example, when the button 1044 is selected on the profile screen of FIG. 52, a change-wearables screen of FIG. 56 is displayed. The change-wearables screen is a screen for changing wearables in an image of the own device virtually displayed in each information processing terminal 12.

On the change-wearables screen, an own device 1121, buttons 1122 to 1125, and the like are displayed.

The own device 1121 is an image that virtually indicates a state of change-wearables items attached to the own device.

The button 1122 is a button for selecting a collar to be attached to the own device. Furthermore, a currently selected collar is displayed on the button 1122. Note that, in a case where no collar is selected, text "none" is displayed on the button 1122.

The button 1123 is a button for selecting a name seal to be attached to the own device. Furthermore, a currently selected name seal is displayed on the button 1123. Note that, in a case where no name seal is selected, text "none" is displayed on the button 1123.

The button 1124 is a button for selecting a dog tag to be attached to the own device. Furthermore, a currently selected dog tag is displayed on the button 1124. Note that in a case where no dog tag is selected, text "none" is displayed on the button 1124.

The button 1125 is a button for confirming the change-wearables items displayed on the own device 1121.

Figure 57:
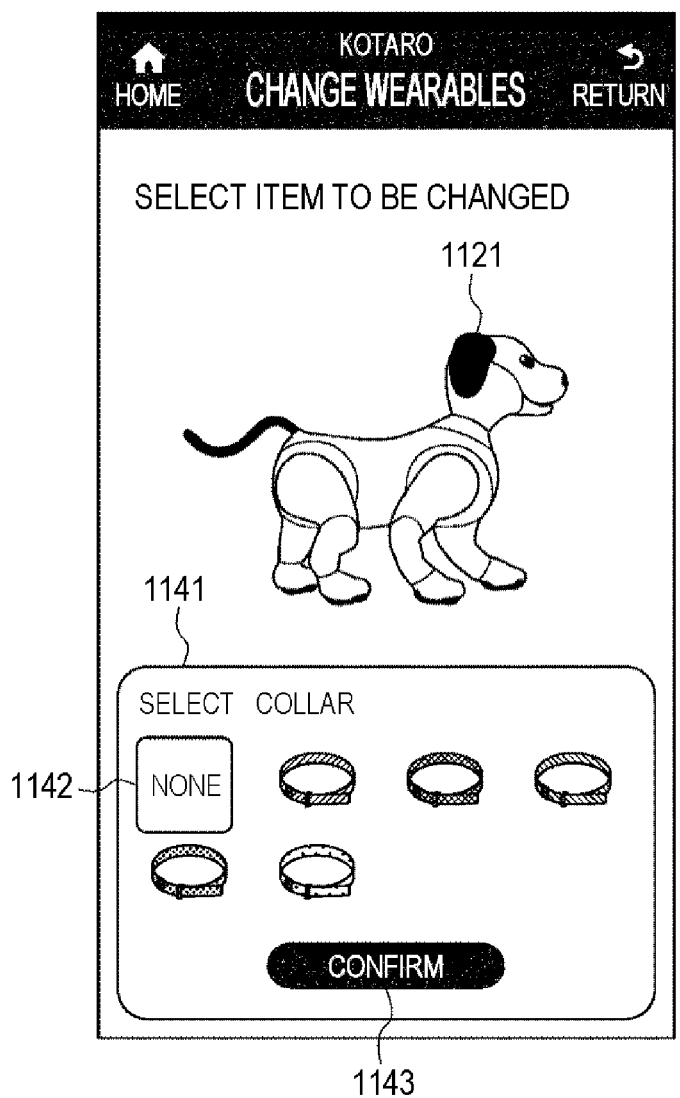

For example, when the button 1122 is selected, a window 1141 of FIG. 57 is displayed on the display unit 241. The window 1141 is a window for selecting a collar to be attached to the own device. In the window 1141, a list of collars, a cursor 1142, a button 1143, and the like are displayed.

Figure 58:
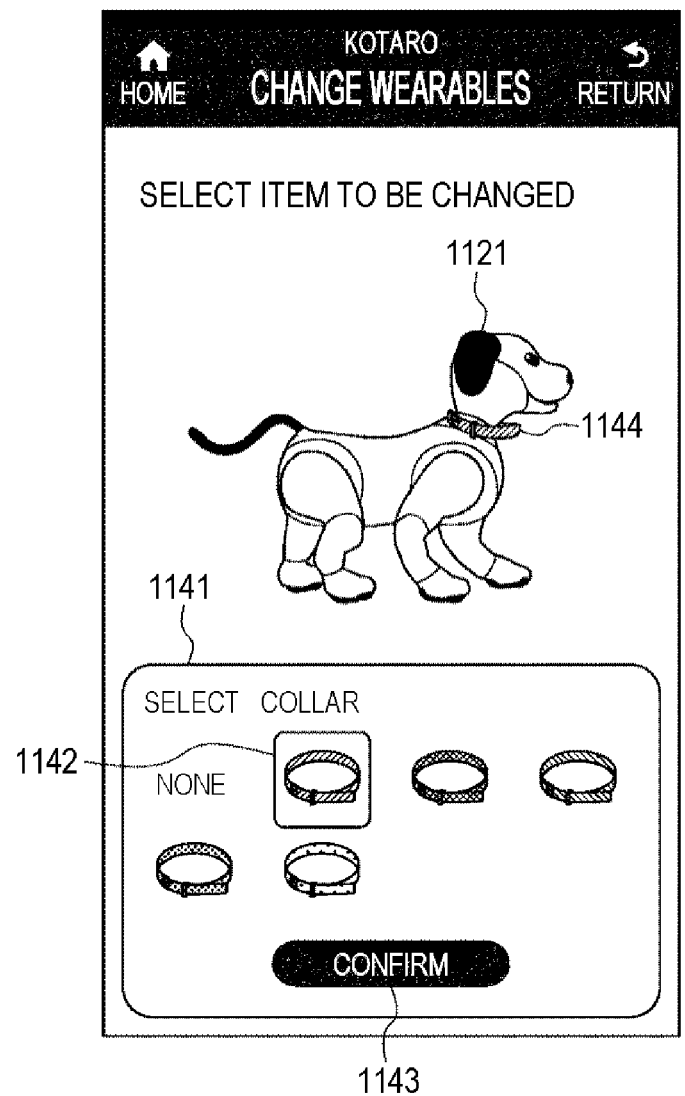

The cursor 1142 is used to select a collar to be attached to the own device. Then, as illustrated in FIG. 58, a collar 1144 selected by the cursor 1142 is superimposed on the own device 1121. As a result, it is possible to check a state where the selected collar is attached to the own device.

Figure 59:
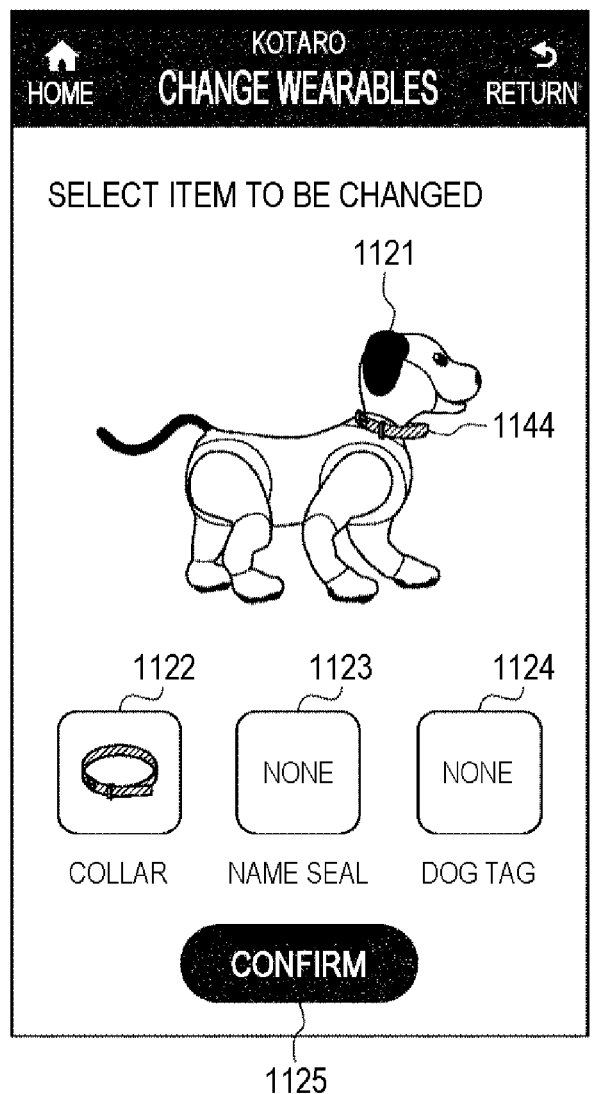

The button 1143 is a button for confirming the selected collar. That is, when the button 1143 is selected, the collar selected by the cursor 1142 is confirmed. Then, as illustrated in FIG. 59, the window 1141 is closed, and the selected collar is displayed on the button 1122. Moreover, when the button 1125 is selected, the change-wearables items attached to the own device 1121 are finally confirmed.

As described above, the UI control unit 223 receives editing of the profile, the thumbnail image, the stamp, and the change-wearables items of the own device, and generates data indicating the edited contents. The UI control unit 223 transmits the generated data to the information processing server 13.

Thereafter, the processing of the information processing terminal 12 ends.

On the other hand, in step S653, the information processing server 13 updates the profile and the like of the autonomous mobile body 11 (the own device). Specifically, the application control unit 322 receives the data indicating the edited contents of a profile and the like, from the information processing terminal 12. On the basis of the received data, the application control unit 322 updates the data related to the own device stored in the storage unit 303.

Thereafter, the processing of the information processing server 13 ends.

As described above, the entertainment aspect of the autonomous mobile body 11 can be improved.

For example, the user can receive enjoyment of increasing the number of friends of the autonomous mobile body 11 and causing interaction with another autonomous mobile body 11. Furthermore, the user can interact with a user of another autonomous mobile body 11 through, for example, friends of the autonomous mobile body 11.

The user can enjoy a state where the autonomous mobile body 11 eats food with another autonomous mobile body 11 on the eating screen in FIGS. 27 and 28.

The user can express the personality of the autonomous mobile body 11 by editing the profile of the autonomous mobile body 11 or changing wearables.

2. Modification

Hereinafter, a modification of the above-described embodiment of the present technology will be described.

In the above description, an example has been described in which two autonomous mobile bodies 11 eat food together as an action serving as a condition for becoming friends. However, the autonomous mobile bodies 11 may virtually interact with each other by another method to become friends. For example, the two autonomous mobile bodies 11 can become friends by virtually performing an action in cooperation other than eating food. Specifically, for example, the two autonomous mobile bodies 11 can become friends by virtually playing together, taking a walk, or sharing an item (for example, a toy or the like).

In the above description, an example has been described in which a side invited for eating food together becomes a friend of a side that has invited. However, for example, at the same time, the side that has invited may become a friend of the invited side.

Furthermore, for example, three or more autonomous mobile bodies 11 can become friends by performing virtually performing an action in cooperation.

For example, as an action to be a predetermined condition other than the condition for becoming a friend, two or more autonomous mobile bodies 11 may virtually perform a predetermined action in cooperation.

For example, by the information processing terminal 12 acquiring information regarding another device by a method other than reading a QR code, the another device can be added to friends of the own device. For example, the information processing terminal 12 may read an image of another device to add the another device to friends of the own device.

In the above description, in the eating screen of FIG. 28, an example has been described in which a position on which the friend candidate 683 (or a friend) is to be superimposed is determined by using the food bowl 702 as a reference, but the position may be determined by using another item as a reference. For example, the recognition unit 221 may recognize a position of the own device 701 in addition to a position of the food bowl 702 in a captured moving image, and the image processing unit 222 may control the position where the friend candidate 683 is to be superimposed on the basis of the positions of the food bowl 702 and the own device 701. Furthermore, for example, the recognition unit 221 may further recognize a movement of the own device 701, and the image processing unit 222 may move the friend candidate 683 in accordance with the movement of the own device 701.

For example, when another autonomous mobile body 11 that is a friend approaches near the autonomous mobile body 11, the autonomous mobile body 11 may react. For example, when the autonomous mobile body 11 detects a friend within a communication range of the short-range wireless communication device included in the communication unit 102, for example, the autonomous mobile body 11 may perform an action such as greetings, joy, or approaching the friend.

For example, a way of eating food may be changed between when the autonomous mobile body 11 eats food alone and when the autonomous mobile body 11 eats food with another autonomous mobile body.

The sharing of processing between the information processing terminal 12 and the information processing server 13 described above is an example, and can be changed as appropriate. For example, the information processing terminal 12 may hold data related to the profile of the own device, friends, and the like, and may display information regarding the profile of the own device, the friends, and the like on the basis of the held data. For example, the information processing terminal 12 may control the autonomous mobile body 11 to make a motion of eating food.

3. Other

<Computer Configuration Example>

The series of processes described above can be executed by hardware or also executed by software. In a case where the series of processes are performed by software, a program that configures the software is installed in a computer. Here, examples of the computer include, for example, a computer that is built in dedicated hardware, a general-purpose personal computer that can perform various functions by being installed with various programs, and the like.

FIG. 60 is a block diagram illustrating a configuration example of hardware of a computer that executes the series of processes described above in accordance with a program.

In a computer 2000, a central processing unit (CPU) 2001, a read only memory (ROM) 2002, and a random access memory (RAM) 2003 are mutually connected by a bus 2004.

The bus 2004 is further connected with an input/output interface 2005. To the input/output interface 2005, an input unit 2006, an output unit 2007, a recording unit 2008, a communication unit 2009, and a drive 2010 are connected.

The input unit 2006 includes an input switch, a button, a microphone, an image sensor, and the like. The output unit 2007 includes a display, a speaker, and the like. The recording unit 2008 includes a hard disk, a non-volatile memory, and the like. The communication unit 2009 includes a network interface or the like. The drive 2010 drives a removable medium 2011 such as a magnetic disk, an optical disk, a magneto-optical disk, or a semiconductor memory.

In the computer 2000 configured as described above, the series of processes described above are performed, for example, by the CPU 2001 loading a program recorded in the recording unit 2008 into the RAM 2003 via the input/output interface 2005 and the bus 2004, and executing.

The program executed by the computer 2000 (the CPU 2001) can be provided by being recorded on, for example, the removable medium 2011 as a package medium or the like. Furthermore, the program can be provided via a wired or wireless transmission medium such as a local area network, the Internet, or digital satellite broadcasting.

In the computer 2000, by attaching the removable medium 2011 to the drive 2010, the program can be installed in the recording unit 2008 via the input/output interface 2005. Furthermore, the program can be received by the communication unit 2009 via a wired or wireless transmission medium, and installed in the recording unit 2008. Besides, the program can be installed in advance in the ROM 2002 and the recording unit 2008.

Note that the program executed by the computer may be a program that performs processing in time series according to an order described in this specification, or may be a program that performs processing in parallel or at necessary timing such as when a call is made.

Furthermore, in this specification, the system means a set of a plurality of components (a device, a module (a part), and the like), and it does not matter whether or not all the components are in the same housing. Therefore, a plurality of devices housed in separate housings and connected via a network, and a single device with a plurality of modules housed in one housing are both systems.

Moreover, the embodiment of the present technology is not limited to the above-described embodiment, and various modifications can be made without departing from the scope of the present technology.

For example, the present technology can have a cloud computing configuration in which one function is shared and processed in cooperation by a plurality of devices via a network.

Furthermore, each step described in the above-described flowchart can be executed by one device, and also shared and executed by a plurality of devices.

Moreover, in a case where one step includes a plurality of processes, the plurality of processes included in the one step can be executed by one device, and also shared and executed by a plurality of devices.

<Combination Example of Configuration>

The present technology can also have the following configurations.

(1)

An information processing apparatus including:
- an image processing unit configured to generate a first moving image in which a second autonomous mobile body being virtual that virtually interacts with a first autonomous mobile body is superimposed in a captured moving image obtained by capturing an image of the first autonomous mobile body; and
- a display control unit configured to control display of the first moving image.

(2)

The information processing apparatus according to (1) described above, in which
- the second autonomous mobile body being virtual virtually interacts with the first autonomous mobile body by performing, with the first autonomous mobile body, an action serving as a predetermined condition.

(3)

The information processing apparatus according to (2) described above, in which
- the action serving as the predetermined condition is an action serving as a condition for the first autonomous mobile body to become a friend of the second autonomous mobile body.

(4)

The information processing apparatus according to (3) described above, in which
- the action serving as the condition for becoming a friend is an action performed by the second autonomous mobile body being virtual, in cooperation with the first autonomous mobile body.

(5)

The information processing apparatus according to (4) described above, in which
- the action serving as the condition for becoming a friend is an action in which the second autonomous mobile body being virtual eats food together with the first autonomous mobile body.

(6)

The information processing apparatus according to (5) described above, in which
- the image processing unit superimposes the food being virtual on a bowl in the captured moving image.

(7)

The information processing apparatus according to any one of (4) to (6) described above, in which
- the action serving as the condition for becoming a friend is an action in which the second autonomous mobile body being virtual shares an item with the first autonomous mobile body.

(8)

The information processing apparatus according to any one of (3) to (7) described above, further including:
- a friend setting unit configured to add, as a friend of the first autonomous mobile body, the second autonomous mobile body that has performed the action serving as the condition for becoming a friend.

(9)

The information processing apparatus according to (8) described above, in which
- the friend setting unit adds a third autonomous mobile body as a friend of the first autonomous mobile body, on the basis of information regarding the third autonomous mobile body, the information being acquired from another information processing apparatus.

(10)

The information processing apparatus according to (9) described above, in which
- the friend setting unit adds the third autonomous mobile body as a friend of the first autonomous mobile body, on the basis of an image representing information regarding the third autonomous mobile body, the image being displayed on the another information processing apparatus.

(11)

The information processing apparatus according to any one of (3) to (10) described above, in which
- the display control unit controls display of a list of friends excluding a friend set to be hidden from friends of the first autonomous mobile body.

(12)

The information processing apparatus according to any one of (1) to (11) described above, in which
- the image processing unit determines a position at which the second autonomous mobile body being virtual is to be superimposed, by using, as a reference, a predetermined item in the captured moving image.

(13)

The information processing apparatus according to any one of (1) to (12) described above, in which
- the image processing unit superimposes a label indicating a name of the second autonomous mobile body, near the second autonomous mobile body being virtual in the captured moving image.

(14)

The information processing apparatus according to any one of (1) to (13) described above, in which
- the image processing unit moves the second autonomous mobile body being virtual, in accordance with a movement of the first autonomous mobile body in the first moving image.

(15)

The information processing apparatus according to any one of (1) to (14) described above, in which
- the image processing unit generates a second moving image in which the first autonomous mobile body being virtual virtually interacts with the second autonomous mobile body being virtual, and
- the display control unit controls display of the second moving image.

(16)

The information processing apparatus according to (15) described above, in which the display control unit switches display between the first moving image and the second moving image.

(17) The information processing apparatus according to any one of (1) to (16) described above, in which
the display control unit controls display of a number of times of virtual interaction of the second autonomous mobile body with the first autonomous mobile body.

(18) An information processing method including, by an information processing apparatus:
generating a moving image in which a second autonomous mobile body being virtual that virtually interacts with a first autonomous mobile body is superimposed in a captured moving image obtained by capturing an image of the first autonomous mobile body; and
controlling display of the moving image.

(19) A program for causing a computer to execute processing including:
generating a moving image in which a second autonomous mobile body being virtual that virtually interacts with a first autonomous mobile body is superimposed in a captured moving image obtained by capturing an image of the first autonomous mobile body; and
controlling display of the moving image.

Note that the effects described in this specification are merely examples and are not limited, and other effects may be present.

REFERENCE SIGNS LIST

1 Information processing system
11-1 to 11-n Autonomous mobile body
12-1 to 12-n Information processing terminal
13 Information processing server
201 Input unit
203 Information processing unit
204 Output unit
211 Camera
221 Recognition unit
222 Image processing unit
223 UI control unit
224 Friend setting unit
231 Display control unit
241 Display unit
302 Information processing unit
321 Autonomous mobile body control unit
322 Application control unit
331 Recognition unit
332 Learning unit
333 Action planning unit
334 Motion control unit

The invention claimed is:

1. A first information processing apparatus, comprising:
an image processing unit configured to:
generate a first moving image in which a second autonomous mobile body is superimposed in a captured moving image, wherein
the captured moving image comprises an image of a first autonomous mobile body,
the first autonomous mobile body is one of real or virtual,
the second autonomous mobile body is virtual,
the second autonomous mobile body virtually interacts with the first autonomous mobile body,
the virtual interaction of the second autonomous mobile body with the first autonomous mobile body is based on a specific condition,
the specific condition indicates a condition for a friendship between the first autonomous mobile body and the second autonomous mobile body, and
the specific condition comprises a first action in which the second autonomous mobile body virtually eats food with the first autonomous mobile body; and
a display control unit configured to control a display of the first moving image.

2. The first information processing apparatus according to claim 1, wherein the image processing unit is further configured to superimpose a virtual image of the food on a bowl in the captured moving image.

3. The first information processing apparatus according to claim 1, wherein the specific condition further comprises a second action in which the second autonomous mobile body virtually shares an item with the first autonomous mobile body.

4. The first information processing apparatus according to claim 1, further comprising a friend setting unit configured to add, as a friend of the first autonomous mobile body, the second autonomous mobile body based on the first.

5. The first information processing apparatus according to claim 1, further comprising a friend setting unit configured to add a third autonomous mobile body as a friend of the first autonomous mobile body based on information associated with the third autonomous mobile body, wherein
the information is acquired from a second information processing apparatus different from the first information processing apparatus.

6. The first information processing apparatus according to claim 1, further comprising a friend setting unit configured to add a third autonomous mobile body as a friend of the first autonomous mobile body based on an image that represents information associated with the third autonomous mobile body, wherein
the image is displayed on a second information processing apparatus different from the first information processing apparatus.

7. The first information processing apparatus according to claim 1, wherein the display control unit is further configured to control display of a list of friends that excludes a friend set to be hidden from friends of the first autonomous mobile body.

8. The first information processing apparatus according to claim 1, wherein the image processing unit is further configured to determine a position, at which the second autonomous mobile body is to be superimposed, in the captured moving image based on a specific item in the captured moving image as a reference.

9. The first information processing apparatus according to claim 1, wherein
the image processing unit is further configured to superimpose a label that indicates a name of the second autonomous mobile body, and
the label is superimposed adjacent to the second autonomous mobile body in the captured moving image.

10. The first information processing apparatus according to claim 1, wherein the image processing unit is further configured to move the second autonomous mobile body based on a movement of the first autonomous mobile body in the first moving image.

11. The first information processing apparatus according to claim 1, wherein
the image processing unit is further configured to generate a second moving image in which the first autonomous mobile body virtually interacts with the second autonomous mobile body,
the first autonomous mobile body and the second autonomous mobile body are virtual, and
the display control unit is further configured to control a controls display of the second moving image.

12. The first information processing apparatus according to claim 11, wherein the display control unit is further configured to switch between the display of the first moving image and the display of the second moving image.

13. The first information processing apparatus according to claim 1, wherein the display control unit is further configured to control display of a number of times of the virtual interaction of the second autonomous mobile body with the first autonomous mobile body.

14. An information processing method, comprising, by an information processing apparatus:
generating a moving image in which a second autonomous mobile body is superimposed in a captured moving image, wherein
the captured moving image comprises an image of a first autonomous mobile body,
the first autonomous mobile body is one of real or virtual,
the second autonomous mobile body is virtual,
the second autonomous mobile body virtually interacts with the first autonomous mobile body,
the virtual interaction of the second autonomous mobile body with the first autonomous mobile body is based on a specific condition,
the specific condition indicates a condition for a friendship between the first autonomous mobile body and the second autonomous mobile body, and
the specific condition comprises an action in which the second autonomous mobile body virtually eats food with the first autonomous mobile body; and
controlling a display of the moving image.

15. A non-transitory computer-readable medium having stored thereon, computer-executable instructions which, when executed by a processor, cause the processor to execute operations, the operations comprising:
generating a moving image in which a second autonomous mobile body is superimposed in a captured moving image, wherein
the captured moving image comprises an image of a first autonomous mobile body,
the first autonomous mobile body is one of real or virtual,
the second autonomous mobile body is virtual,
the second autonomous mobile body virtually interacts with the first autonomous mobile body,
the virtual interaction of the second autonomous mobile body with the first autonomous mobile body is based on a specific condition,
the specific condition indicates a condition for a friendship between the first autonomous mobile body and the second autonomous mobile body, and
the specific condition comprises an action in which the second autonomous mobile body virtually eats food with the first autonomous mobile body; and
controlling a display of the moving image.

* * * * *